US005627457A

United States Patent [19]

Ishiyama et al.

[11] Patent Number: 5,627,457

[45] Date of Patent: May 6, 1997

[54] POWER SUPPLY DEVICE, LIQUID CRYSTAL DISPLAY DEVICE, AND METHOD OF SUPPLYING POWER

[75] Inventors: Hisanobu Ishiyama; Shigeki Aoki, both of Suwa, Japan

[73] Assignee: Seiko Epson Corporation, Tokyo, Japan

[21] Appl. No.: 276,470

[22] Filed: Jul. 18, 1994

[30] Foreign Application Priority Data

| | | | |
|---|---|---|---|
| Jul. 21, 1993 | [JP] | Japan | 5-180392 |
| Aug. 3, 1993 | [JP] | Japan | 5-192543 |
| Jun. 7, 1994 | [JP] | Japan | 6-148533 |

[51] Int. Cl.[6] .............................. G05B 24/02; H02J 1/00

[52] U.S. Cl. .............................. 323/318; 345/94

[58] Field of Search .............................. 323/318; 345/94

[56] References Cited

U.S. PATENT DOCUMENTS

| | | | |
|---|---|---|---|
| 4,100,437 | 7/1978 | Hoff, Jr. . | |
| 4,141,002 | 2/1979 | Reinhold . | |
| 4,348,666 | 9/1982 | Ogita . | |
| 4,935,690 | 6/1990 | Yan | 323/314 |
| 5,124,631 | 6/1992 | Terashima . | |
| 5,341,287 | 8/1994 | Cordier et al. | 323/318 |
| 5,402,142 | 3/1995 | Okada et al. | 345/95 |

FOREIGN PATENT DOCUMENTS

| | | |
|---|---|---|
| 0631269 | 12/1994 | European Pat. Off. . |
| 56-89791 | 7/1981 | Japan . |
| 56-142592 | 11/1981 | Japan . |
| 57-17995 | 1/1982 | Japan . |
| 57-88489 | 6/1982 | Japan . |
| 62-53824 | 11/1987 | Japan . |
| 2015206 | 9/1979 | United Kingdom . |
| 93/09487 | 5/1993 | WIPO . |

*Primary Examiner*—Stuart N. Hecker
*Attorney, Agent, or Firm*—Oliff & Berridge

[57] ABSTRACT

An objective of the present invention is to provide a power supply device, a liquid crystal display device, and a method of supplying power that can enable designs with lower power consumptions and can also enable higher display qualities. A first voltage Vx, which is a constant voltage, is generated by a first voltage generation portion in a voltage regulation portion. A second voltage Vy having a value independent of that of Vx is generated by a second voltage generation portion, and Vx and Vy are added by an adder portion to generate a regulated voltage Vreg. A control portion provides variable control of Vy within a voltage regulation range that is defined to include Vx. The regulated voltage Vreg is divided by a voltage divider portion within a multi-value voltage generation portion. The impedances of voltages V2 and V4 are converted by first impedance conversion portions (n-type OP-amps), and the impedances of voltages V1 and V3 are converted by second impedance conversion portions (p-type OP-amps).

41 Claims, 35 Drawing Sheets

WHEN VARIATION IN MANUFACTURE OCCURS p-TYPE OP-AMP n-TYPE OP-AMP

| | FR SIGNAL | SELECTED | NOT SELECTED |
|---|---|---|---|
| COMMON ELECTRODE | HIGH | V5 | V1 |
| | LOW | V0 | V4 |
| | FR SIGNAL | LIT | NOT LIT |
| SEGMENT ELECTRODE | HIGH | V0 | V2 |
| | LOW | V5 | V3 |

WHEN THE VOLTAGE OF EACH SEGMENT ELECTRODE CHANGES FROM V3 TO V2 AT THE FR SWITCHOVER POINT A

FIG. 15

LOAD APPLIED TO V2 WHEN THE VOLTAGES OF ALL THE SEGMENT ELECTRODES CHANGE FROM V3 TO V2 AT THE FR SWITCHOVER POINT A

| | | #1 NON-SELECTED LINES (62 LINES) | #2 SELECTION-ENDED LINE (1 LINE) | #3 SELECTION-STARTED LINE (1 LINE) |
|---|---|---|---|---|
| WAVEFORM<br>═ SEGMENT WAVEFORM<br>— COMMON WAVEFORM | | 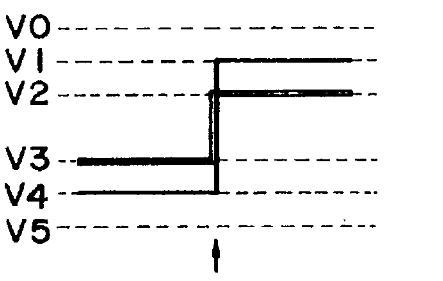 | 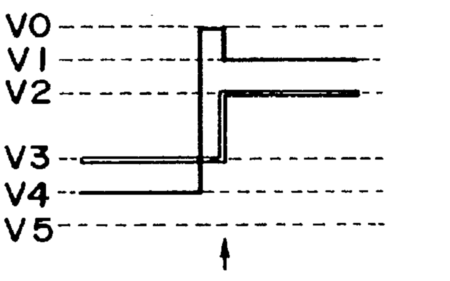 | 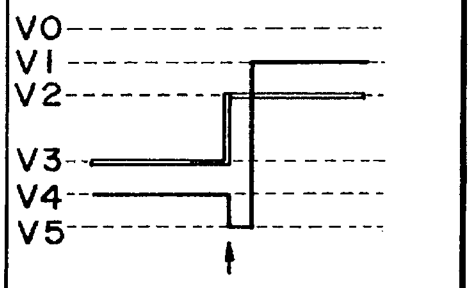 |
| EQUIVALENT DIAGRAM<br>TOP: SEGMENT ELECTRODE<br>BOTTOM: COMMON ELECTRODE | | V3(-7V) V2(-2V)<br>± -1V ⇨ ∓ +1V<br>V4(-8V) V1(-1V)<br>+1V-(-1V)=+2V | V3(-7V) V2(-2V)<br>∓ +7V ⇨ ∓ +1V<br>V0(0V) V1(-1V)<br>+1V-(+7V)=-6V | V3(-7V) V2(-2V)<br>± -1V ⇨ ± -7V<br>V4(-8V) V5(-9V)<br>-7V-(-1V)=-6V |
| LOAD (CHARGE) | POLARITY | POSITIVE | NEGATIVE | NEGATIVE |
| Q = CV (UNITS: C) | | Q = 62 x 2 = 124 | Q = 1 x -6 = -6 | Q = 1 x -6 = -6 |
| | TOTAL | +112 (POSITIVE) | | |

WHEN THE VOLTAGE OF EACH SEGMENT ELECTRODE CHANGES FROM V5 TO V2 AT THE FR SWITCHOVER POINT A

FIG. 17

LOAD APPLIED TO V2 WHEN THE VOLTAGES OF ALL THE SEGMENT ELECTRODES CHANGE FROM V5 TO V2 AT THE FR SWITCHOVER POINT A

| | | #1 NON-SELECTED LINES (62 LINES) | #2 SELECTION-ENDED LINE (1 LINE) | #3 SELECTION-STARTED LINE (1 LINE) |
|---|---|---|---|---|
| WAVEFORM<br>═ SEGMENT WAVEFORM<br>— COMMON WAVEFORM | | 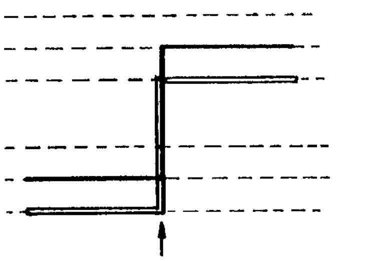 | 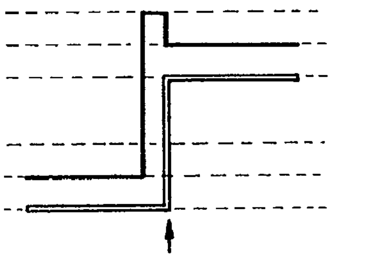 | 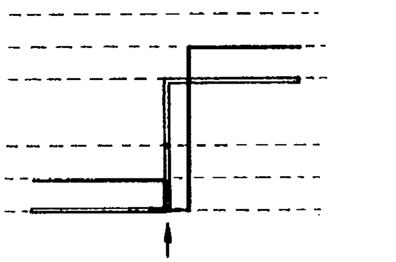 |
| EQUIVALENT DIAGRAM<br>TOP: SEGMENT ELECTRODE<br>BOTTOM: COMMON ELECTRODE | | V5(-9V) V2(-2V)<br>+1V ⇨ +1V<br>V4(-8V) V1(-1V)<br>+1V-(+1V)=0V | V5(-9V) V2(-2V)<br>+9V ⇨ +1V<br>V0(0V) V1(-1V)<br>+1V-(+9V)=-8V | V5(-9V) V2(-2V)<br>+1V ⇨ -7V<br>V4(-8V) V5(-9V)<br>-7V-(+1V)=-8V |
| LOAD (CHARGE) | POLARITY | NONE | NEGATIVE | NEGATIVE |
| Q = CV (UNITS: C) | | Q = ±0 | Q = 1 x -8 = -8 | Q = 1 x -8 = -8 |
| | TOTAL | -16 (NEGATIVE) | | |

WHEN THE VOLTAGE OF EACH SEGMENT ELECTRODE CHANGES FROM V0 TO V2 DURING PERIOD B

FIG. 19

LOAD APPLIED TO V2 WHEN THE VOLTAGES OF ALL THE SEGMENT ELECTRODES CHANGE FROM V0 TO V2 DURING PERIOD B

| | | #1 NON-SELECTED LINES (62 LINES) | #2 SELECTION-ENDED LINE (1 LINE) | #3 SELECTION-STARTED LINE (1 LINE) |
|---|---|---|---|---|
| WAVEFORM<br>═ SEGMENT WAVEFORM<br>— COMMON WAVEFORM | | 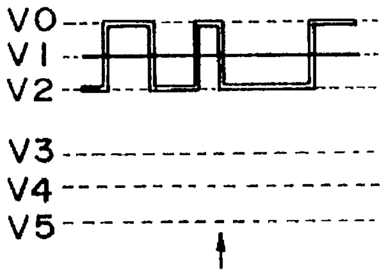  | 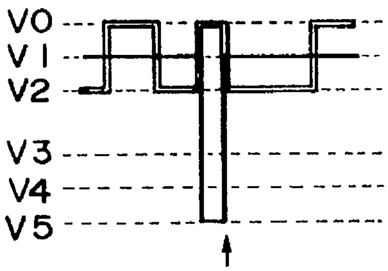  | 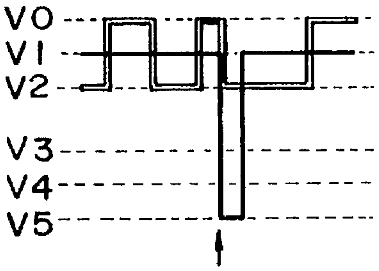  |
| EQUIVALENT DIAGRAM<br>TOP: SEGMENT ELECTRODE<br>BOTTOM: COMMON ELECTRODE | | V0(0V) V2(-2V)<br>-1V ⇨ +1V<br>V1(-1V) V1(-1V)<br>+1V-(-1V)=+2V | V0(0V) V2(-2V)<br>-9V ⇨ +1V<br>V5(-9V) V1(-1V)<br>+1V-(-9V)=+10V | V0(0V) V2(-2V)<br>-1V ⇨ -7V<br>V1(-1V) V5(-9V)<br>-7V-(-1V)=-6V |
| LOAD (CHARGE) | POLARITY | POSITIVE | POSITIVE | NEGATIVE |
| Q = CV (UNITS: C) | | Q = 62 x 2 = 124 | Q = 1 x 10 = 10 | Q = 1 x -6 = -6 |
| | TOTAL | +128 (POSITIVE) | | |

WHEN THE VOLTAGE OF EACH SEGMENT ELECTRODE DOESN'T CHANGE AND REMAINS AT V2 DURING PERIOD B

FIG. 21

LOAD APPLIED TO V2 WHEN THE VOLTAGES OF ALL THE SEGMENT ELECTRODES DON'T CHANGE AND REMAIN AT V2 DURING PERIOD B

| | | #1 NON-SELECTED LINES (62 LINES) | #2 SELECTION-ENDED LINE (1 LINE) | #3 SELECTION-STARTED LINE (1 LINE) |
|---|---|---|---|---|
| WAVEFORM<br>═ SEGMENT WAVEFORM<br>— COMMON WAVEFORM | | 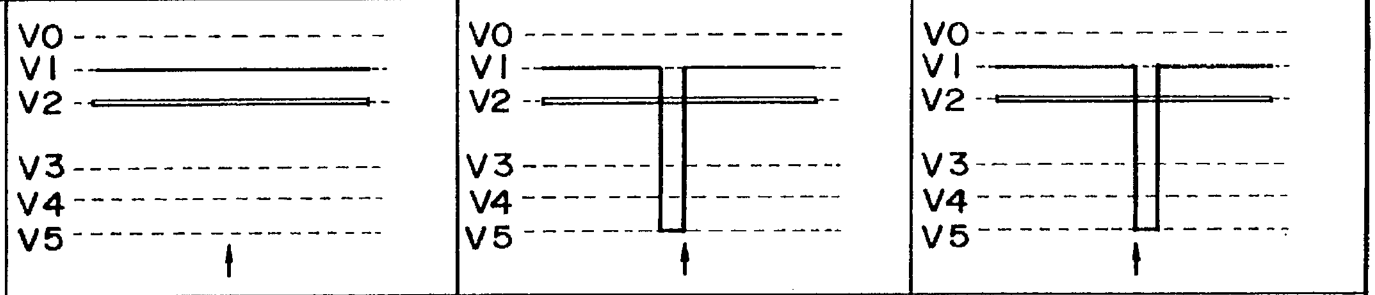 | | |
| EQUIVALENT DIAGRAM<br>TOP: SEGMENT ELECTRODE<br>BOTTOM: COMMON ELECTRODE | | V2(-2V) V2(-2V)<br>+1V ⇨ +1V<br>V1(-1V) V1(-1V)<br>+1V-(+1V)= 0V | V2(-2V) V2(-2V)<br>-7V ⇨ +1V<br>V5(-9V) V1(-1V)<br>+1V-(-7V)=+8V | V2(-2V) V2(-2V)<br>+1V ⇨ -7V<br>V1(-1V) V5(-9V)<br>-7V-(+1V)=-8V |
| LOAD (CHARGE) | POLARITY | NONE | POSITIVE | NEGATIVE |
| Q = CV (UNITS: C) | | Q = ±0 | Q = 1 x 8 = 8 | Q = 1 x -8 = -8 |
| | TOTAL | ±0 | | |

FIG. 22

LOAD APPLIED TO V1 WHEN THE VOLTAGES OF ALL THE SEGMENT ELECTRODES CHANGE FROM V5 TO V2 OR FROM V5 TO V0 AT THE FR SWITCHOVER POINT A

| | LIT → NOT LIT (V5 → V2) | | LIT → LIT (V5 → V0) | |
|---|---|---|---|---|
| WAVEFORM<br>═ SEGMENT WAVEFORM<br>— COMMON WAVEFORM | 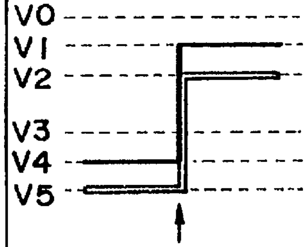 | 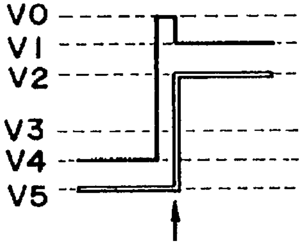 | 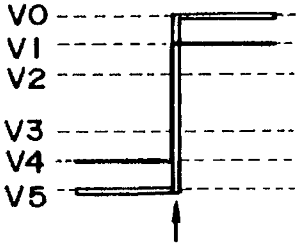 | 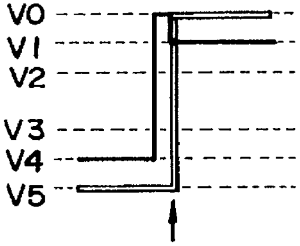 |
| EQUIVALENT DIAGRAM<br>TOP: SEGMENT ELECTRODE<br>BOTTOM: COMMON ELECTRODE | V5(-9V) V2(-2V)<br>-1V ⇨ -1V<br>V4(-8V) V1(-1V)<br>-1V-(-1V)=0V | V5(-9V) V2(-2V)<br>-9V ⇨ -1V<br>V0(0V) V1(-1V)<br>-1V-(-9V)=+8V | V5(-9V) V0(0V)<br>-1V ⇨ +1V<br>V4(-8V) V1(-1V)<br>+1V-(-1V)=+2V | V5(-9V) V0(0V)<br>-9V ⇨ +1V<br>V0(0V) V1(-1V)<br>+1V-(-9V)=+10V |
| LOAD (CHARGE) Q = CV (UNITS: C) — POLARITY | NONE | POSITIVE | POSITIVE | POSITIVE |
| LOAD (CHARGE) Q = CV (UNITS: C) | Q=62 x 0 = 0 | Q=1 x 8 = 8 | Q = 62 x 2 = 124 | Q = 1 x 10 = 10 |
| TOTAL | +8 | | +134 | |

FIG. 23

LOAD APPLIED TO V1 WHEN THE VOLTAGES OF ALL THE SEGMENT ELECTRODES CHANGE FROM V3 TO V2 OR FROM V3 TO V0 AT THE FR SWITCHOVER POINT A

| | | NOT LIT → NOT LIT (V3 → V2) | | NOT LIT → LIT (V3 → V0) | |
|---|---|---|---|---|---|
| WAVEFORM<br>═ SEGMENT WAVEFORM<br>— COMMON WAVEFORM | | 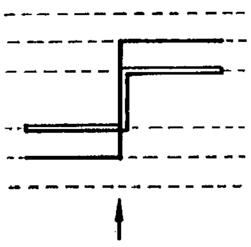 | 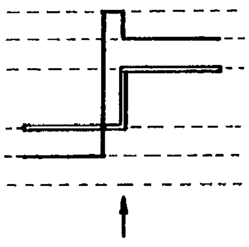 | 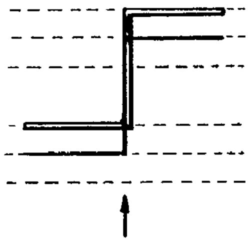 | 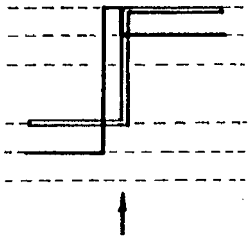 |
| EQUIVALENT DIAGRAM<br>TOP: SEGMENT ELECTRODE<br>BOTTOM: COMMON ELECTRODE | | V3(-7V) V2(-2V)<br>+1V ⇨ -1V<br>V4(-8V) V1(-1V)<br>-1V-(+1V)=-2V | V3(-7V) V2(-2V)<br>-7V ⇨ -1V<br>V0(0V) V1(-1V)<br>-1V-(-7V)=+6V | V3(-7V) V0(0V)<br>+1V ⇨ +1V<br>V4(-8V) V1(-1V)<br>+1V-(+1V)=+0V | V3(-7V) V0(0V)<br>-7V ⇨ +1V<br>V0(0V) V1(-1V)<br>+1V-(-7V)=+8V |
| LOAD (CHARGE) | POLARITY | NEGATIVE | POSITIVE | NONE | POSITIVE |
| Q = CV (UNITS: C) | | Q=62 x -2=-124 | Q=1 x 6 = 6 | Q=62 x 0=0 | Q=1 x 8 =8 |
| | TOTAL | -118 | | +8 | |

FIG. 24

LOAD APPLIED TO V1 WHEN THE VOLTAGES OF ALL THE SEGMENT ELECTRODES CHANGE FROM V0 TO V2 OR FROM V0 TO V0 DURING THE PERIOD B

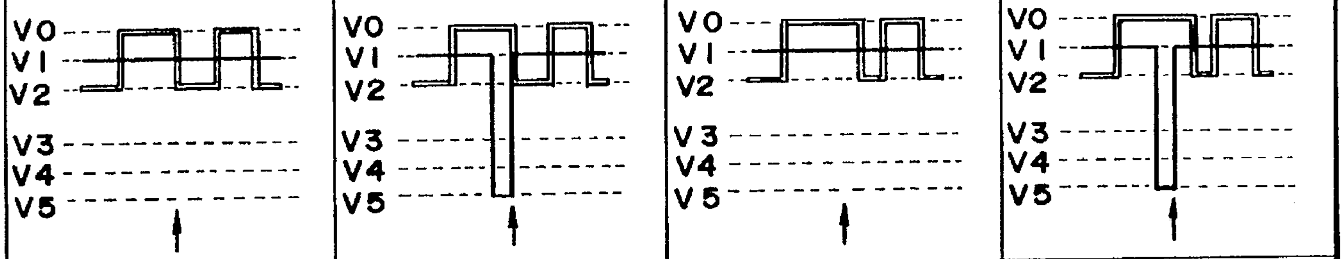

| | | LIT → NOT LIT (V0 → V2) | | LIT → LIT (V0 → V0) | |
|---|---|---|---|---|---|
| WAVEFORM<br>═ SEGMENT WAVEFORM<br>— COMMON WAVEFORM | | V0 V1 V2 V3 V4 V5 | V0 V1 V2 V3 V4 V5 | V0 V1 V2 V3 V4 V5 | V0 V1 V2 V3 V4 V5 |
| EQUIVALENT DIAGRAM<br>TOP: SEGMENT ELECTRODE<br>BOTTOM: COMMON ELECTRODE | | V0 (0V) V2(-2V)<br>± +1V ⇨ ∓ -1V<br>V1(-1V) V1(-1V)<br>-1V-(+1V)=-2V | V0(0V) V2(-2V)<br>± +9V ⇨ ∓ -1V<br>V5(-9V) V1(-1V)<br>-1V-(+9V)=-10V | V0 (0V) V0(0V)<br>± +1V ⇨ ± +1V<br>V1(-1V) V1(-1V)<br>+1V-(+1V)= 0V | V0(0V) V0(0V)<br>± +9V ⇨ ± +1V<br>V5(-9V) V1(-1V)<br>+1V-(+9V)=-8V |
| LOAD (CHARGE) | POLARITY | NEGATIVE | NEGATIVE | NONE | NEGATIVE |
| Q = CV (UNITS: C) | | Q = 62 x -2 = -124 | Q = 1 x -10 = -10 | Q = 62 x 0 = 0 | Q = 1 x -8 = -8 |
| | TOTAL | -134 | | - 8 | |

FIG. 25

LOAD APPLIED TO V1 WHEN THE VOLTAGES OF ALL THE SEGMENT ELECTRODES CHANGE FROM V2 TO V2 OR FROM V2 TO V0 DURING THE PERIOD B

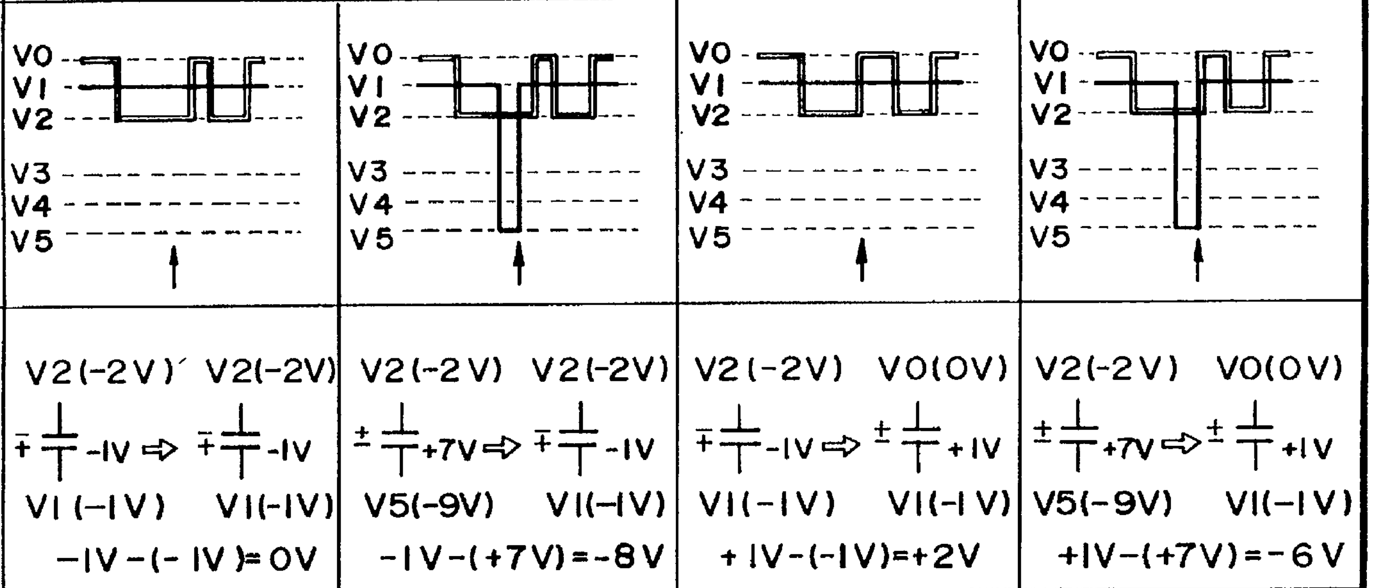

| | NOT LIT ⟶ NOT LIT (V2 ⟶ V2) | | NOT LIT ⟶ LIT (V2 ⟶ V0) | |
|---|---|---|---|---|
| WAVEFORM<br>═══ SEGMENT WAVEFORM<br>─── COMMON WAVEFORM | V0 V1 V2 V3 V4 V5 | V0 V1 V2 V3 V4 V5 | V0 V1 V2 V3 V4 V5 | V0 V1 V2 V3 V4 V5 |
| EQUIVALENT DIAGRAM<br>TOP: SEGMENT ELECTRODE<br>BOTTOM: COMMON ELECTRODE | V2(−2V) V2(−2V)<br>−1V ⇨ −1V<br>V1(−1V) V1(−1V)<br>−1V−(−1V)=0V | V2(−2V) V2(−2V)<br>+7V ⇨ −1V<br>V5(−9V) V1(−1V)<br>−1V−(+7V)=−8V | V2(−2V) V0(0V)<br>−1V ⇨ +1V<br>V1(−1V) V1(−1V)<br>+1V−(−1V)=+2V | V2(−2V) V0(0V)<br>+7V ⇨ +1V<br>V5(−9V) V1(−1V)<br>+1V−(+7V)=−6V |
| LOAD (CHARGE) POLARITY | NONE | NEGATIVE | POSITIVE | NEGATIVE |
| Q = CV (UNITS: C) | Q=62 x 0 =0 | Q=1x −8 =−8 | Q=62 x 2=124 | Q =1 x−6 =−6 |
| TOTAL | −8 | | +118 | |

FIG. 26

| | POLARITY OF LOAD (CHARGE) | A | B | POLARITY OF MAXIMUM LOAD (CHARGE) |
|---|---|---|---|---|
| V1 | NEGATIVE | -118 | -134 | NEGATIVE |
| | POSITIVE | +134 | +118 | |
| V2 | NEGATIVE | -16 | 0 | POSITIVE |
| | POSITIVE | +112 | +128 | |
| V3 | NEGATIVE | -112 | -128 | NEGATIVE |
| | POSITIVE | +16 | 0 | |
| V4 | NEGATIVE | -134 | -118 | POSITIVE |
| | POSITIVE | +118 | +134 | |

(UNITS: C)

n-TYPE OP-AMP PROVIDED WITH CURRENT-CONTROL FUNCTION

POWER SUPPLY DEVICE, LIQUID CRYSTAL DISPLAY DEVICE, AND METHOD OF SUPPLYING POWER

TECHNICAL FIELD

The present invention relates to a power supply device, a liquid crystal display device that includes this power supply device, and a method of supplying power.

BACKGROUND ART

An example of a prior art power supply device that is used in electronic devices such as a liquid crystal display device is shown in FIG. 33. It should be noted at this point that the description below takes a power supply device used in a liquid crystal display device by way of example only. This power supply device 320 comprises a voltage regulation portion 322 and a multi-value voltage generation portion 324.

In this case, the voltage regulation portion 322 has the function of generating a regulated voltage Vreg by adjusting a voltage between two supply voltages VS and VDD, and comprises a control portion 314 and a voltage-divider resistor 313. The control portion 314 further comprises switches S1 to S4 that control the resistance of the voltage-divider resistor 313 on the basis of regulated-voltage setting signals that are input thereto. The voltage-divider resistor 313 comprises resistors R1 to R4, these resistors R1 to R4 are selectively bypassed by control from the control portion 314, this varies the resistance of the voltage-divider resistor 313, and thus the regulated voltage Vreg is determined. Enabling voltage regulation in this manner allows the user to adjust the contrast of the liquid crystal display.

The multi-value voltage generation portion 324 further comprises a voltage-divider resistor 312 formed of resistors Ra to Re. It has the function of dividing the regulated voltage Vreg from the voltage regulation portion 322 to generate supply voltages V0 to V5 of different magnitudes, This generation of multi-value supply voltages V0 to V5 makes it possible to implement a method such as a 6-level drive method to drive the liquid crystal display.

Another example of a prior art power supply device is shown in FIG. 34. The power supply device 321 of this figure differs from that of FIG. 33 in that a multi-value voltage generation portion 326 thereof comprises operational amplifiers (OP-amps) 301 to 305 connected in a voltage-follower manner. Each of these OP-amps 301 to 305 is connected to one of divider terminals (taps) 330 to 338 of the voltage-divider resistor 312. These OP-amps 301 to 305 convert the impedances of the divided voltages generated at the corresponding divider terminals 330 to 338. In this prior art power supply device, all of the OP-amps 301 to 305 have the configuration that will be described later with reference to FIG. 10 (n-type OP-amp).

The voltage regulation portion 322 shown in FIG. 33 and FIG. 34 turn on and off switches S1 to $4 of the control portion 314, on the basis of the regulated-voltage setting signals. This adjusts the number of steps in the voltage-divider resistor connected between the supply voltages VS and VDD, to generate the regulated voltage Vreg. This regulated voltage Vreg is then divided by the voltage-divider resistor 312 of the multi-value voltage generation portion 324 or 326. In the configuration of FIG. 33, these divided voltages are output without any impedance conversion as the multi-value driving supply voltages V0 to V5. On the other hand, in the configuration of FIG. 34, the impedances of these divided voltages are converted by the OP-amps 301 to 305 that are connected in a voltage-follower manner, to generate the multi-value driving supply voltages V0 to V5 that are output.

These driving supply voltages V0 to V5 are supplied to a liquid crystal drive signal generation portion (LCD driver) that is not shown in the figures. This drive signal generation portion generates drive signals for driving the liquid crystal panel on the basis of these driving supply voltages V0 to V5.

Liquid crystal display devices are often used in portable electronics equipment. That is why it is considered that the demand current of such a liquid crystal display device must be made extremely low to reduce the power consumption. A further concern is not only to reduce the power consumption of the liquid crystal display device in this manner, but also increase its display quality. In order to ensure a lower power consumption for the liquid crystal display device, it is necessary to reduce the power consumption of a power supply device that supplies power to the liquid crystal display device. Further, in order to ensure a higher display quality for the liquid crystal display device, the supply voltages supplied from the power supply device must be such that they do not adversely affect the display quality of the liquid crystal display device.

In view of the above concerns, the prior art power supply devices 320 and 321 of FIG. 33 and FIG. 34 have the problems described below.

To enable the regulation of the contrast of the liquid crystal display as described above, the power supply device of the liquid crystal display device enables voltage regulation. In the prior art examples shown in FIG. 33 and FIG. 34, this voltage regulation is provided by the voltage regulation portion 322 varying the number of divisions in the resistors connected between the supply voltages. Assume that the resistances of the voltage-divider resistors 312 and 313 are R12 and R13. Thus the resistance R12 is fixed at R12=Ra+Rb+Rc+Rd+Re. The resistance R13 is determined by which of the switches in the control portion 314 are on. For example, if the ratios of resistances R4 to R1 are set to 8:4:2:1, and switches S4 to S2 are turned off with S1 on, R13=R4+R3+R2=14R (where the resistance of R1 is assumed to be R). In this manner, the resistance R13 can be varied in steps from, for example, 0 to 15R (=R13tot) by turning the switches S4 to S1 on or off by the regulated-voltage setting signals.

In these prior art power supply devices, the regulated voltage Vreg is determined by the ratio of these resistances R12 and R13, as expressed by the equation below. Note that in the description below, VDD is assumed to be 0 V and VS is assumed to be a negative voltage such as −9 V.

$$Vreg=VS\cdot R12/(R12+R13) \quad \text{Equation 1}$$

In this case, the resistance R13 can be varied between 0 and 15R (R13tot), as described above, so that the value of Vreg can be varied as shown in FIG. 35A. For example, if R13=0 (S4 to S1 are all on), Vreg has a maximum value Vrmax (negative) given by the following equation:

$$Vrmax=VS \quad \text{Equation 2}$$

Further, if R13=R13tot=15R (S4 to S1 are all off), Vreg has a minimum value Vrmin (negative) given by the following equation:

$$Vrmin=VS\cdot R12/(R12+R13tot) \quad \text{Equation 3}$$

Therefore, a voltage regulation range Vrange is given by the following equation:

$$Vrange=|Vrmax-Vrmin|=|VS|\cdot R13tot/(R12+R13tot) \quad \text{Equation 4}$$

Since it is desired that a power supply device used in a liquid crystal display device should provide a wide range of contrast regulation, the voltage regulation range Vrange should also be capable of being set to as wide a range as possible. As can be understood from Equation 4, if it is desired to widen the voltage regulation range Vrange of either of the above prior art examples, it is necessary to either reduce the resistance R12 of the voltage-divider resistor 312 that sets the number of divisions, or increase the total resistance R13tot of the voltage-divider resistor 313 that enables the switching of the steps. However, with the former method, since the resistance of the voltage-divider resistor is small, the consumption of current flowing between the supply voltage VDD and the supply voltage VS is large, the problem of providing a low power consumption cannot be solved. With the latter method, when this circuitry is mounted in a semiconductor integrated circuit, the aspect ratio of the resistors made of a material such as polysilicon becomes too large, causing the problem that the chip area increases.

Further, when voltage regulation is provided by a power supply device of this type, it is necessary to set a central value Vc for performing the voltage regulation. This central value Vc becomes the value at the center of the contrast brightness range when the contrast of the liquid crystal display is adjusted. It is desirable to set the central value Vc to, for example, S4 to S1=(0111) (where 0 means off and 1 means on) as shown in FIG. 35A. This enables voltage regulation within a range of, for example, seven levels above and eight levels below the central value, so that contrast regulation can be provided over a range that is the same on both the light side and the dark side. However, manufacturing variations occur in the semiconductor devices or liquid crystal display elements that include this power supply device, due to factors such as changes in processing conditions. If such variations occur, there will also be variations in the central value Vc of brightness for contrast regulation. In such a case, the maximum value, minimum value, and voltage regulation range of the regulated voltage in the prior art power supply device are fixed by the resistances R12 and R13 of the voltage-divider resistor, as is clear from Equations 1 to 4. Therefore, if a change in the central value Vc should be caused by manufacturing variations in this manner, it is not possible to shift the maximum value, minimum value, and voltage regulation range upward or downward. Thus, if, for example, the central value Vc shifts to a value set by S4 to S1=(0100), as shown in FIG. 35B, voltage regulation in the range above Vc can be performed over only four levels, and it is no longer possible to provide contrast regulation over ranges that are the same on both the light side and the dark side of the center. This makes it impossible to solve the problem concerning improving the display quality. One method of solving this problem that has been considered is to increase the number of divisions of the voltage-divider resistor 313 and thus broaden the range of voltage regulation, to allow for manufacturing variations, but this method causes a further problem in that it increases the area of the semiconductor chip. Further, since voltage regulation in the prior art power supply device is provided by switching the number of divisions of the voltage-divider resistor, it is necessary to store the value for determining this central value Vc, such as the value (0111) in FIG. 35A and (0100) in FIG. 35B, in means such as non-volatile memory, which raises the problem of making the circuit configuration complicated when it comes to building the system.

In the prior art examples shown in FIG. 33 and FIG. 34, it is clear from Equation 1 that the regulated voltage Vreg is determined by the supply voltage VS or the like, and the resistance ratio of the voltage-divider resistors 312 and 313. Therefore, there is a problem in that, if the supply voltage should change, the regulated voltage Vreg will also change, such that in a liquid crystal display device that uses a battery as a power source, any change in the voltage of the battery will lead to a change in display quality.

Now consider the multi-value voltage generation portions 324 and 326 of FIG. 33 and FIG. 34.

In general, in a time-division (multiplexed) system for driving liquid crystal, six supply voltages obtained by calculation by a known 6-level drive method (method of voltage averaging, amplitude selective addressing scheme) are used. These voltages are called V0, V1, V2, V3, V4, and V5, starting from the highest. A liquid crystal display device has common electrodes and segment electrodes, where the common electrodes are provided with a common signal (scanning signal) for determining whether or not lines are selected. Further, the segment electrodes are provided with a segment signal (data signal) for determining whether or not display pixels are lit. The voltage of each common electrode is V5 (or V0) in a selected period or V1 (or V4) in a non-selected period. When the voltage of a common electrode is V5 (or V0), if the voltage of a segment electrode is V0 (or V5) the corresponding pixel is lit; if that voltage is V2 (or V3), the corresponding pixel is not lit. Note that the values in parentheses in this case indicate the supply voltages when the polarity of a frame (FR) signal is inverted. This frame signal is an alternation signal in frame inversion technique or line inversion technique.

These multi-value supply voltages V0 to V5 are generated by either of the multi-value voltage generation portions 324 and 326. In this case, the multi-value voltage generation portion 324 of FIG. 33 divides the supply voltage by the voltage-divider resistor 312 and the resultant values are used unchanged as V0 to V5. However, from consideration of display quality and power consumption reduction, it is not preferable to use these resistance-divided voltages unchanged as supply voltages for liquid crystal drive. In other words, to ensure a lower power consumption for the device, the resistances of the resistors Ra to Re that form the voltage-divider resistor 312 must be as high as possible, so that the currents flowing through the voltage-divider resistor 312 are as low as possible. However, if the resistances of Ra to Re are made high, the output impedances at the divider terminals 330 to 338 of the voltage-divider resistor 312 will also be high. If the output impedances are made high in this manner, changes in the supply voltages during the liquid crystal drive will be great, adversely affecting the liquid crystal display quality. Therefore, this method of generating multi-value supply voltages is not suitable for driving a large liquid crystal panel.

On the other hand, in the method shown in FIG. 34, the above problem is solved by using the OP-amps 301 to 305, which are connected in a voltage-follower manner, to convert the impedances of the divided voltages generated at the divider terminals 330 to 338. In other words, the output impedances of the multi-value voltage generation portion 326 are reduced by the impedance conversion provided by the OP-amps 301 to 305, so that deterioration of the liquid crystal display quality can be prevented. When such impedance conversion is provided, increasing the output impedances at the divider terminals 330 to 338 causes no problems, so the resistances of Ra to Re can be increased. If the resistances of Ra to Re are increased, the currents flowing through the voltage-divider resistor 312 can be reduced, and thus it becomes possible to design a device with reduced power consumption.

To attempt to reduce the power consumption of the device even further, it is necessary to restrain the power consumed by the OP-amps S01 to 305 as well. Each of-these OP-amps 301 to 305, as will be described later with reference to FIG. 10, is provided with a drive portion having a resistor or constant-current source connected at one end to a high-potential power-source side and an n-channel drive transistor connected at one end to a low-potential power-source side. In order to restrain the power consumption of the OP-amps 301 to 305, it is necessary to reduce the current flowing in this drive portion (said resistor or constant-current source).

However, if the current flowing in this drive portion is reduced in order to reduce the power consumption, the problem then arises that the phenomena of shadows and cross-talk will occur in the liquid crystal display, and the liquid crystal display quality will become extremely low. With a drive method called a 6-level drive method (method of voltage averaging, amplitude selective addressing scheme), the effective voltages applied to the pixels during the drive period are averaged for all the on pixels and for all the off pixels, to try to average the display status. Therefore, an averaging (equalization) state that is a precondition of this 6-level drive method cannot be maintained, and thus the above phenomena of shadows and cross-talk will occur. Therefore, it is a large technical concern to determine how to reduce power consumptions while making sure that these phenomena of shadows and cross-talk do not occur.

Note that if there are only four levels (V0 to V3) of multi-value supply voltages (a 4-level drive method), a configuration could be considered in which, for example, a p-type OP-amp (described later with reference to FIG. 8) is connected to a supply voltage V1 on the high-potential side and an n-type OP-amp (described later with reference to FIG. 10) is connected to a supply voltage V2 on the low-potential side (refer to Japanese Patent Publication No. Sho 62-53824). The reason for a configuration of this type is as follows. The p-type OP-amp is configured such that the input portion of its differential amplifier portion has an n-channel transistor and a constant-current source is connected to the low-potential power source side thereof. Therefore, in order to operate the n-channel transistor of the input portion and an n-channel transistor of the constant-current source normally (to make the voltage between the drain and source of each transistor sufficiently large), a high potential must be input to the transistor in the input portion, and that is why a p-type OP-amp is connected to V1. Conversely, the n-type OP-amp is configured such that the input portion of its differential amplifier portion has a p-channel transistor and a constant-current source is connected to the high-potential power source side thereof. Therefore, in order to operate the p-channel transistor of the input portion and a p-channel transistor of the constant-current source normally, a low potential must be input to the transistor in the input portion, and that is why an n-type OP-amp is connected to V2. This ensures that the operating voltage range of the OP-amps can be widened.

However, if there are five or more levels of multi-value supply voltages, and thus at least three impedance conversion means are necessary, it is not possible to determine what type of OP-amp should be used for the third and subsequent impedance conversion means, and thus it is a great technical problem to determine how the type should be determined.

SUMMARY OF THE INVENTION

This invention is intended to solve the above problems, and has as its objective the provision of a power supply device, a liquid crystal display device, and a method of supplying power that can enable designs with lower power consumptions and can also enable higher display qualities.

In order to solve the above described problems, a power supply device in accordance with this invention comprises a voltage regulation means, and is configured to supply a supply voltage that has been regulated by the voltage regulation means to an object to be driven, wherein:

the voltage regulation means comprises a first voltage generation means for generating a first, constant voltage from a supply voltage; an adder means for adding to the first voltage a second voltage that does not depend on the first voltage; and a control means for variably controlling the second voltage within a predetermined voltage regulation range that is defined to include the first voltage.

In accordance with the present invention, a first, constant voltage is generated from a supply voltage. A second voltage that does not depend on the first voltage is then generated, and this second voltage is added to the first voltage. In this case, the second voltage is variably controlled within a predetermined voltage regulation range that is defined to include the first voltage, and thus a desired regulated voltage can be supplied to the object to be driven. A particular feature of the present invention is the way in which the second voltage does not depend upon the first voltage. Therefore, even if the first voltage is adjusted by means for adjusting the first voltage, this does not affect the way in which the second voltage can be regulated by the control means within the predetermined voltage regulation range. As a result, the first voltage can be adjusted independently of other factors such as the voltage regulation range, and thus undesirable effects such as a narrowing of the voltage regulation range due to changing of the first voltage can be efficiently prevented. This enables an extremely flexible form of voltage regulation that does not exist in the prior art, which leads to improvements in the display quality and other characteristics of the object to be driven that is driven on the basis of the regulated voltage.

In this invention, the first voltage generated by the first voltage generation means and the second voltage added to the first voltage by the adder means have a temperature characteristic which compensates for a temperature characteristic of the object to be driven.

In accordance with the present invention, the first and second voltage have a temperature characteristic that compensates for a temperature characteristic of the object to be driven. This ensures that, if the element characteristics of the object to be driven are changed by a change in temperature, the first voltage, the second voltage, and the regulated voltage obtained by adding the first and second voltages change in such a manner as to compensate for this change in element characteristics. This makes it possible to provide a stable power supply that is not affected by temperature changes, so that a drive based on this regulated voltage can be provided, enabling extremely good display quality and other characteristics of the object to be driven.

In this invention, the second voltage added by the adder means is fixed at a predetermined value during the initial operation of the device.

In accordance with the present invention, the second voltage added to the first voltage is fixed at a predetermined value during the initial operation of the device. This enables the regulated voltage that is output from the power supply device to be fixed at a desired value during the initial operation. In other words, the regulated voltage can be fixed at any value within the voltage regulation range, such as the central value, the minimum value, or the maximum value. This makes it unnecessary to include any variation-adjustment program in the firmware used for generating the regulated voltage, or provide circuitry for detecting the output voltage of the voltage regulation portion. As a result, the device can be made smaller, and also the chip size can be reduced when this device is incorporated in a semiconductor device.

In this invention, the first voltage generation means comprises an operational amplifier, a reference voltage source connected to a first input terminal of the operational amplifier, a first resistor connected at one end to a second input terminal of the operational amplifier and at the other end to a fixed potential, and a second resistor connected at one end to the second input terminal of the operational amplifier and at the other end to an output terminal of the operational amplifier; and the adder means comprises means for making a current from a constant-current source, which is variably controlled by the control means, flow through the second resistor.

In accordance with the present invention, the first voltage is determined by a reference voltage from the reference voltage source and the resistances of the first and second resistors. The second voltage is generated by the flowing of a current from the constant-current source, which is variably controlled by the control means, through the second resistor, and this second voltage is added to the first voltage. This ensures that the desired regulated voltage can be obtained. In this manner, the present invention ensures that the first voltage and the second voltage are generated independently. In other words, the first voltage can be adjusted by adjusting the resistance of the first resistor. Further, the second voltage can be adjusted independently of the first voltage, by adjusting the current that flows in the second resistor from the constant-current source. This also means that the voltage regulation range of the second voltage can be made independent of the first voltage. Since this broadens the voltage regulation range of the prior art, there is no need to provide a large number of divisions for the switchable resistors, and thus it is possible to make the device smaller and reduce semiconductor chip sizes. By making the circuit configuration simpler than that of the prior art, it becomes possible to design for lower power consumptions. Since the first voltage is determined by a reference voltage from the reference voltage source and the second voltage is determined based on a current from the constant-current source, a stable regulated voltage and voltage regulation range can be achieved, independent of changes in the supply voltage.

In this invention, the reference voltage source and the constant-current source comprise MOS transistors, and a reference voltage from the reference voltage source and a constant current from the constant-current source are generated by using the threshold voltages of the MOB transistors.

The threshold voltage of a MOS transistor has a negative temperature characteristic. This makes it possible to provide negative temperature characteristics for the first voltage, second voltage, regulated voltage, and voltage regulation range, without having to add any element that has a temperature characteristic, such as a thermistor. Thus the present invention can provide a power supply device that is suitable for a liquid crystal display device in which the contrast and other characteristics have negative temperature characteristics.

A power supply device of the present invention comprises a multi-value voltage generation means and is configured to supply multi-value driving supply voltages from the multi-value voltage generation means, wherein:

the multi-value voltage generation means comprises a voltage divider means for generating divided voltages at divider terminals thereof, and a plurality (at least three) of impedance conversion means connected between the divider terminals and the objects to be driven for converting the impedances of the divided voltages generated at the divider terminals, thus generating multi-value driving supply voltages intended for capacitive objects to be driven; and the configuration is such that a first impedance conversion means having a drive portion that draws in a large positive charge is connected to an object to be driven when the polarity of the charge that must be transferred from the object to be driven to the impedance conversion means during the drive period is positive in total, and a second impedance conversion means having a drive portion that draws in a large negative charge is connected to an object to be driven when the polarity of the charge that must be transferred from the object to be driven to the impedance conversion means during the drive period is negative in total.

In accordance with the present invention, divided voltages are generated by a voltage divider means, and these divided voltages are supplied to the objects to be driven after their impedances have been converted by an impedance conversion means. When an object to be driven is such that the polarity of the charge that must be transferred from the object to be driven to the impedance conversion means during the drive period is positive in total, impedance conversion is performed by a first impedance conversion means having a drive portion that draws in a large positive charge. On the other hand, if an object to be driven is such that the polarity of this charge is negative in total, impedance conversion is performed by a second impedance conversion means having a drive portion that draws in a large negative charge. This ensures that a multi-value supply voltage that is suited to the load applied to the corresponding driving supply voltage is supplied to each capacitive object to be driven. Further, no unnecessary currents flow through the drive portion of the impedance conversion means, enabling improvements in the display quality and other characteristics of the object to be driven.

In particular, if it is necessary to provide three or more impedance conversion means, this aspect of the present invention can make it easy to determine what type of OP-amp should be used for the third and subsequent impedance conversion means. Thus, if the present inventin is applied to a liquid crystal display device that uses 6-level drive method, for instance, it is possible to easily determine what type of impedance conversion means should be used for each of the four impedance conversion means.

In this invention, each of the first and second impedance conversion means is formed of a voltage-follower connected operational amplifier comprising a differential portion and a drive portion; the drive portion of the first impedance conversion means comprises a constant-current source or resistor connected at one end to a high-potential power-source side and at the other end to an output-terminal side, and an n-channel drive transistor connected at one end to a low-potential power-source side and at the other end to the output-terminal side; and the drive portion of the second impedance conversion means comprises a p-channel drive transistor connected at one end to the high-potential power-source side and at the other end to the output-terminal side, and a constant-current source or resistor connected at one end to the low-potential power-source side and at the other end to the output-terminal side.

In accordance with the present invention, the impedances of the divided voltages are converted by the voltage-follower connected operational amplifiers, and supply voltages of the same voltages as the divided voltages are supplied to the objects to be driven. The drive portion of the first impedance conversion means comprises a constant-current source or resistor connected to a high-potential side and an n-channel drive transistor connected to a low-potential side, and the drive portion of the second impedance conversion means comprises a constant-current source or resistor connected to the low-potential side and a p-channel drive transistor connected to the high-potential side. In this case, the first impedance conversion means is connected to an object to be driven when the polarity of the charge that must be transferred from the object to be driven to the impedance conversion means is positive in total. Therefore, this positive charge can be sufficiently absorbed by the n-channel drive transistor in the drive portion, and thus the current flowing in the constant-current source or the resistor can be made sufficiently small. Conversely, the second impedance conversion means is connected to an object to be driven when the polarity of the charge that must be transferred from the object to be driven to the impedance conversion means is negative in total. Therefore, this negative charge can be sufficiently absorbed by the p-channel drive transistor in the drive portion, and thus the current flowing in the constant-current source or the resistor can be made sufficiently small. This enables improvements in the display quality and other characteristics of the objects to be driven, enables savings in the currents flowing through the drive portions, and also enables huge reductions in demand current As a result, the battery lifetimes of equipment in which the power supply device of this invention is included can be greatly extended.

A power supply device of this invention is characterized in comprising a control means for controlling one or a plurality of multi-value driving supply voltages generated by the multi-value voltage generation means, in such a manner that the voltage or voltages reach predetermined levels within a predetermined period immediately after the power is turned on.

This makes it possible to guarantee that these driving supply voltages will reach their predetermined levels within the predetermined period immediately after the power is turned on. This can prevent any of the adverse effects that could occur if these driving supply voltages should reach a transient state, enabling improvements in the display quality and other characteristics of the object to be driven.

A power supply device of this invention is characterized in comprising a control means for controlling the one or a plurality of multi-value driving supply voltages generated by the multi-value voltage generation means, in such a manner that the voltage or voltages reach predetermined levels within a predetermined period immediately after the power is turned on; wherein the control means comprises means for increasing the current flowing into the low-potential power-source side of the drive portion of the second impedance conversion means during the predetermined period, when the high-potential power source acts as a fixed-potential power source and the low-potential power source is turned on.

In accordance with the present invention, the current flowing into the low-potential power-source side of the drive portion of the second impedance conversion means is increased during the predetermined period immediately after the power is turned on. This ensures that one or a plurality of multi-value driving supply voltages, such as V1 and V3 of the 6-level drive method, are controlled in such a manner that the voltage or voltages reach predetermined levels within the predetermined period, and can also prevent any adverse effects caused by the voltages at V1 and V3 going in a transient state. This prevents adverse conditions such that the liquid crystal display goes completely black.

A power supply device of this invention is characterized in comprising a control means for controlling one or a plurality of multi-value driving supply voltages generated by the multi-value voltage generation means, in such a manner that the voltage or voltages reach predetermined levels within a predetermined period immediately after the power is turned on; wherein the control means comprises means for increasing the current flowing from the high-potential power-source side of the drive portion of the first impedance conversion means during the predetermined period, when the low-potential power source acts as a fixed-potential power source and the high-potential power source is turned on.

In accordance with the present invention, the current flowing through the high-potential power-source side of the drive portion of the first impedance conversion means is increased during the predetermined period immediately after the power is turned on. This ensures that one or a plurality of multi-value driving supply voltages, such as V2 and V4 of the 6-level drive method, are controlled in such a manner that the voltage or voltages reach predetermined levels within the predetermined period, and can also prevent any adverse effects caused by the voltages at V2 and V4 going into a transient state. This prevents adverse conditions such that the liquid crystal display goes completely black.

In this invention, a voltage in a transient state from the multi-value driving power source is controlled such that it is not applied to the object to be driven during the predetermined period.

In accordance with the present invention, during the predetermined period until the driving supply voltages reach their predetermined levels, no voltage in a transient state that might occur from the driving power source is transferred to the object to be driven. After the predetermined period has elapsed and the driving supply voltages have reached their predetermined levels, the driving supply voltages are supplied to the objects to be driven. This can more completely prevent any adverse effects that may be caused by driving supply voltages in a transient state, enabling further improvements in the display quality and other characteristics of the objects to be driven.

A power supply device of this invention comprises a multi-value voltage generation means and is configured to supply multi-value driving supply voltages from the multi-value voltage generation means, wherein:

the multi-value voltage generation means comprises a voltage divider means for generating divided voltages at divider terminals thereof; a plurality of impedance conversion means connected between the divider terminals and the objects to be driven for converting the impedances of the divided voltages generated at the divider terminals, thus generating multi-value driving supply voltages intended for capacitive objects to be driven; and means for controlling the impedance conversion means;

the impedance conversion means is formed of a voltage-follower connected operational amplifier comprising a differential portion and a drive portion; and the drive portion comprises a constant-current source or resistor connected at one end to a first power-source side and at the other end to an output-terminal side, and a drive transistor connected at one end to a second power-source side and at the other end to an output-terminal side; and the means for controlling the impedance conversion means controls a current to flow through the constant-current source or the resistor of the impedance conversion means only during a fixed period immediately after the rise or fall of the reference clock that is used in driving the object to be driven.

In accordance with the present invention, the means for controlling the impedance conversion means controls a current to flow through the constant-current source or resistor within the impedance conversion means only during a fixed period immediately after the rise or fall of the reference clock. In other words, when a capacitive object to be driven is to be driven, load is applied to the driving supply voltages only during a fixed period immediately after the rise or fall of the reference clock. Therefore, if current flows through the constant-current source or resistor only during this period, the object to be driven can be sufficiently driven by this constant-current source or resistor. This ensures that current can be restrained from flowing through the constant-current source or the resistor during periods other than the above period, and thus the device can be designed to have an even lower power consumption.

A power supply device of this invention comprises a multi-value voltage generation means and is configured to supply multi-value driving supply voltages from the multi-value voltage generation means; wherein:

the multi-value voltage generation means comprises a voltage divider means for generating divided voltages at divider terminals thereof; a plurality of impedance conversion means connected between the divider terminals and the objects to be driven for converting the impedances of the divided voltages generated at the divider terminals, thus generating multi-value driving supply voltages intended for capacitive objects to be driven; and means for controlling the impedance conversion means;

the impedance conversion means is formed of a voltage-follower connected operational amplifier comprising a differential portion and a drive portion; and the drive portion comprises a constant-current source or resistor connected at one end to a first power-source side and at the other end to an output-terminal side, and a drive transistor connected at one end to a second power-source side and at the other end to an output-terminal side; and when a frame signal for driving an object to be driven is at a predetermined level, the means for controlling the impedance conversion means puts limitations on a current that flows through the constant-current source or the resistor of the impedance conversion means.

In accordance with the present invention, the current flowing in the constant-current source or the resistor within the impedance conversion means is limited by the means for controlling the impedance conversion means when the frame signal (an alternation signal in frame inversion technique or line inversion technique) is at a predetermined level. In other words, depending on the driving supply voltage, it could happen that load is not applied when the frame signal is at the predetermined level. Therefore, this configuration ensures that, if the current flowing in the constant-current source or the resistor is controlled, the flow of unnecessary demand current in the constant-current source or resistor can be efficiently prevented. This enables the design of devices with even lower power consumptions, without any deterioration in the display quality and other characteristics of the object to be driven.

In this invention, the drive portion comprises a constant-current source or resistor that is controlled by the means for controlling the impedance conversion means, and another constant-current source or resistor that is not controlled by the control means.

With this configuration, the output voltage of the drive portion can be held at a fixed value by the constant-current source or resistor that is not controlled by the control means. In addition, if the current flowing in the constant-current source or the resistor is controlled by the control means in accordance with the load applied to the driving supply voltages, a drive portion having sufficient drive capability with a low power consumption can be implemented.

A power supply device of this invention comprises a voltage regulation means and a multi-value voltage generation means, and is configured to supply multi-value driving supply voltages generated by the multi-value voltage generation means from a regulated voltage generated by the voltage regulation means, wherein:

the voltage regulation means comprises a first voltage generation means for generating a first, constant voltage from a supply voltage; an adder means for adding to the first voltage a second voltage that does not depend on the first voltage; and a control means for variably controlling the second voltage within a predetermined voltage regulation range that is defined to include the first voltage;

the multi-value voltage generation means comprises a voltage divider means for dividing a regulated voltage generated at the voltage regulation means, thus generating divided voltages by divider terminals thereof; and a plurality (at least three) of impedance conversion means connected between the divider terminals and the objects to be driven for converting the impedances of the divided voltages generated at the divider terminals, thus generating multi-value driving supply voltages intended for capacitive objects to be driven; and the configuration is such that a first impedance conversion means having a drive portion that draws in a large positive charge is connected to an object to be driven when the polarity of the charge that must be transferred from the object to be driven to the impedance conversion means during the drive period is positive in total, and a second impedance conversion means having a drive portion that draws in a large negative charge is connected to an object to be driven when the polarity of the charge that must be transferred from the object to be driven to the impedance conversion means during the drive period is negative in total.

In accordance with the present invention, the multi-value voltage generation means can be used to generate multi-value driving supply voltages whose impedances have been converted, based on a supply voltage regulated by the voltage regulation means. This ensures that the multi-value driving supply voltages generated by the multi-value voltage generation means can be regulated. Further, multi-value supply voltages that are appropriate for the loads applied to the driving supply voltages can be supplied to the capacitive objects to be driven. If devices such as operational amplifiers are used for voltage regulation in the voltage regulation means, these operational amplifiers can also be used as impedance conversion means in the multi-value voltage generation means. This enables the design of even smaller devices.

A liquid crystal display device of this invention comprises a voltage regulation means, wherein supply voltages for driving liquid crystal elements are regulated by the voltage regulation means, thus regulating contrast for a liquid crystal display, and wherein:

the voltage regulation means comprises a first voltage generation means for generating a first, constant voltage from a supply voltage; an adder means for adding to the first voltage a second voltage that does not depend on the first voltage; and a control means for variably controlling the second voltage within a predetermined voltage regulation range that is defined to include the first voltage.

In accordance with the present invention, the contrast of the liquid crystal display is regulated by having the voltage regulation means regulate the supply voltages for driving liquid crystal elements. In other words, regulation of a voltage that acts as reference for the contrast regulation, such as a central value, is enabled by regulating the first voltage. The user of the liquid crystal display device can then obtain any desired contrast by regulating the second voltage. In this case, regulating the first voltage to change the central or other value will have no effect on the second voltage. Therefore, the central or other value, the second voltage, and the voltage regulation range can be set individually and independently, to enable contrast regulation that is superior to that of the prior art. This enables the provision of the optimal contrast regulation method for the liquid crystal display devices that are often used in portable electronics equipment where small size and light weight are necessary.

A liquid crystal display device of this invention comprises a multi-value voltage generation means and is configured to use a 6-level drive method to drive a liquid crystal element that is an object to be driven, on the basis of multi-value driving supply voltages generated by the multi-value voltage generation means; wherein:

the multi-value voltage generation means comprises a voltage divider means for generating divided voltages at divider terminals thereof, and a plurality of impedance conversion means connected between the divider terminals and the objects to be driven for converting the impedances of the divided voltages generated at the divider terminals, thus generating multi-value driving supply voltages intended for capacitive objects to be driven; and if supply voltages for driving liquid crystal elements by using the 6-level drive method are termed driving supply voltages at a zero level, a first level, a second level, a third level, a fourth level, and a fifth level from a high-potential side, each of the second and fourth levels of driving supply voltage is generated by a first impedance conversion means having a drive portion that draws in a large positive charge from the object to be driven to the impedance conversion means, and each of the first and third levels of driving supply voltage is generated by a second impedance conversion means having a drive portion that draws in a large negative charge from the object to be driven to the impedance conversion means.

In accordance with the present invention, the second and fourth levels of driving supply voltage, where the charge that must be transferred to the impedance conversion means is positive in total, are generated by a first impedance conversion means having a drive portion that draws in a large positive charge. Similarly, the first and third levels of driving supply voltage, where the charge is negative in total, are generated by a second impedance conversion means having a drive portion that draws in a large negative charge. This enables the provision of six supply voltages that are suited to loads applied to the driving supply voltages, for a liquid crystal element. As a result, phenomena such as shadows and cross-talk that could occur during liquid crystal display are efficiently prevented from occurring, so that the liquid crystal display quality can be improved and a device with an extremely low power consumption can be designed.

BRIEF DESCRIPTION OF THE DRAWINGS

FIG. 15 shows the process of calculating the load applied to V2 in FIG. 14, and the calculation results obtained thereby;

FIG. 17 shows the process of calculating the load applied to V2 in FIG. 16, and the calculation results obtained thereby;

FIG. 19 shows the process of calculating the load applied to V2 in FIG. 18, and the calculation results obtained thereby;

FIG. 21 shows the process of calculating the load applied to V2 in FIG. 20, and the calculation results obtained thereby;

FIG. 22 shows the process of calculating the load applied to V1 when the voltage of the segment electrode changes from V5 to V2, or from V5 to V0, at the FR switchover point A, and the calculation results obtained thereby;

FIG. 23 shows the process of calculating the load applied to V1 when the voltage of the segment electrode changes from V3 to V2, or from V3 to V0, at the FR switchover point A, and the calculation results obtained thereby;

FIG. 24 shows the process of calculating the load applied to V1 when the voltage of the segment electrode changes from V0 to V2, or from V0 to V0, during the period B, and the calculation results obtained thereby;

FIG. 25 shows the process of calculating the load applied to V1 when the voltage of the segment electrode changes from V2 to V2, or from V2 to V0, during the period B, and the calculation results obtained thereby.

FIG. 26 lists all the results of calculating the load on V1 to V4;

FIG. 31 is a characteristic graph that illustrates the voltage changes of V1, V2, V3, V4 and V5 when the power is turned on;

DETAILED DESCRIPTION

Preferred embodiments of this invention are described below.

First Embodiment

Figure 1:
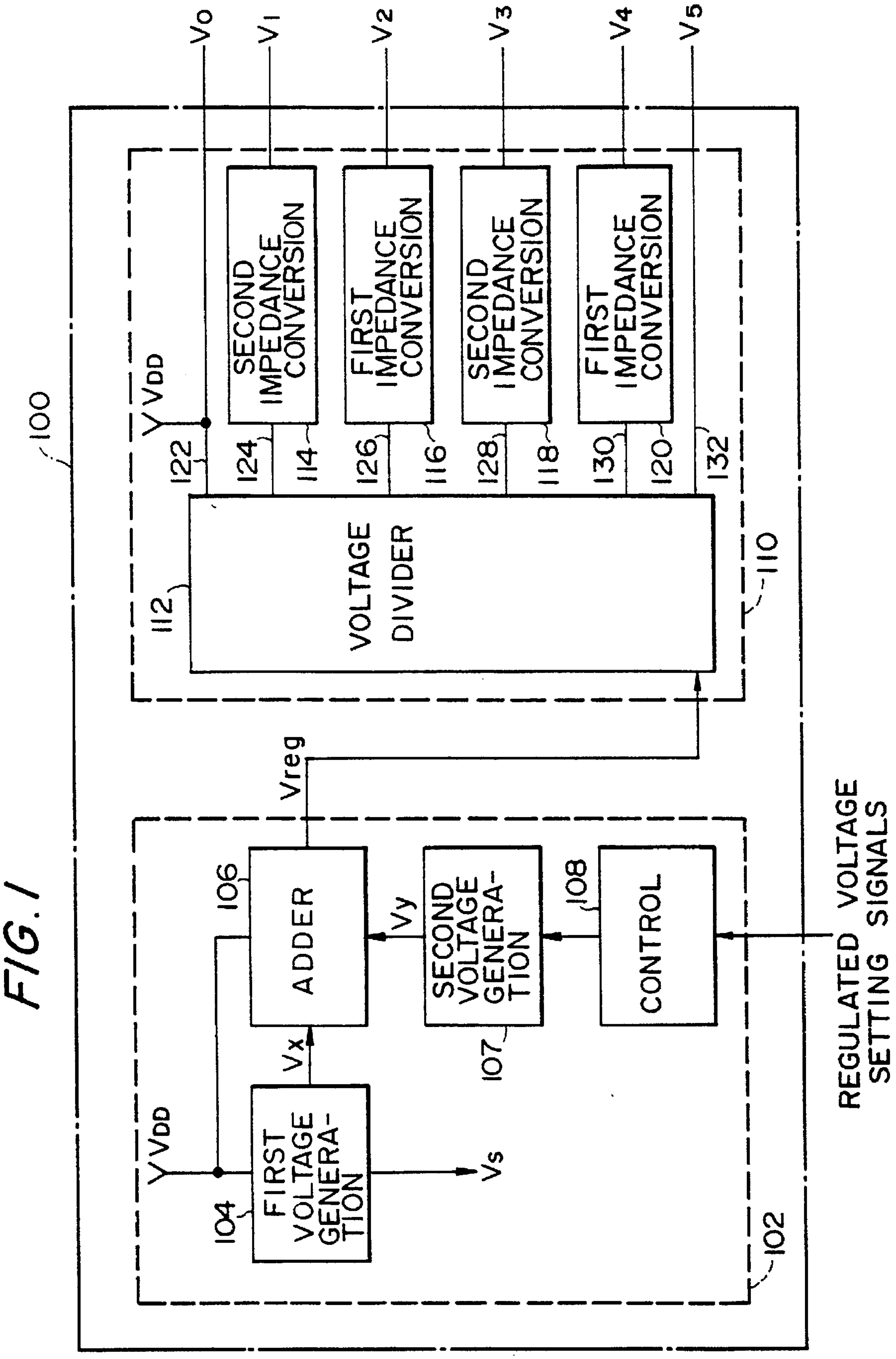
FIG. 1 is a block diagram of a power supply device according to a first embodiment of this invention.

A first embodiment of this invention is shown in FIG. 1. A power supply device 100 of this first embodiment comprises a voltage regulation portion 102 and a multi-value voltage generation portion 110, as shown in FIG. 1, and it generates from a supply voltage multi-value supply voltages V0 to V5 for liquid crystal.

In this case, the voltage regulation portion 102 comprises a first voltage generation portion 104, an adder portion 106, a second voltage generation portion 107, and a control portion 108, and it generates a regulated voltage Vreg.

Figure 2A:
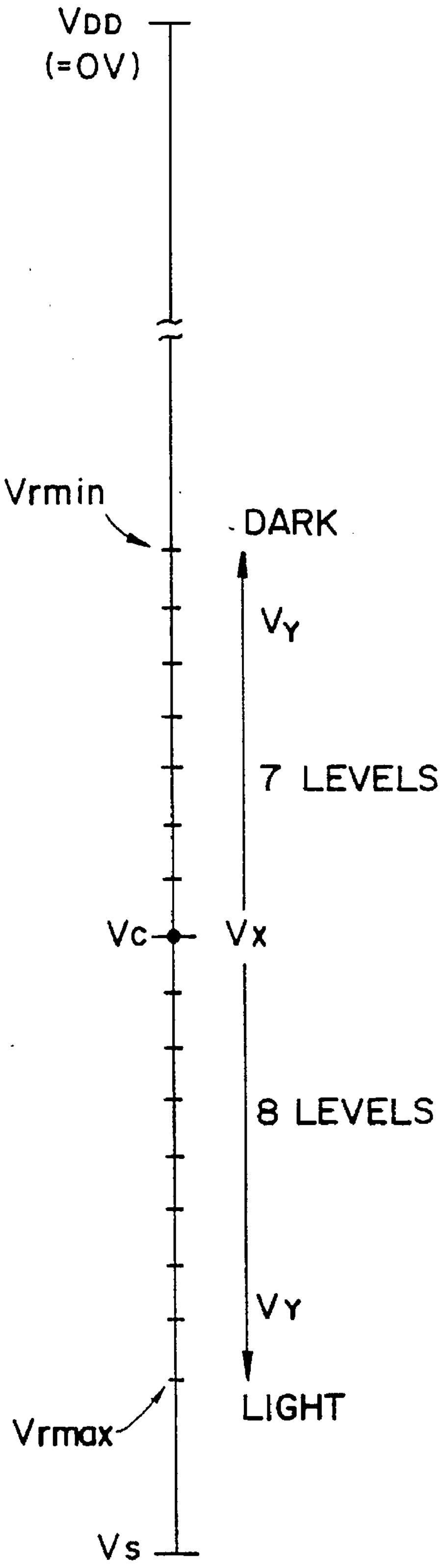
FIG. 2A and FIG. 2B are diagrams illustrating the voltage regulation method of the first embodiment.

The first voltage generation portion 104 has the function of generating a first voltage Vx from supply voltages VS and VDD. Assume that, for example, a central value Vc for providing contrast regulation for a liquid crystal display is positioned as shown in FIG. 2A. In this case, first voltage generation portion 104 is made to generate the first voltage Vx such that, for example, Vx=Vc. The second voltage generation portion 107 generates a second voltage Vy independently of the generation of the above first voltage. In this case, the second voltage Vy is variably controlled by the control portion 108 within a predetermined voltage regulation range that is defined to include the first voltage Vx. This variably controlled second voltage Vy is added in the adder portion 106 to the above first voltage Vx, and thus the regulated voltage Vreg is generated.

In the example shown in FIG. 2A, a positive or negative value of the second voltage Vy is added to the first voltage Vx to generate the regulated voltage Vreg. Whatever value of second voltage Vy is added is determined by regulated-voltage setting signals that are input to the control portion 108.

Thus, in this first embodiment, a variable second voltage Vy that does not depend on the value of the first voltage Vx is added to Vx to generate the regulated voltage Vreg. Therefore, if, as shown for example in FIG. 2B, the central value for contrast regulation is changed by variations occurring during the manufacture of the semiconductor device or liquid crystal element, the above described problem with the prior art technology will not occur. In other words, in this case, the first voltage Vx is first adjusted to match any change in the central value Vc, so that Vx=Vc. Then, if the variably controlled second voltage Vy is added to the first voltage Vx, the desired regulated voltage Vreg can be obtained. This enables the user to adjust the contrast of the liquid crystal display to any desired brightness. This arrangement differs from the prior art example shown in FIG. 35A and FIG. 35B in that contrast regulation can be performed within a range of substantially the same size on both the upper side and the lower side.

Figure 2B:
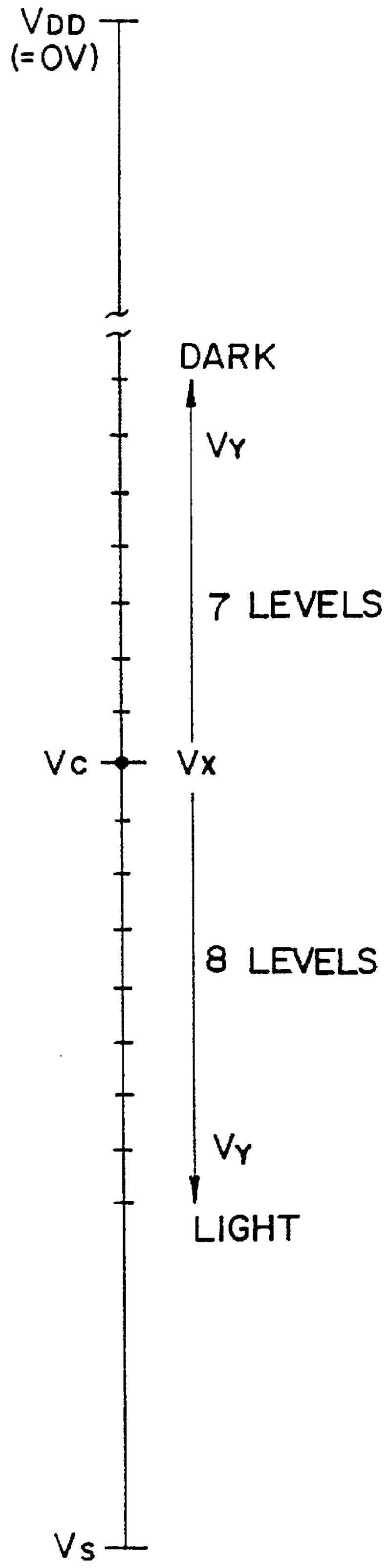

Note that it is not always necessary to make the first voltage Vx equal to the central value; it could be made equal to either Vrmax or Vrmin in FIG. 2A and FIG. 2B. If Vx is made equal to Vrmax, the second voltage Vy added for voltage regulation would have a positive value; if Vx is made equal to Vrmin, it would have a negative value.

The multi-value voltage generation portion 110 will now be described. In this first embodiment, the multi-value voltage generation portion 110 comprises a voltage divider portion 112 and first and second impedance conversion portions 114, 116, 118 and 120. The voltage divider portion 112 performs dividing between the regulated voltage Vreg and the supply voltage VDD, and divided voltages are output from divider terminals 122, 124, 126, 128, 130 and 132. In this case, the divider terminals 126 and 130 are connected to first impedance conversion portions 116 and 120, and supply voltages V2 and V4 which have been impedance-converted are supplied therefrom to a capacitive liquid crystal element. Similarly, divider terminals 124 and 128 are connected to second impedance conversion portions 114 and 118, and supply voltages V1 and V3 that have been impedance-converted are supplied therefrom to the capacitive liquid crystal element.

In the type of liquid crystal drive called the 6-level drive method, as will be described later, it has been found that the polarities of charge that must be moved from the liquid crystal element to the power supply device during the drive period differ according to the type of the supply voltage. For example, it has been found that the polarity of this charge at V2 and V4 is positive. Conversely, the polarity of this charge at V1 and V3 is negative. That is why, in this embodiment, first impedance conversion portions 116 and 120, each having a drive portion that draws in a large positive charge, are connected to V2 and V4. Similarly, second impedance conversion portions 114 and 118, each having a drive portion that draws in a large negative charge, are connected to V1 and V3. This ensures that the voltage averaging (equalization) state of the 6-level drive method can be maintained, and the phenomena of shadows and cross-talk are prevented from occurring. As a result, the liquid crystal display quality can be increased to extremely high levels.

Second Embodiment

The description now turns to a second embodiment of the present invention. This second embodiment illustrates a specific configuration of a voltage regulation portion 102.

Figure 3:
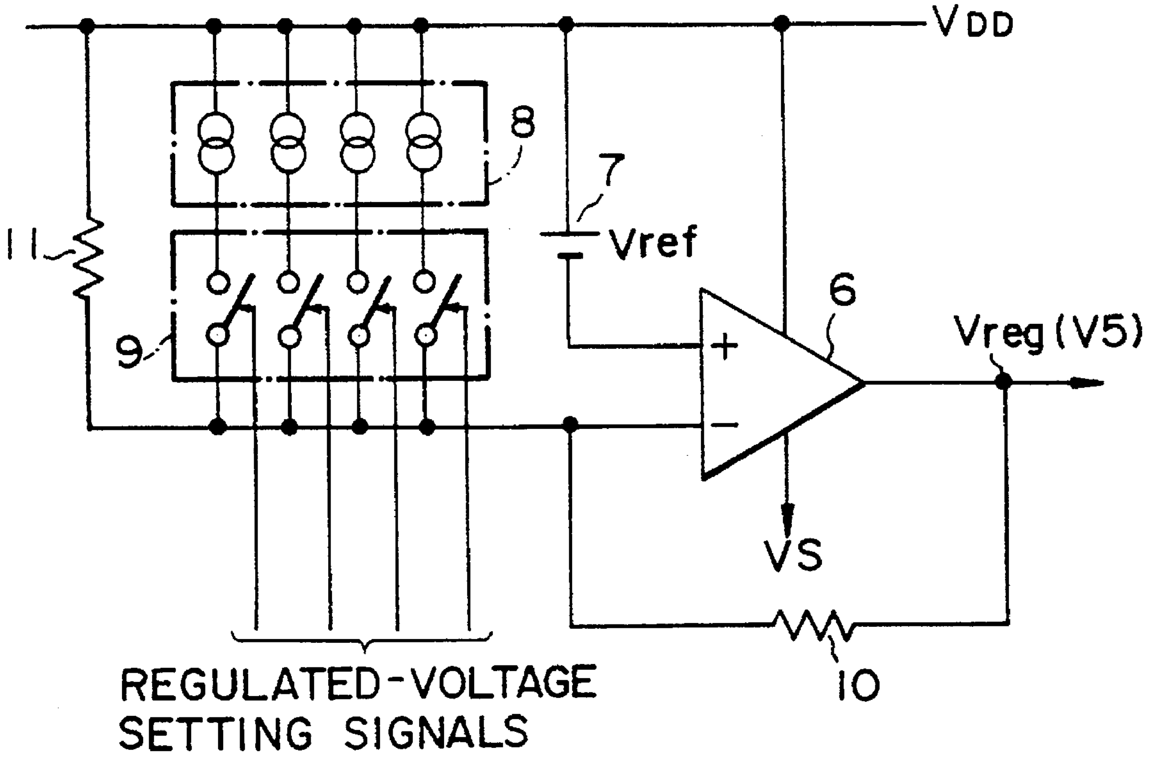
FIG. 3 is a circuit diagram of a voltage regulation portion according to a second embodiment of this invention.

The voltage regulation portion of the second embodiment shown in FIG. 3 comprises an OP-amp 6, a reference voltage source 7, a constant-current source 8 having a plurality of current sources, and a control portion 9 having a plurality of switches. A positive input terminal (first input terminal) of the OP-amp 6 is connected to the reference voltage source 7 and a negative input terminal (second input terminal) thereof is connected to one end of each of resistors 10 and 11 and to an output terminals of the control portion 9. The other end of the resistor 10 is connected to the output terminal of the OP-amp 6, and the other end of the resistor 11 is connected to a fixed potential VDD. The control portion 9 is positioned between the constant-current source 8 and the negative input terminal of the OP-amp 6. The magnitude of the current flowing from the constant-current source 8 to the resistor 10 is controlled on the basis of the regulated-voltage setting signals, and voltage regulation is performed by changing this current magnitude.

The regulated voltage Vreg (connected to V5) that is an output of the voltage regulation portion is the sum of the first voltage Vx and the second voltage Vy, as given by the following equation:

$$Vreg=Vx+Vy \qquad \text{Equation 5}$$

In this case, if the resistance of the resistor 10 is R10, the resistance of the resistor 11 is R11, and the voltage of the reference voltage source 7 is Vref, the first voltage Vx can be expressed by the following generalized equation for the output voltage at the OP-amp:

$$Vx=(1+R10/R11)\cdot Vref \qquad \text{Equation 6}$$

The second voltage Vy is determined by a current I10 flowing from the constant-current source 8 via the control portion 9 to the resistor 10. In this case, the current I10 can be varied by selectively turning on the switches in the control portion 9 by the regulated-voltage setting signals. Therefore, the second voltage Vy is given by the following equation:

$$Vy=I10\cdot R10 \qquad \text{Equation 7}$$

Thus, the regulated voltage Vreg is given by the following equation:

$$Vreg=(1+R10/R11)\cdot Vref+I10\cdot R10 \qquad \text{Equation 8}$$

If, for example, the maximum value of the current I10 flowing from the constant-current source 8 to the resistor 10 is assumed to be Imax and the minimum value is assumed to be Imin, the voltage regulation range Vrange is given by the following equation:

$$Vrange=(Imax-Imin)\cdot R10 \qquad \text{Equation 9}$$

It is clear from Equations 6 to 9 that, in accordance with this embodiment, Vy is determined by R10 and thus the voltage regulation range Vrange is also determined thereby. Similarly, Vx is determined by R11, and thus the voltage that acts as reference for voltage regulation is determined thereby. This voltage that acts as reference for voltage regulation could be, as described above, the central value of the voltage regulation range, or it could be the maximum or minimum value thereof. Thus, in accordance with the voltage regulation portion of this embodiment, each of the values of Vx, Vy, and Vrange can be set independently.

Figure 4:
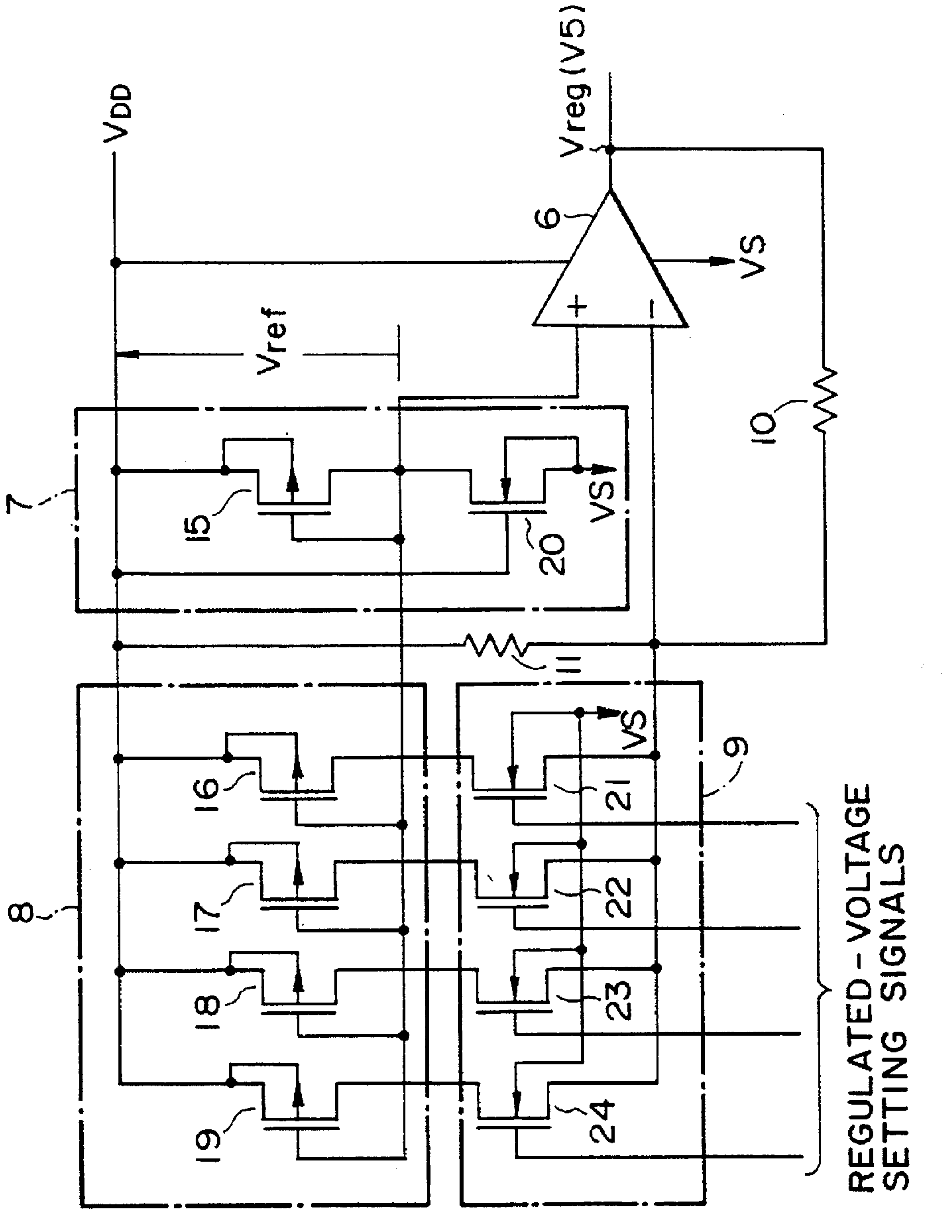
FIG. 4 is a circuit diagram of the voltage regulation portion of FIG. 3, when the reference voltage source, constant-current source, and control portion are configured of MOS transistors.

An example of the circuitry when the reference voltage source 7, constant-current source 8, and control portion 9 of FIG. 3 are configured of MOS transistors is shown in FIG. 4.

The reference voltage source 7 comprises a p-channel transistor 15 and an n-channel transistor 20. The magnitude of Vref generated by the reference voltage source 7 can be made virtually the same as the threshold voltage of the p-channel transistor 15 by reducing the current capability of the n-channel transistor 20 and reducing the current flowing between the power sources. The constant-current source 8 comprises p-channel transistors 16 to 19. The constant-current source 8 provides a constant current by making use of the constant-current characteristic when saturated of the p-channel transistors 16 to 19 whose gate electrodes are connected to the reference voltage Vref. The control portion 9 comprises p-channel transistors 21 to 24 that are connected to the drain regions of the p-channel transistors 16 to 19 respectively, and the passing and cutting off of the current is switched by the regulated-voltage setting signals connected to the gate electrodes of the p-channel transistors 21 to 24. In this case, assume that the weighting of the values of the currents flowing from the plurality of current sources within the constant-current source 8 is $2^n$. In other words, if the magnitudes of currents from the current sources are in the ratios 8:4:2:1, four regulated-voltage setting signals enables voltage regulation over $2^4=16$ steps. Note that FIG. 3 and FIG. 4 show an example with four regulated-voltage setting signals, but of course it is possible to set a different number of signals than that of FIG. 3 and FIG. 4. Note further that, since the regulated-voltage setting signals can be obtained as binary signals from registers written to by means such as a microprocessor, control by microprocessor is facilitated.

Figure 33:
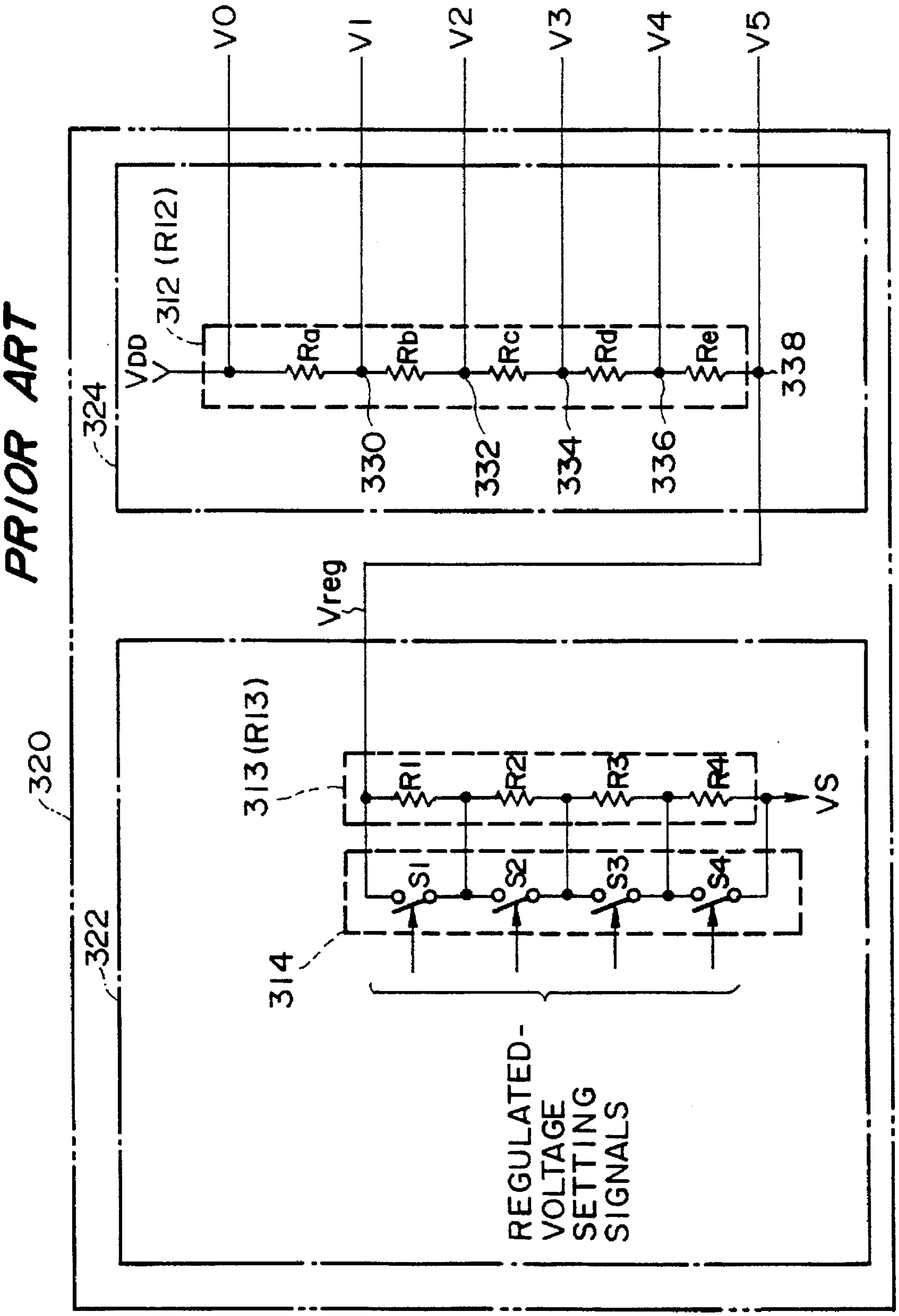
FIG. 33 PRIOR ART
FIG. 33 shows one example of a prior art power supply device used in a device such as a liquid crystal display device.

In accordance with this embodiment, if the configuration is such that the resistance of the resistor 10 is fixed and there is means of varying the resistance of the resistor 11, the voltage that acts as reference for voltage regulation, such as the central value, can be changed while the voltage regulation range is maintained. Therefore, if variations should occur during the manufacture of the semiconductor device or liquid crystal element, these variations can be compensated for by adjusting the resistance of the resistor 11 by the above resistance variation means. In other words, assume that the adjustment is such that Vx is made to match the central value Vc for contrast regulation, as shown for example in FIG. 2. Since the resistance of the resistor 10 is fixed, it is clear from Equation 9 that the voltage regulation range does not change, even if the resistance of the resistor 11 changes. Thus the desired regulated voltage Vreg can be obtained within this unchanging voltage regulation range by using the regulated-voltage setting signals. With the prior art power supply devices shown in FIG. 33 and FIG. 34, if the central value Vc that is the voltage that acts as reference for voltage regulation should change, as shown in FIG. 35A and FIG. 35B, it becomes impossible to provide voltage regulation (contrast regulation) within substantially the same range above and below this value. Therefore, each of these prior art power supply devices is configured with an excessively large voltage regulation range, to ensure that voltage regulation can be provided over a sufficiently broad range if there should be any change in the voltage that acts as reference for voltage regulation. In other words, it is configured such that the voltage-divider resistor 313 of FIG. 33 and FIG. 34 has an excessive number of divisions.

In contrast, the necessary lower limit required for the voltage regulation range can be fixed by this embodiment, since the voltage regulation range does not change even if the voltage that acts as reference for voltage regulation changes. This means that the number of current sources in the constant-current source 8 for voltage regulation and the number of switches in the control portion 9 can be set to the necessary lower limits. Note further that this means that, if voltage regulation control signals can be obtained as binary signals from registers written to by means such as a microprocessor, the numbers of bits in the registers can be set to the necessary lower limit and the linking wiring can also be reduced.

If a prior art power supply device has been adjusted to allow for manufacturing variations, data on the number of divisions in the voltage-divider resistor after the adjustment (that is, the (0111) and (0100) data of FIG. 35A and FIG. 35B) must be stored in means such as non-volatile memory. However, since this embodiment makes it possible to adjust to allow for manufacturing variations by varying the resistance of the resistor 11, it is no longer necessary to store such data.

Further, if control is by microprocessor and the current from the constant-current source 8 has been cut in answer to a system reset signal, the output voltage of the voltage regulation portion is determined solely by the resistances of the resistors 10 and 11. Therefore, there is no need to include a variation-adjustment program in the firmware, nor is there need for circuitry to detect the output voltage of the voltage regulation portion. For example, if the current from the constant-current source 8 is set to be cut in this way at system reset, Vx can be equal to the minimum value Vrmin shown in FIG. 2A. Further, if the configuration is such that some of the switches in the control portion 9 are turned on at system reset, Vx can be equal to the central value Vc, for example, as shown in FIG. 2A.

Figure 5:
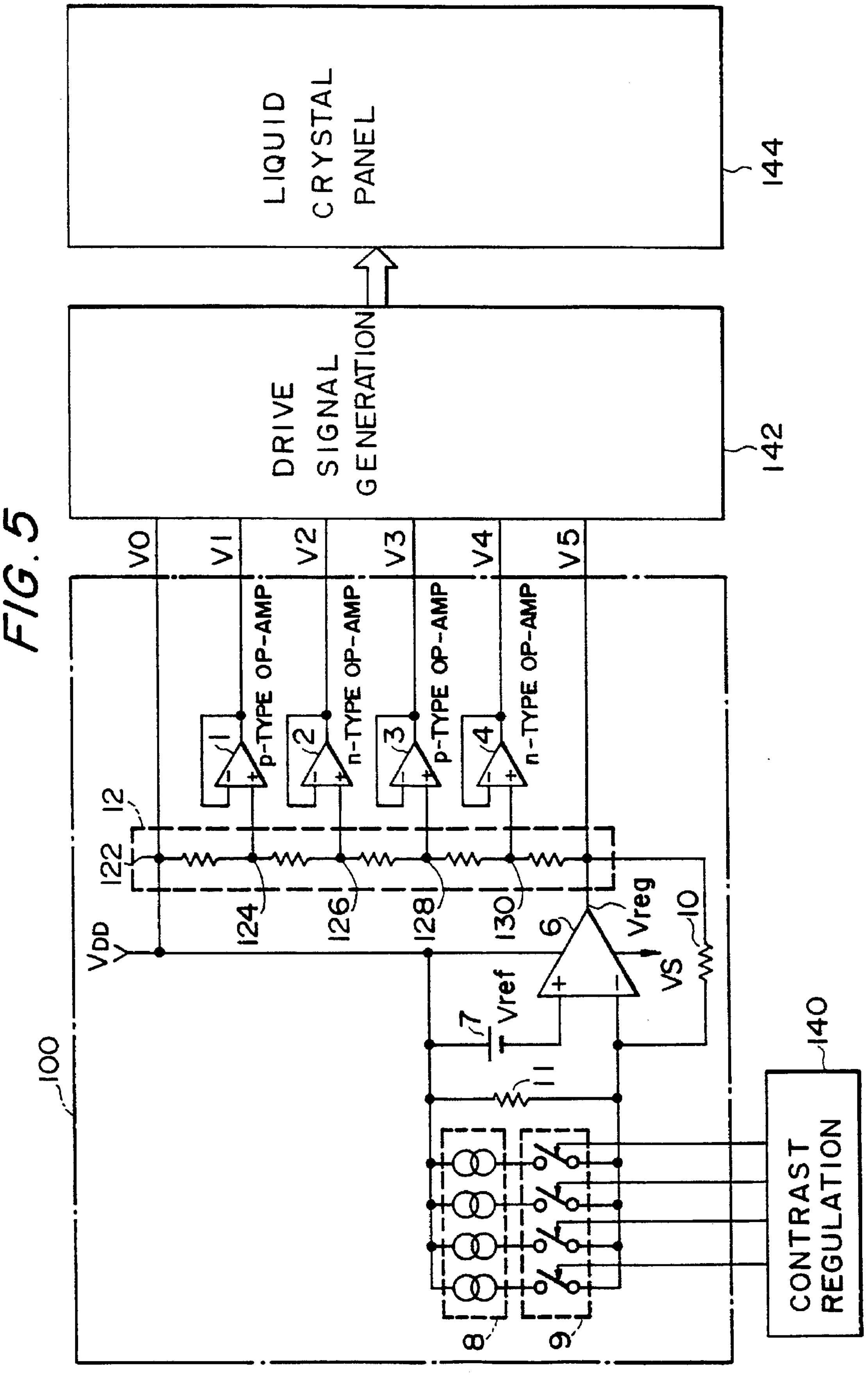
FIG. 5 is a circuit diagram of an example of a liquid crystal display device that uses the power supply device of this invention.

An example of a liquid crystal display device using the power supply device of this invention is shown in FIG. 5. This liquid crystal display device comprises a power supply device 100, a contrast regulation portion 140, a drive signal generation portion (LCD driver) 142, and a liquid crystal panel 144.

The regulated voltage Vreg that is an output of the voltage regulation portion is supplied to the drive signal generation portion 142 as supply voltage V5 for liquid crystal drive, and is also connected to one end of the voltage-divider resistor 12 of which the other end is connected to a fixed potential. Voltages divided by the voltage-divider resistor 12 are connected to positive input terminals of voltage-follower connected OP-amps 1 to 4, and outputs of the OP-amps 1 to 4 are input to the drive signal generation portion 142 as supply voltages V1, V2, V3, and V4. Note that in this case, the divider terminals 126 and 130 are connected to n-type OP-amps 2 and 4 and the divider terminals 124 and 128 are connected to p-type OP-amps 1 and 3 respectively. These OP-amps will be described in detail later. Note also that the OP-amp 6 in the voltage regulation portion can provide impedance conversion for V5, which can reduce the number of circuit elements.

The drive signal generation portion 142 generates drive signals by selecting any of these driving supply voltages V0 to V5 on the basis of, for example, the 6-level drive method. These drive signals are used to drive liquid crystal elements. If the user performs an operation to regulate the contrast by the contrast regulation portion 140, the value of Vreg is regulated by regulated-voltage setting signals that are output by the contrast regulation portion 140. The voltages V1 to V5 supplied to the liquid crystal panel 144 are regulated in this manner, to provide contrast regulation for the liquid crystal display.

In this case, the regulated voltage Vreg output from the voltage regulation portion bears no relationship to the resistance of the voltage-divider resistor 12, as shown by Equation 8. Therefore, the current flowing between the power sources can be made extremely small by increasing the resistance of the voltage-divider resistor 12. This makes it possible to design for extremely low power consumptions in the power supply device and liquid crystal display device.

The power supply device of this embodiment can be applied to a liquid crystal display device, as described above, and, since a liquid crystal display device is light and has a low power consumption, it is often used in portable electronics equipment where small size and light weight are necessary. Therefore, equipment provided with such a liquid crystal display device ought to make the most of the inherent advantages of a liquid crystal display device (small size and light weight), where smaller and less power-hungry circuits are requested. The power supply device of this embodiment is effective means of answering these requests when used in a liquid crystal display device.

The effect of this embodiment will now be described from the viewpoint of the stability of the circuitry.

In this embodiment, the value of Vx, which is the voltage that acts as reference for voltage regulation, is determined by the value of the reference voltage Vref and the resistance ratio of the resistors 10 and 11, as is clear from Equation 6. In contrast, in the prior art examples shown in FIG. 33 and FIG. 34, the voltage that acts as reference for voltage regulation is determined by resistance-division of the voltage difference between the supply voltages VDD and VS. Therefore, the prior art examples had the problem that a change in the supply voltage would cause a change in the voltage that acts as reference for voltage regulation. However, with this embodiment, Vx is kept constant even if the supply voltage should change.

Further, in this embodiment, the voltage Vy that determines the voltage regulation range is determined by the value of the current I10 flowing in the resistor 10 from the constant-current source 8 via the control portion 9 and the resistance of the resistor 10, as shown by Equation 7. The current I10 from the constant-current source 8 remains constant even if the supply voltage changes. This means that Vy can also be kept constant with respect to changes in the supply voltage, so that the voltage regulation range Vrange also remains constant. For example, FIG. 4 shows an example in which the constant-current source 8 of FIG. 2 or FIG. 3 is configured of transistors, where the gate voltage of a transistor operating in the constant-current region is obtained from the reference voltage Vref and, since the gate voltage is held fixed, the drain current is also fixed. This ensures that the current flowing from the constant-current source is constant, even if the supply voltage changes, and thus Vy and Vrange are also fixed.

As described above, this embodiment makes it easy to obtain stable values of the regulated voltage Vreg (=Vx+Vy) and the voltage regulation range Vrange, independent of changes in the supply voltage. This means that stable operation is enabled, irrespective of the supply voltage, when this embodiment makes use of a battery as power source in equipment that has a wide operating voltage range. Contrast regulation in a liquid crystal display device is particularly dependent on this regulated voltage. Therefore, if this embodiment is applied to a liquid crystal display device that is used in equipment that has a wide operating voltage range, the voltage of the driving power source is held fixed and thus fixed contrast can be obtained, irrespective of the supply voltage. In the same way, the voltage regulation range can also be held fixed despite changes in the supply voltage. Therefore, in accordance with this embodiment, the display quality can be greatly improved and also the product value can be raised to an extremely high level.

A further problem occurs if the element characteristics of the object to be driven, which is the destination of the regulated voltage, has temperature characteristics, in which case it is desirable for the regulated voltage to have a temperature characteristics to compensate for these temperature characteristics of the object to be driven. The display quality, for example, of a liquid crystal display element is heavily dependent on the surrounding temperature, so, in order to ensure constant display quality, it is desirable to drive the liquid crystal display with voltages that have negative temperature characteristics with respect to the ambient temperature. In the prior art, the usual method of implementing such negative temperature characteristics involves connecting an element having temperature characteristics, such as a thermistor, to the voltage-divider resistor, to compensate the temperature characteristics.

This embodiment, however, is provided with temperature characteristics that compensate for the temperature characteristics of the object to be driven with respect to the first and second voltages Vx and Vy. References in the description below to FIG. 4 will make this clear. In other words, the value of the reference voltage Vref generated by the reference voltage source 7 is roughly the same as the threshold voltage of the p-channel transistor 15, as described above. Since the threshold voltage of a MOS transistor generally has a negative temperature characteristic, the first voltage Vx, which is determined by the value of this reference voltage Vref and the ratio of the resistances of the resistor 10 and the resistor 11, also has a negative temperature characteristic. Further, the magnitude of the current flowing from the constant-current source 8 is also dependent on the threshold voltage of the MOS transistor, and thus also has a negative temperature characteristic, so the second voltage Vy and the voltage regulation range Vrange have negative temperature characteristics as well. In other words, the device in accordance with this embodiment can possess negative temperature characteristics with respect to both the regulated voltage Vreg and the voltage regulation range Vrange. Thus, this embodiment makes it possible to provide the regulated voltage Vreg and the voltage regulation range Vrange with temperature characteristics, without having to add any element having temperature characteristics, such as a thermistor. This enables a reduction in the number of components, and, when the power supply device is incorporated into a semiconductor device, it makes it possible to reduce the number of external components and design a device that is smaller and less expensive.

Figure 6:
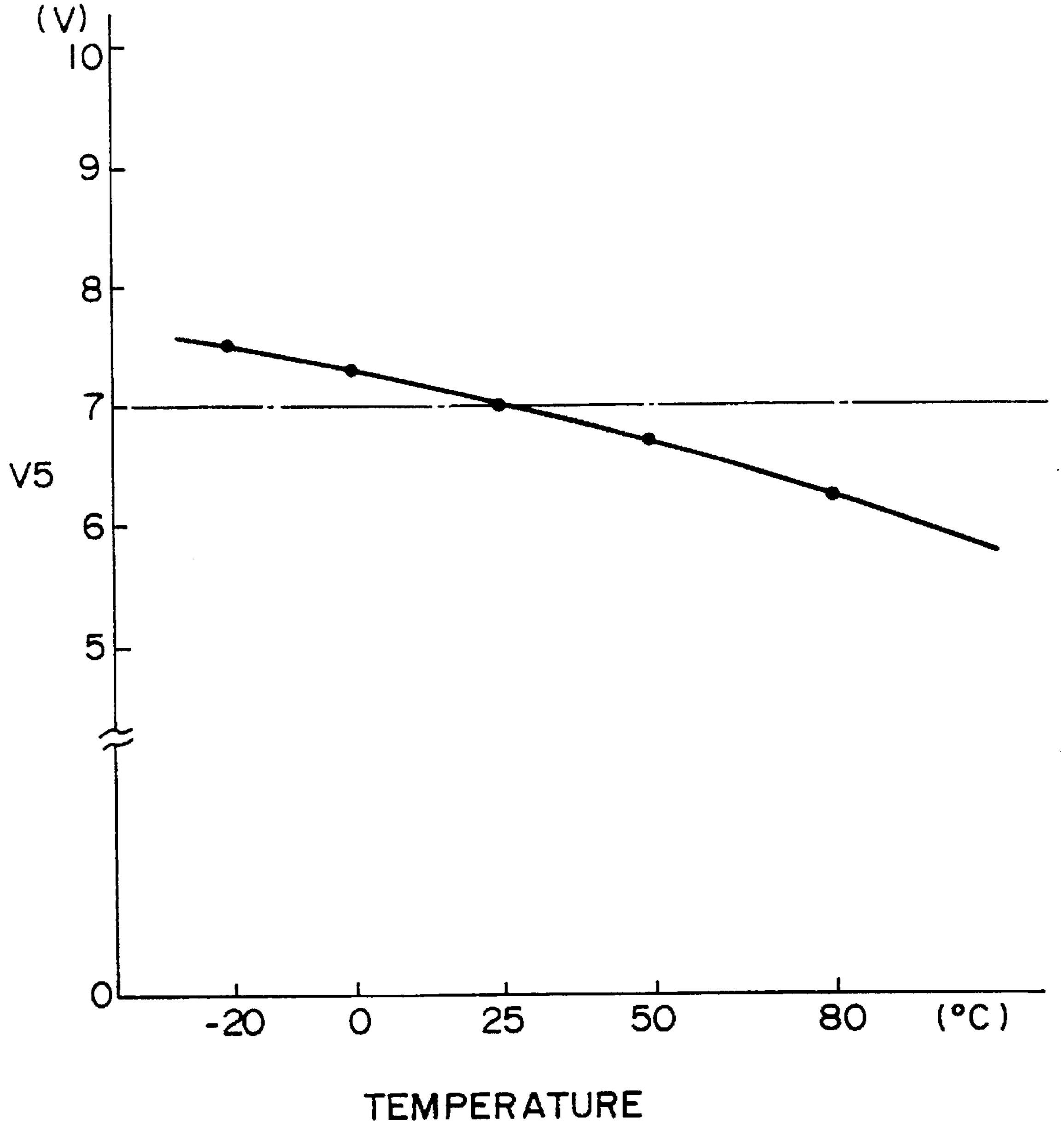
FIG. 6 is a graph of the temperature characteristic that appears in the driving supply voltage V5 in the second embodiment.

Note that FIG. 6 shows just one example of a temperature characteristic that can appear in the driving supply voltage V5 when this embodiment is used. As is clear from FIG. 6, V5 has a negative temperature characteristic. Therefore, if this V5 is used as a driving supply voltage for a liquid crystal element having a negative temperature characteristic, a liquid crystal display device with a good display quality can be obtained.

Further, if, for example, an element such as a resistor having a temperature characteristic that differs from that of a transistor is connected in series with the p-channel transistor 15 of the reference voltage source 7 or the p-channel transistors 16 to 19 of the constant-current source 8 in FIG. 4, the slope of the temperature characteristic curve can be changed, as shown in FIG. 6. This makes it possible to further increase the adaptability with the temperature characteristics of the liquid crystal element.

Details of prior art techniques that enable this type of compensation for temperature characteristics are given in Japanese Patent Laid Open Nos. Sho 57-88489, Sho 57-17995, Sho 56-142592, and Sho 56-89791.

Third Embodiment

A. Configuration

Next, a third embodiment of this invention will be described. This third embodiment illustrates a specific configuration of the multi-value voltage generation portion 110.

Figure 7:
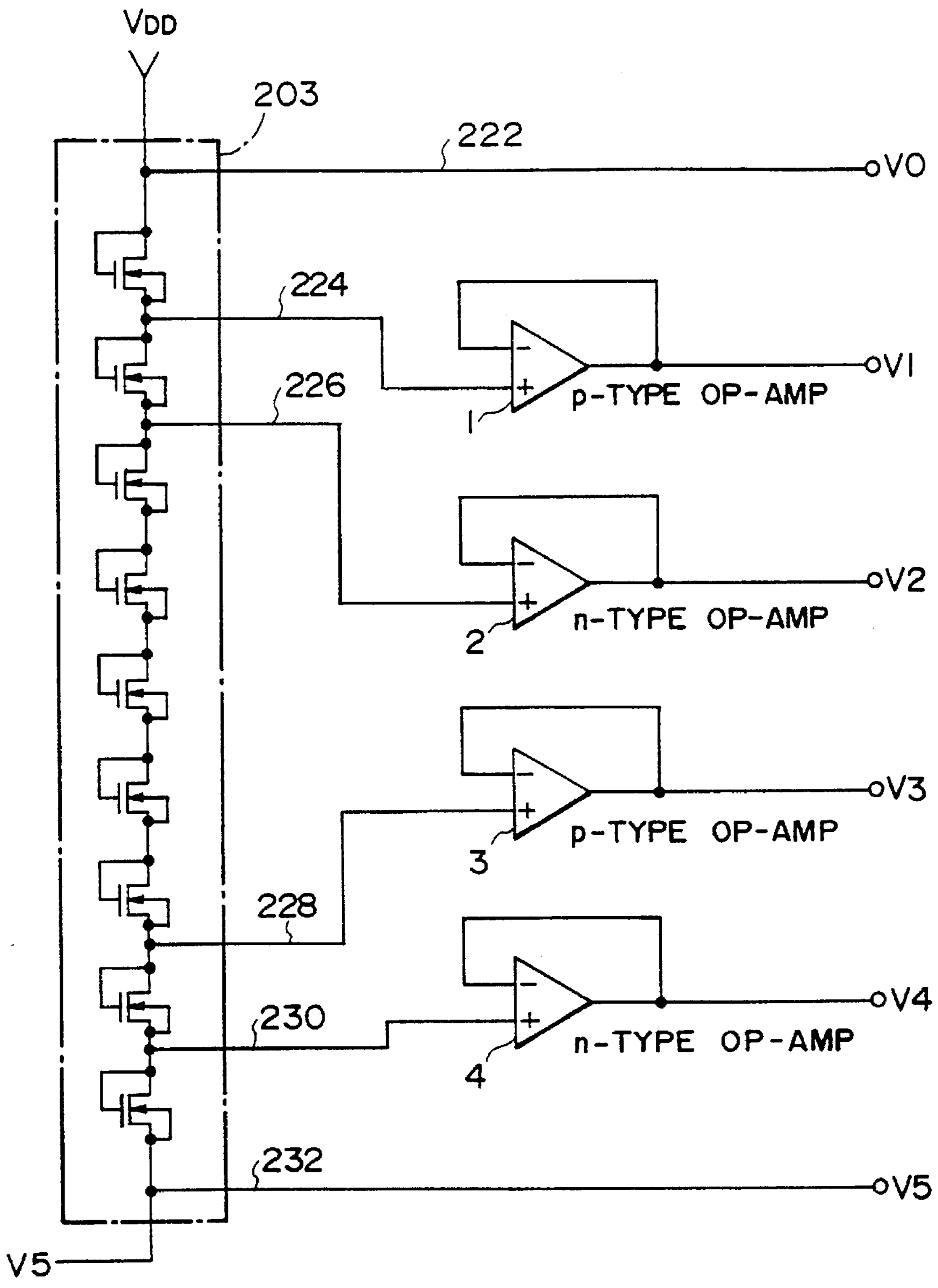
FIG. 7 is a circuit diagram of a multi-value voltage generation portion according to a third embodiment of this invention.
Figure 10:
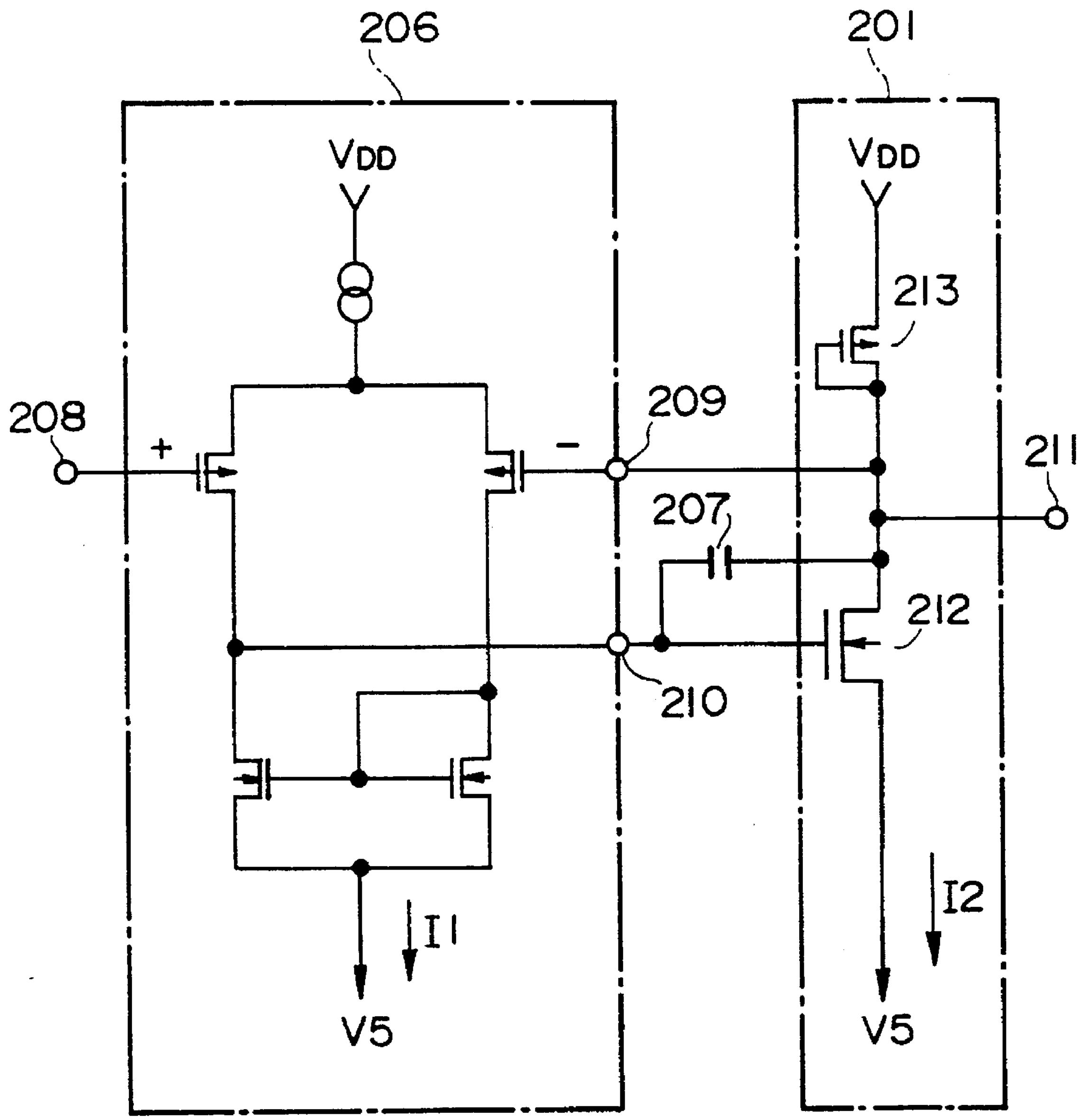
FIG. 10 is a transistor-level circuit diagram of an n-type OP-amp.

The multi-value voltage generation portion in accordance with this third embodiment comprises a voltage divider portion 203 and OP-amps 1 to 4, as shown in FIG. 7. The OP-amps 1 to 4 are connected to each of divider terminals 224, 226, 228 and 230 of the voltage divider portion 203, and supply the voltages V1 to V4, respectively. In this embodiment, OP-amps configured as shown in FIG. 8 (hereinafter called p-type OP-amps) are used as the OP-amps that supply V1 and V3, and OP-amps configured as shown in FIG. 10 (hereinafter called n-type OP-amps) are used as the OP-amps that supply V2 and V4.

The voltage divider portion 203 comprises nine transistors connected in series, with each drain region short-circuited to the corresponding gate electrode, and these transistors are used instead of resistors to divide the voltages. In this case, since these transistors are set to all have the same current supply capability, the voltages between V0 and V5 can be accurately divided by nine (1/9 bias). Of the voltages divided into nine in this manner, assume that the first voltage on the low side next to V0 is called V1 and the second voltage is called V2, and the first voltage on the high side next to V5 is called V4 and the second voltage is called V3. The voltage division could, of course, be done using a resistor as shown in the prior art examples of FIG. 33 and FIG. 34. However, in order to try to reduce the demand current, this resistor must have a large resistance, but the use of such a large resistance in an IC causes problems such as a large area is necessary and new fabrication processes must be added. In contrast, instead of large resistances, this embodiment uses transistors in which the drain region and gate electrode are short-circuited. This ensures that the consumption of current flowing though the voltage divider portion 203 can be restrained to the order of 0.2 μA.

Figure 8:
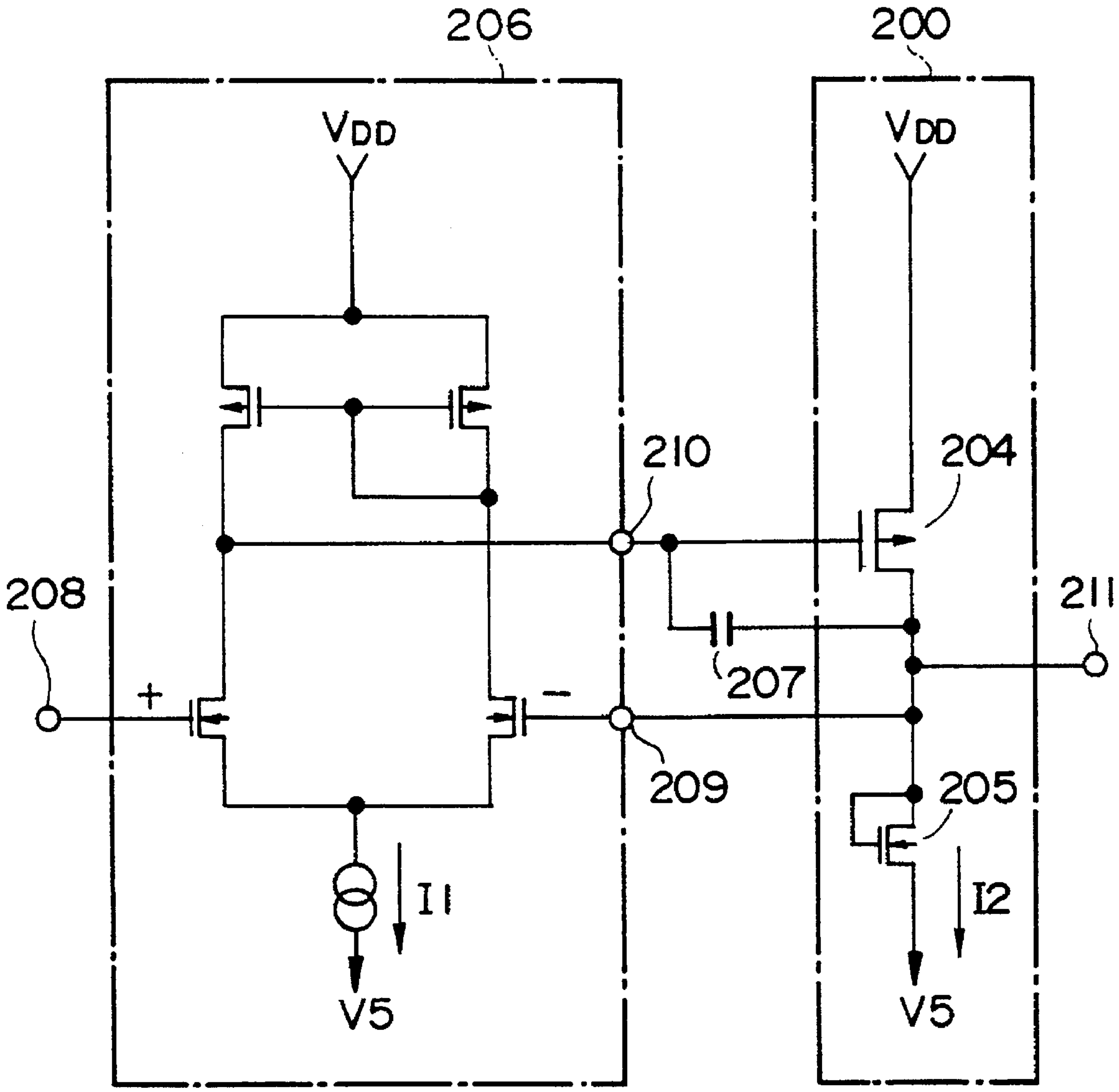
FIG. 8 is a transistor-level circuit diagram of a p-type OP-amp.

A transistor-level circuit diagram of the p-type OP-amp of FIG. 7 is shown in FIG. 8. This p-type OP-amp comprises a differential amplification portion 206 and a drive portion 200. The circuitry of the differential amplification portion 206 has two input terminals, a positive input terminal 208 and a negative input terminal 209 and one output terminal 210, and the manner in which the circuitry amplifies the voltage difference between the two input terminals and outputs it from the output terminal 210 is well known, so further description thereof is omitted. The drive portion 200 has a p-channel drive transistor 204 and an n-channel load transistor 205. Further, a capacitor 207 for preventing oscillation is provided between the differential amplification portion 206 and drive portion 200. The configuration is a voltage-follower connection, in other words, the configuration is such that the negative input terminal 209 of the differential amplification portion 206 is connected to an output terminal 211 of the OP-amp.

The p-channel drive transistor 204 and n-channel load transistor 205 in the drive portion 200 are connected in series, and this connection point is the output terminal 211 of the OP-amp. Connecting the drain region and gate electrode of the n-channel load transistor 205 together makes the transistor function as a resistor. The output terminal 211 of the OP-amp is connected to the negative input terminal 209 of the differential amplification portion 206, and the output terminal 210 of the differential amplification portion 206 is connected to the gate electrode of the p-channel drive transistor 204. Connecting the circuitry in this manner ensures that the voltage applied to the positive input terminal 208 appears at the output terminal 211 remaining the same level. The differential amplification portion 206 ensures that the positive input terminal 208 and the output terminal 211 of the OP-amp are at the same voltage by controlling the gate voltage of the p-channel drive transistor 204.

Note that the application of a constant voltage to the gate electrode of the n-channel load transistor 205 would make the transistor function as a constant-current source.

Figure 9:
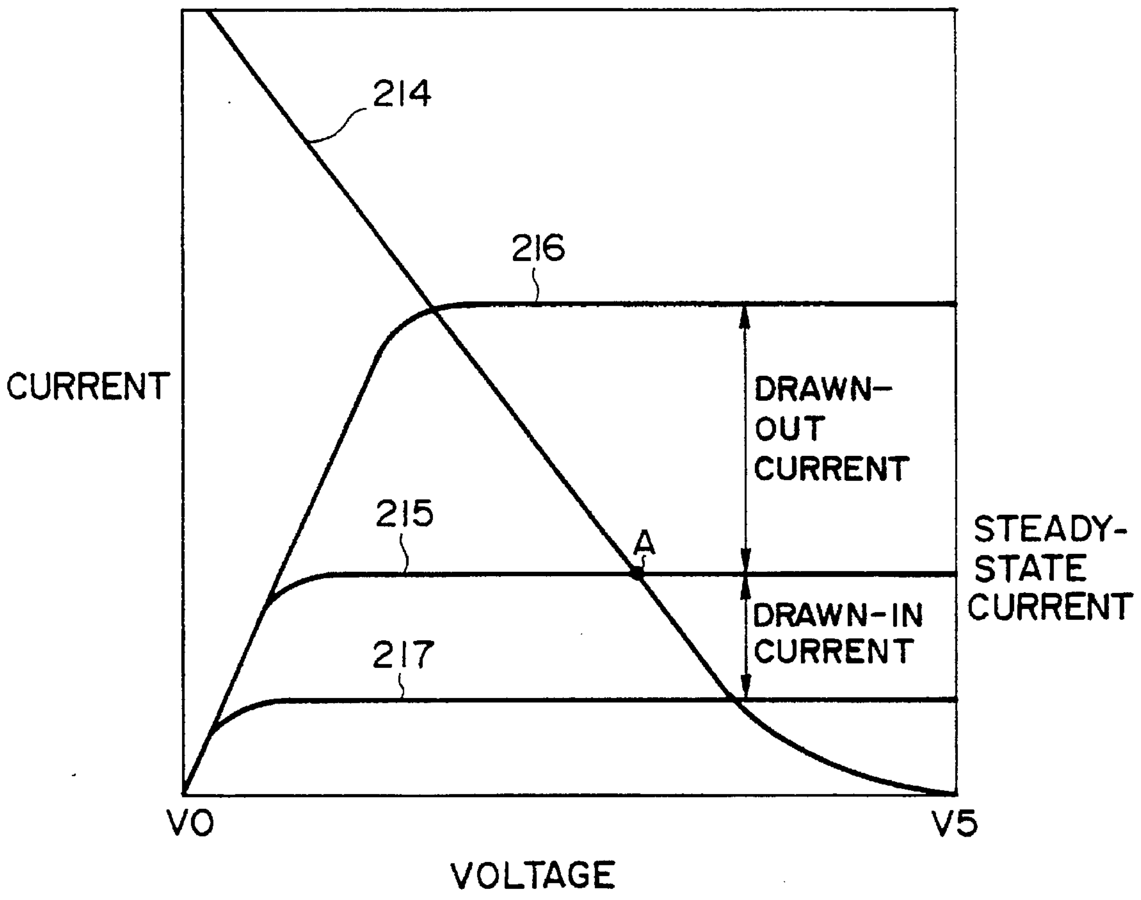
FIG. 9 is a graph of the current characteristics of an n-channel load transistor and a p-channel drive transistor.

The relationships between the current characteristics of the n-channel load transistor 205 and p-channel drive transistor 204 of the p-type OP-amp are shown in FIG. 9. In FIG. 9, a curve 214 shows the current characteristic of the n-channel load transistor 205 and a curve 215 shows that of the p-channel drive transistor 204 when there is no load on the output terminal 211 of the OP-amp. Further, a curve 216 shows the current characteristic of the p-channel drive transistor 204 when a negative load is applied to the output terminal 211 of the OP-amp and a curve 217 shows that when a positive load is applied to the output terminal 211 of the OP-amp.

Note that, in this case, apply a negative load means connect to a low-level voltage (potential) to draw out a current (draw in a negative charge to the drive portion), and apply a positive load means connect to a high-level voltage (potential) to draw in a current (draw in a positive charge to the drive portion).

When no load is applied to the output terminal 211 of the OP-amp, the current characteristic of the p-channel drive transistor 204 is as shown by the curve 215 in FIG. 9, and, at a point A at which this current characteristic 215 intersects the current characteristic 214 of the n-channel load transistor 205, a current is flowing as a steady-state current.

For example, consider a case in which a negative load is applied to the output terminal 211 of the OP-amp and the voltage at the output terminal 211 drops (connection to a low-level voltage, to draw out a current). Since the output terminal 211 of the OP-amp is connected to the negative input terminal 209, the voltage at the negative input terminal 209 drops. On the other hand, since the voltage at the positive input terminal 208 does not change, a voltage difference is generated between the positive input terminal 208 and negative input terminal 209, and the voltage at the output terminal 210 of the differential amplification portion 206 is amplified by the differential amplification portion 206 and drops. This causes a drop in the gate voltage supplied to the gate electrode of the p-channel drive transistor 204, increasing the current supply capability of the p-channel drive transistor 204. The current characteristic of the p-channel drive transistor 204 becomes the current characteristic 216 of FIG. 9, and the voltage of the output terminal 211 of the OP-amp is pulled up by the drawn-out current.

Now consider the opposite case in which a positive load is applied to the output terminal 211 of the OP-amp and the voltage at the output terminal 211 rises (connection to a high-level voltage, to draw in a current). In this case, the operation is completely opposite to the case in which a negative load is applied, in that the voltage at the output terminal 210 of the differential amplification portion rises when it is amplified by the differential amplification portion 206. This causes a rise in the gate voltage supplied to the gate electrode of the p-channel drive transistor 204, decreasing the current supply capability of the p-channel drive transistor 204. The current characteristic of the p-channel drive transistor 204 becomes the current characteristic 217 of FIG. 9, and the voltage of the output terminal 211 of the OP-amp is pulled down by the drawn-in current of the n-channel load transistor 205.

As described above, the voltage at the output terminal 211 of the OP-amp is always held at the same level as the voltage of the positive input terminal 208 of the differential amplification portion 206.

The demand current of this p-type OP-amp is determined by the total of a demand current I1 of the differential amplification portion 206 and a demand current I2 flowing between the p-channel drive transistor 204 and the n-channel load transistor 205. In this embodiment, the demand current I1 is restrained to be of the order of 0.7 μA. However, the steadily flowing demand current I2 bears no relationship with the current supply capability of the p-channel drive transistor 204 and is determined by the current supply capability of the n-channel load transistor 205. If the current supply capability of the n-channel load transistor 205 is small, the demand current I2 of the steadily flowing current is also small, but it cannot become extremely small. The reason why is because, when the voltage at the output terminal 211 of the OP-amp has risen (when a positive load has been applied), the capability of pulling that voltage down again is determined by the current supply capability of the n-channel load transistor 205. In other words, the voltage pulldown capability drops the more the demand current is restrained, and the demand current increases the more the voltage pulldown capability is increased.

However, as described later, the polarity of the charge that must be moved for each of V1 and V3 to the op-amp side during the drive period becomes negative. Thus, in this embodiment, V1 and V3 are each connected to an OP-amp having a drive portion 200 that draws in a large negative charge, in other words, a p-type OP-amp. This ensures that sufficient negative charge can be pulled in from both V1 and V3 during the drive period, and thus phenomena such as shadows and cross-talk can be prevented from occurring and deterioration of the display characteristics of the liquid crystal can be prevented. On the other hand, when a positive load is applied to a p-type OP-amp, a positive charge must be drawn in by the n-channel load transistor 205. However, with V1 and V3, the polarity of the charge that must be moved to the op-amp side during the drive period is negative. Therefore, in this embodiment configured such that V1 and V3 are connected to p-type OP-amps, the drive portion 200 of each p-type OP-amp is no longer required to be able to draw in so much of a positive charge. As a result, this embodiment makes it possible to hold the current supply capability of the n-channel load transistor 205 sufficiently low, so that the demand current I2 steadily flowing through the drive portion 200 can be restrained to be of the order of 15 μA. This ensures that the total demand current I1+I2 of each p-type OP-amp can be restrained to be of the order of 15.7 μA.

A transistor-level circuit diagram of the n-type OP-amp of FIG. 7 is shown in FIG. 10. This n-type OP-amp differs from the above p-type OP-amp in the configuration of a drive portion 201 thereof, where the drive portion 201 comprises an n-channel drive transistor 212 and a p-channel load transistor 213. The configuration of the negative input terminal 209 of the differential amplification portion 206 and the output terminal 211 of the OP-amp is such that they are in a voltage-follower connection.

The n-type OP-amp is similar to the p-type OP-amp in that the voltage at the output terminal 211 of the OP-amp is pulled doom if it is higher than the voltage at the positive input terminal 208, but pulled up if it is lower, so that the voltage at the positive input terminal 208 is always kept the same. However, the n-type OP-amp differs from the p-type OP-amp in that, if the voltage at the output terminal 211 of the OP-amp has risen (when a positive load has been applied) the voltage pulldown capability thereof is determined by the current supply capability of the n-channel drive transistor 212. It differs further from the p-type OP-amp in that, if the voltage at the output terminal 211 of the OP-amp has dropped (when a negative load has been applied) the voltage pullup capability thereof is determined by the current supply capability of the p-channel load transistor 213. In this case, short-circuiting the gate electrode and drain region of the p-channel load transistor 213 makes the transistor function as a resistor. Note that the application of a constant voltage to the gate electrode of the p-channel load transistor 213 would make the transistor function as a constant-current source.

The demand current I2 that flows steadily through the drive portion 201 of the n-type OP-amp bears no relationship with the current supply capability of the n-channel drive transistor 212, and decreases as the current supply capability of the p-channel load transistor 213 decreases. In other words, the voltage pullup capability drops the more the demand current is restrained, and the demand current increases the more the voltage pullup capability is increased.

However, as described later, the polarity of the charge that must be moved during the drive period for each of V2 and V4 to the op-amp side is positive. Thus, in this embodiment, V2 and V4 are each connected to an OP-amp having a drive portion 201 that draws in a large positive charge, in other words, an n-type OP-amp. This ensures that sufficient positive charge can be pulled in from both V2 and V4 during the drive period, and thus phenomena such as shadows and cross-talk can be prevented from occurring. On the other hand, when a negative load is applied to an n-type OP-amp, a negative charge must be drawn in by the p-channel load transistor 213. However, with V2 and V4, the polarity of the charge that must be moved to the op-amp side during the drive period is positive. Therefore, in this embodiment configured such that V2 and V4 are connected to n-type OP-amps, the drive portion 201 of each n-type OP-amp is no longer required to be able to draw so much of a negative charge. As a result, this embodiment makes it possible to hold the current supply capability of the p-channel load transistor 213 sufficiently low, so that the demand current I2 steadily flowing through the drive portion 201 can be restrained to be of the order of 15 μA. This ensures that the total demand current I1+I2 of each n-type OP-amp can be restrained to be of the order of 15.7 μA.

As described above, in accordance with this embodiment, the demand current of the voltage divider portion 203 is 0.2 μA and that of each of the p-type and n-type OP-amps is 15.7 μA. Therefore, the demand current of the entire multi-value voltage generation portion can be restrained to: $0.2+15.7\times4=63$ μA. In this manner, it is clear that, in order to reduce the demand current of the entire device to the maximum limit, without any drop in the liquid crystal display quality, it is best to connect an n-type OP-amp to each of the driving supply voltages (V2 and V4) where the polarity of the charge that must be transferred to the impedance conversion means during the drive period is positive, and connect a p-type OP-amp to each of the driving supply voltages (V1 and V3) where the polarity of that charge quantity is negative.

B. Calculation of loads on driving supply voltages

The description below concerns an example of driving an LCD panel of a certain size, concentrating on how loads are applied to V1 to V4, which are the driving supply voltages, when a simple matrix LCD is driven in a line-by-line scanning, time-division (multiplexed) manner.

Figures 11A, 11B:
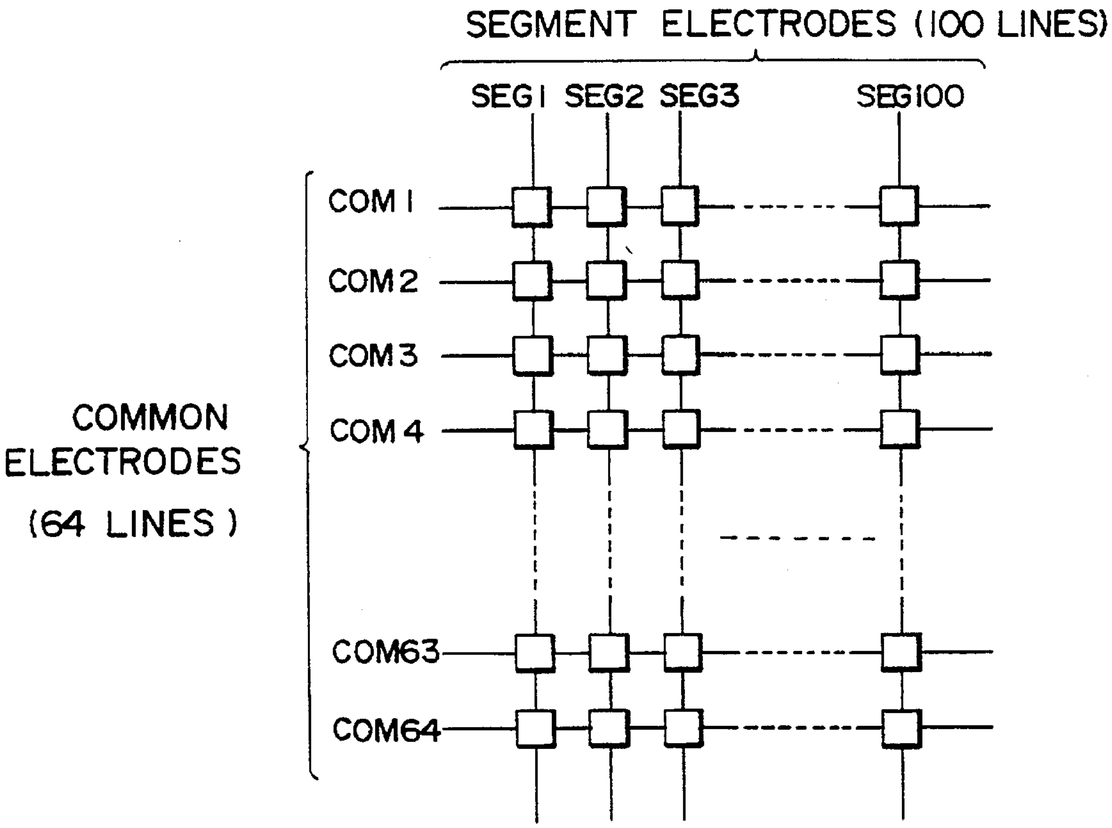
FIG. 11A is a table listing the relationships between the voltages of common and segment electrodes and the voltages V0 to V5.
FIG. 11B illustrates an example of the arrangement of common and segment electrodes.

The relationships between the common and segment electrode voltages and voltages V0 to V5 are listed in FIG. 11A. For example, the voltage of a common electrode is V5 (V0) during a period when the electrode is selected, and V1 (V4) when it is not selected. Further, when the voltage of a common electrode is V5 (V0), if the voltage of a segment electrode is V0 (V5), the corresponding pixel is lit; if it is V2 (V3), the pixel is not lit (values in parentheses are those when the FR signal is low). A typical arrangement of common and segment electrodes is shown in FIG. 11B.

The purpose of the calculations described below is to determine the relative sizes of maximum loads applied to the voltages V1 to V4. Therefore, the calculations are performed under the following conditions, in order to simplify them:

(1) The display capacity of the LCD panel is 64×100 pixels. In other words, the LCD panel is provided with 64 common electrode lines and 100 segment electrode lines (see FIG. 11B).

(2) Since there are 64 common electrode lines, time-division (multiplexed) drive is performed with a 1/64 duty cycle.

(3) The values of the driving supply voltages V0 to V5 are determined by the 1/9 bias given by the equations derived by the method of voltage averaging (amplitude selective addressing scheme), but, to make the calculations easy, they are taken to be: V0=0 V, V1=−1 V, V2=−2 V, V3=−7 V, V4=−8 V, and V5=9 V.

(4) To simplify the calculations, the capacity of one common electrode line is assumed to be 1 Farad (F).

Figure 12A:
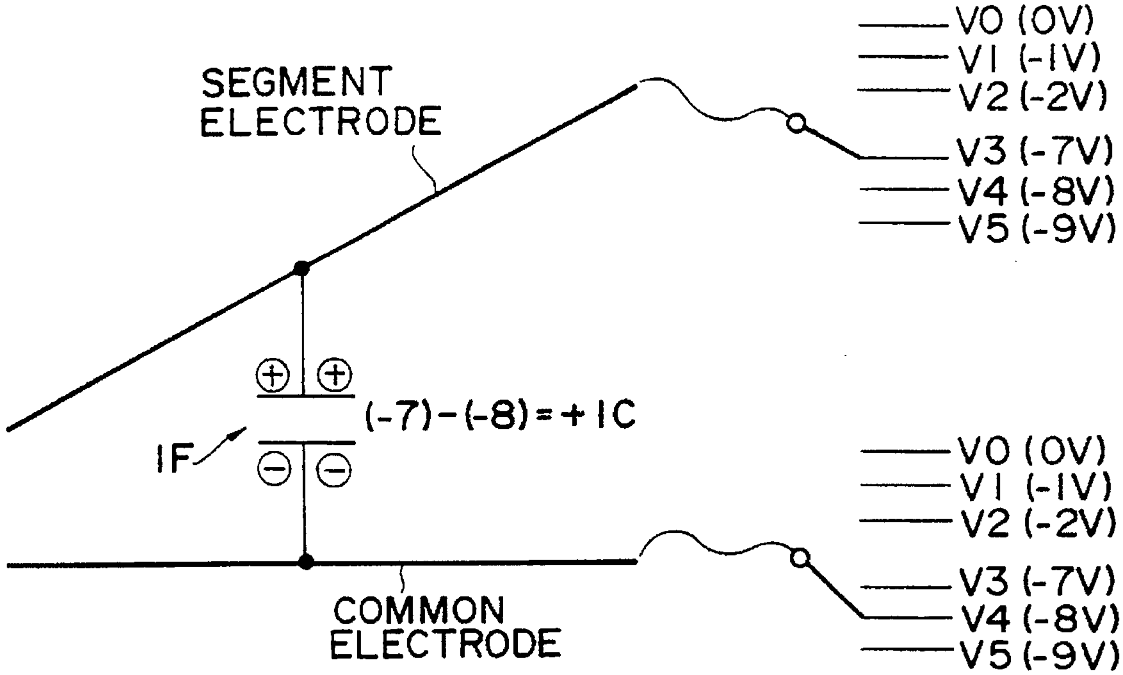
FIG. 12A and FIG. 12B are simple sketches showing how much charge must be moved at the driving supply voltages when the voltages of common and segment electrodes are changed.
Figure 12B:
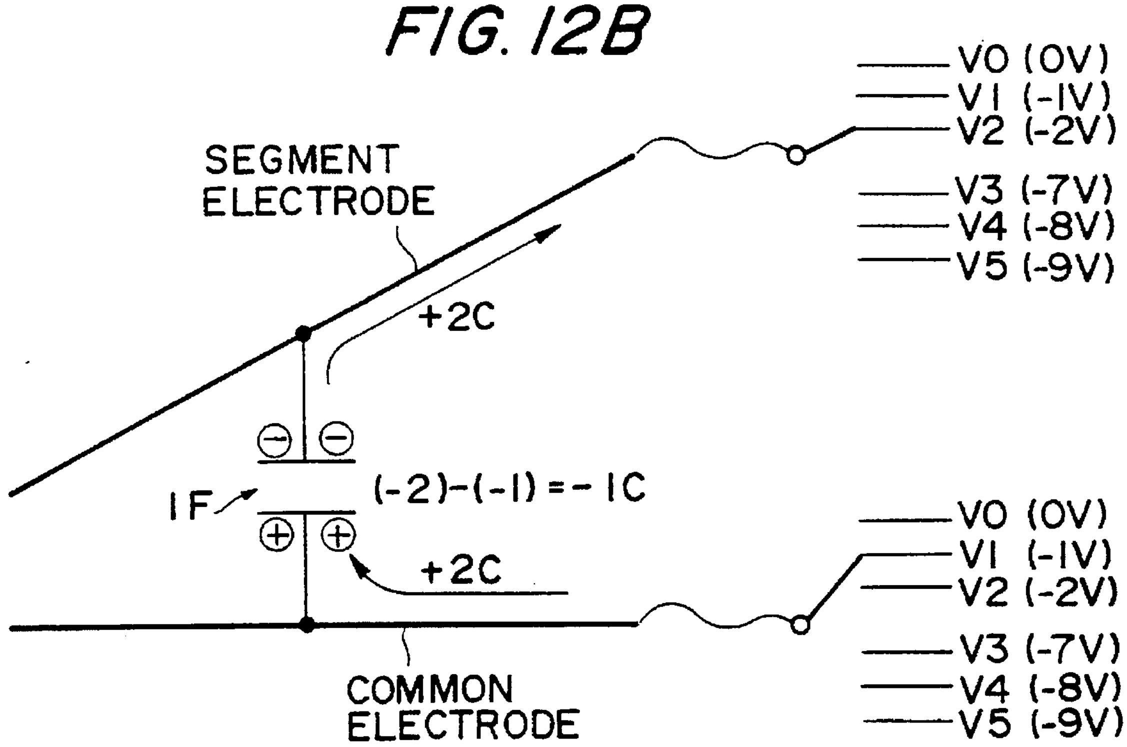

(5) Liquid crystal is a capacitive element, so an LCD element is electrically equivalent to a capacitor. Therefore, the quantity of charge that moves when charge is transferred through the electrodes at each end of the capacitor (that is, the common and segment electrodes) is given by: Q=C V (where Q is charge quantity, C is capacitance, and V is voltage), and the various magnitudes of Q can be considered to be loads applied to V1 to V4. For example, when a status in which the voltage at the segment electrode is V3 and the voltage at the common electrode is V4 changes such that the voltage at the segment electrode becomes V2 and that at the common electrode becomes V1, the amounts of charge that flow with respect to V2 are simply shown in FIG. 12A and FIG. 12B. In other words, in the status shown in FIG. 12A, the segment-electrode side of a equivalent capacitor (C=1 F) used to represent an LCD element is charged with: (−7)−(−8)=+1 coulomb (C). On the other hand, if status changes as shown in FIG. 12B, the segment-electrode side of the equivalent capacitor becomes charged with: (−2)−(−1)=−1 C. Therefore, as shown in FIG. 12B, a positive charge of +1−(−1)=2 C must be drawn into V2 by this change in status. In other words, in this case, a positive load of +2 is applied to V2.

(6) The values obtained by these calculations are the maximum values of the loads on V1 to V4. Therefore, when it comes to calculating these loads, the directions in which the voltages of all of the segment electrodes change can be considered to be the same. For example, when the segment electrode SEG1 of FIG. 11B changes from V3 to V2 and the segment electrode SEG2 changes from V5 to V2, there is no need to consider that the changes in voltage at the segment electrodes might be in different directions. This is because the magnitudes of the loads when these change directions are different would be smaller than when the voltages at all of the segment electrodes SEG1 to SEG100 have changed in the same direction (maximum load case).

Figure 13:
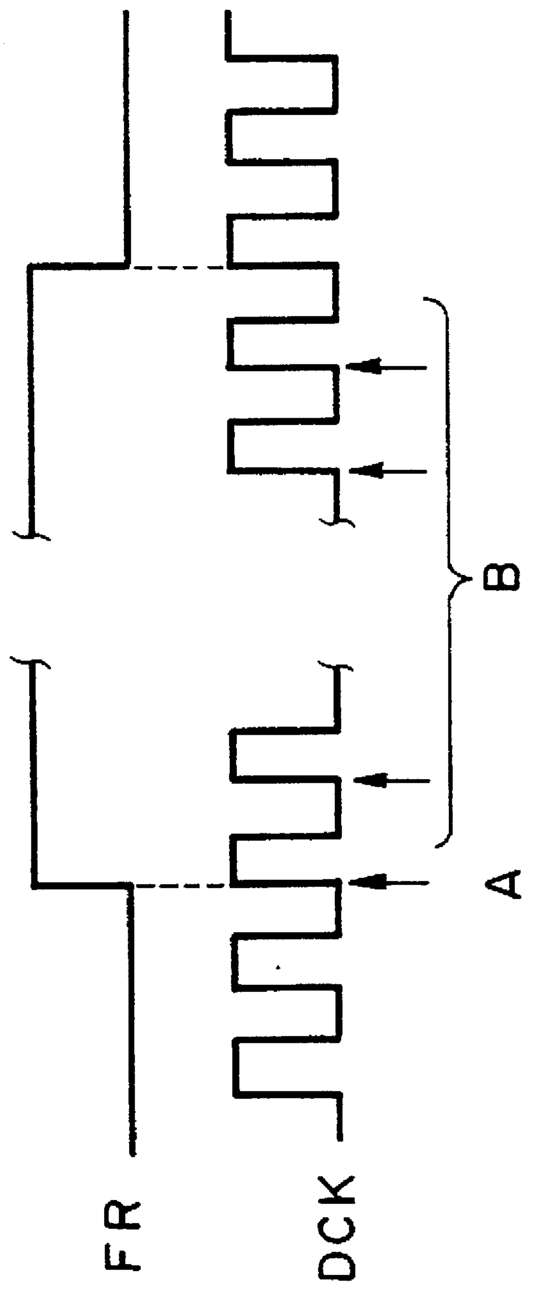
FIG. 13 is a timing chart of the FR signal and DCK signal.

(7) In these calculations, it is necessary to obtain the total amount of charges which flow through V1 to V4 during the drive period. In this case, it is assumed that the calculations are divided into two, for a switchover point A of the FR signal and a period B away from that point, as shown in FIG. 13. Note that, in FIG. 13, the FR signal is an alternation signal for liquid crystal drive, and DCK (dot clock) is a clock used as reference for the generation of drive signals.

Taking V2 as a specific example, the calculations below will deal with the loads applied to V2.

As shown in the table of FIG. 11A, the value at each segment electrode is any one of V0, V2 (when the FR signal is high), V5, and V3 (when the FR signal is low). Therefore, if the voltages at the segment electrode are considered to be changes into V2, there will be the changes of: V0→V2, V2→V2, V5→V2, and V3→V2. At the switchover point A of the FR signal, since this is a transition point between periods, the changes V0→V2 and V2→V2 can be ignored, and only the changes V3→V2 and V5→V2 need be considered. Further, during period B, the changes V3→V2 and V5→V2 can be ignored, since they occur within the same period, and only the changes V0→V2 and V2→V2 need be considered.

Figure 14:
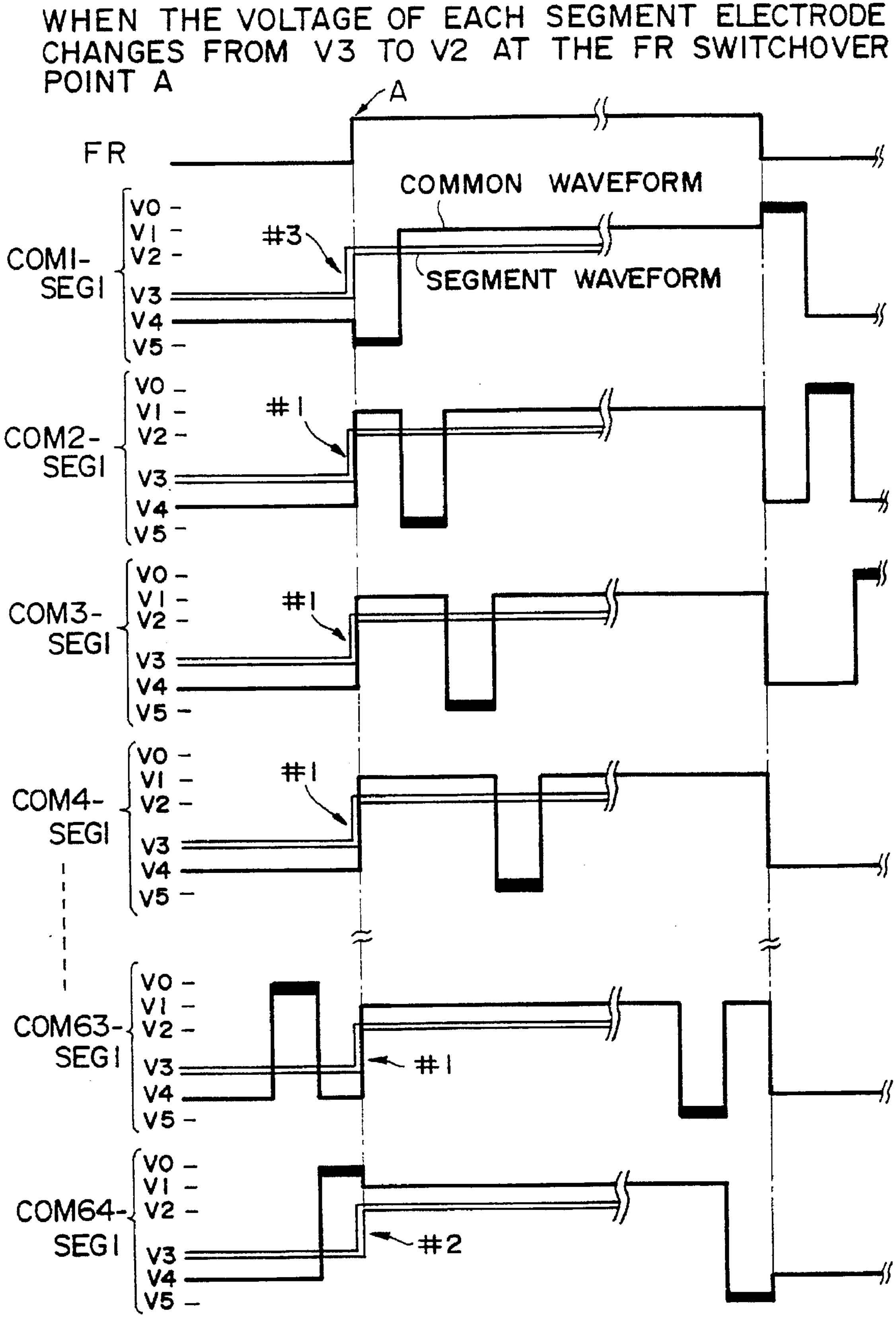
FIG. 14 are diagrams of common and segment waveforms obtained when the voltage of the segment electrode changes from V3 to V2 at the FR switchover point A.

The common and segment waveforms when the voltage of the segment electrode changes from V3 to V2 at the FR switchover point A are shown in FIG. 14. As shown in FIG. 14, segment electrodes are selected by the sequential shifting of the period in which the voltage reaches V5 (V0). Note that, as mentioned above, since it is permissible to consider only a change in direction of the voltages of all of the segment electrodes where they all change in the same direction, FIG. 14 shows only the relationships between COM1 to COM64 and SEG1.

During the calculation of loads, the lines can be considered to be divided into non-selected lines, selection-ended lines, and selection-started lines. In this case, non-selected lines are those which have not been selected by common signals; in FIG. 14, these are the 62 (64−2) lines marked #1. A selection-ended line is a line where the line before it has been selected; in FIG. 14, this is the line marked #2. A selection-started line is a line that has been selected by a common signal; in FIG. 14, this is the line marked #3. The load calculations refer to these lines #1, #2, and #3.

The process of calculating the load applied to V2 when the voltages of all of the segment electrodes change from V3 to V2 at the FR switchover point A is shown in FIG. 15, together with the calculation results. Assume that the segment electrode of each non-selected line (#1) changes from V3 to V2 and the common electrode changes from V4 to V1. Therefore, as previously shown with reference to FIG. 12A and FIG. 12B, the charge stored in the segment-electrode side of the equivalent capacitor that represents the LCD element changes from +1 C to −1 C. Therefore, the charge quantity that must be drawn into V2 in this case is +2 C. Since there are 62 non-selected lines (#1), as implied by FIG. 14, a total positive charge of 2×62=124 C must be drawn into V2.

The calculations for the selection-ended line (#2) and selection-started line (#3) can be done in a similar manner, as shown in FIG. 15. However, note that there is only one of each of these lines, as shown in FIG. 14. Thus, the total charge that must be drawn into V2 from these lines is small at −6 C for each.

From the above, the total charge when the voltage of the segment electrode changes from V3 to V2 at the FR switchover point A is: 124−6−6=+112 C. In other words, a positive load is applied to V2 in this case.

Figure 16:
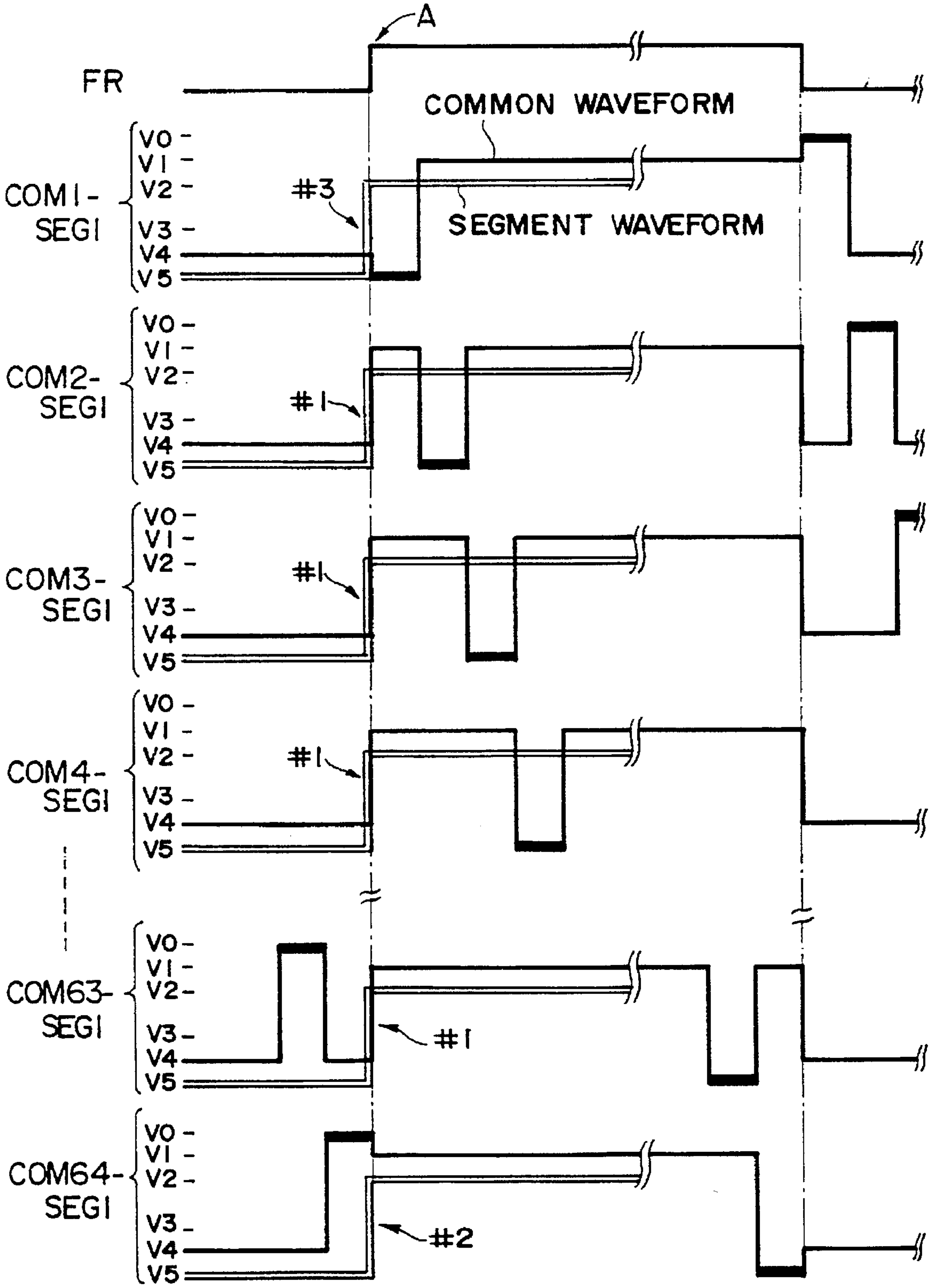
FIG. 16 are diagrams of common and segment waveforms obtained when the voltage of the segment electrode changes from V5 to V2 at the FR switchover point A.

The common and segment waveforms when the voltage of the segment electrode changes from V5 to V2 at the FR switchover point A are shown in FIG. 16. In the same manner as described with reference to FIG. 14, the calculations for FIG. 16 are divided into non-selected lines (#1), selection-ended line (#2), and selection-started line (#3). The calculation process and the results obtained in this case are shown in FIG. 17. As shown in FIG. 17, the total charge that must be drawn into V2 is −16 C. In other words, a negative load is applied to V2 in this case.

Figure 18:
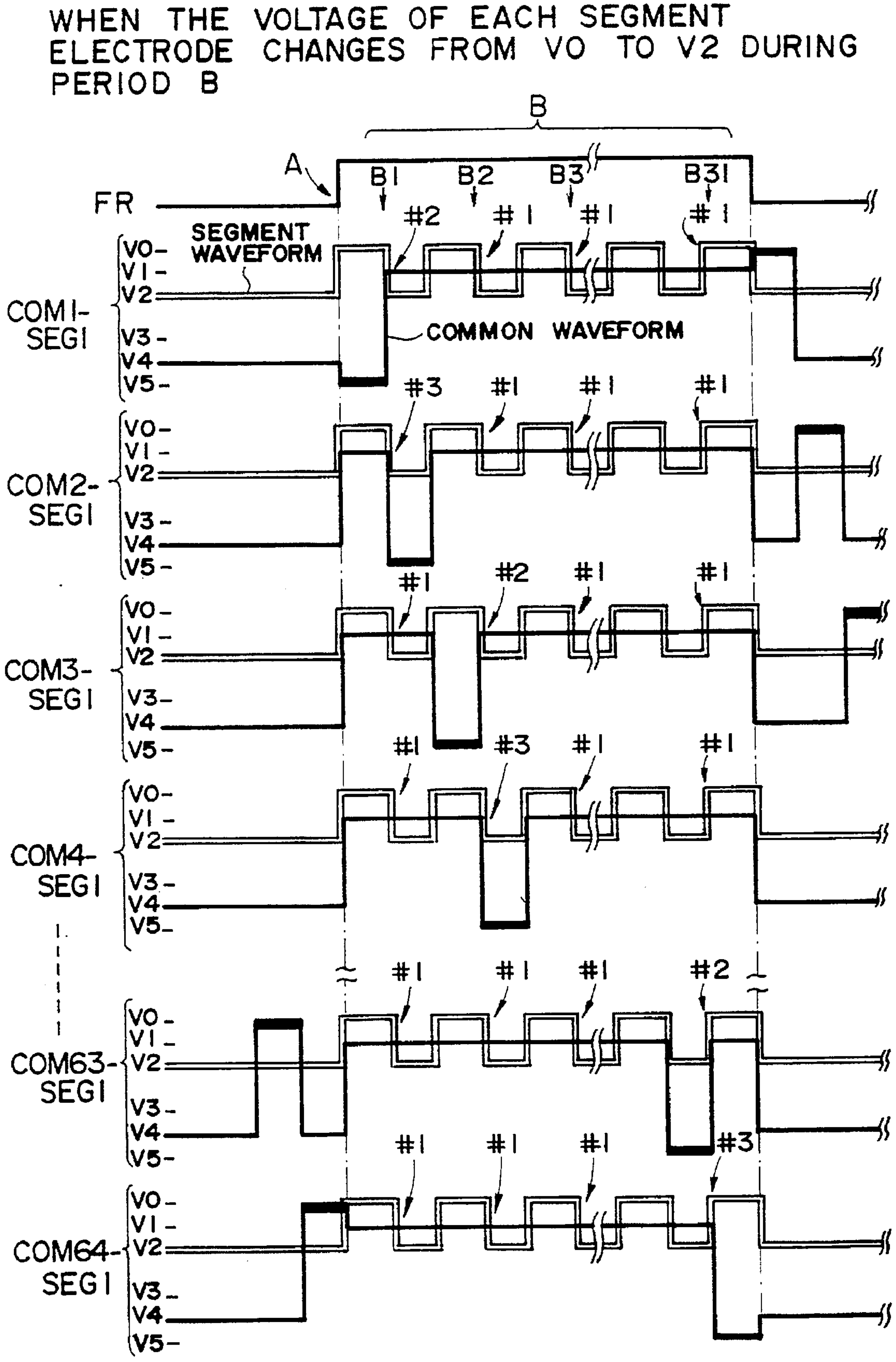
FIG. 18 are diagrams of common and segment waveforms obtained when the voltage of the segment electrode changes from V0 to V2 during the period B.

The common and segment waveforms when the voltage of the segment electrode changes from V0 to V2 during a period B is shown in FIG. 18. For example, at a point B1 in the period B, COM1 is a selection-ended line (#2), COM2 is a selection-started line (#3), and COM3 to COM64 are non-selected lines (#1). Similarly, at a point B2, COM1, COM2, and COM5 to COM64 are non-selected lines (#1), COM3 is a selection-ended line (#2), and COM4 is a selection-started line (#3). The statuses at points B3 to B31 can be considered in a similar manner.

In the same manner as described with reference to FIG. 14, the calculations for FIG. 18 are divided into non-selected lines (#1), selection-ended line (#2), and selection-started line (#3). The calculation process and the results obtained in this case are shown in FIG. 19. As shown in FIG. 19, the total charge that must be drawn into V2 in this case is +128 C. In other words, a positive load is applied to V2 in this case. Note that the calculation results obtained at each of points B1 to B31 in FIG. 18 will be the same as that shown in FIG. 19.

Figure 20:
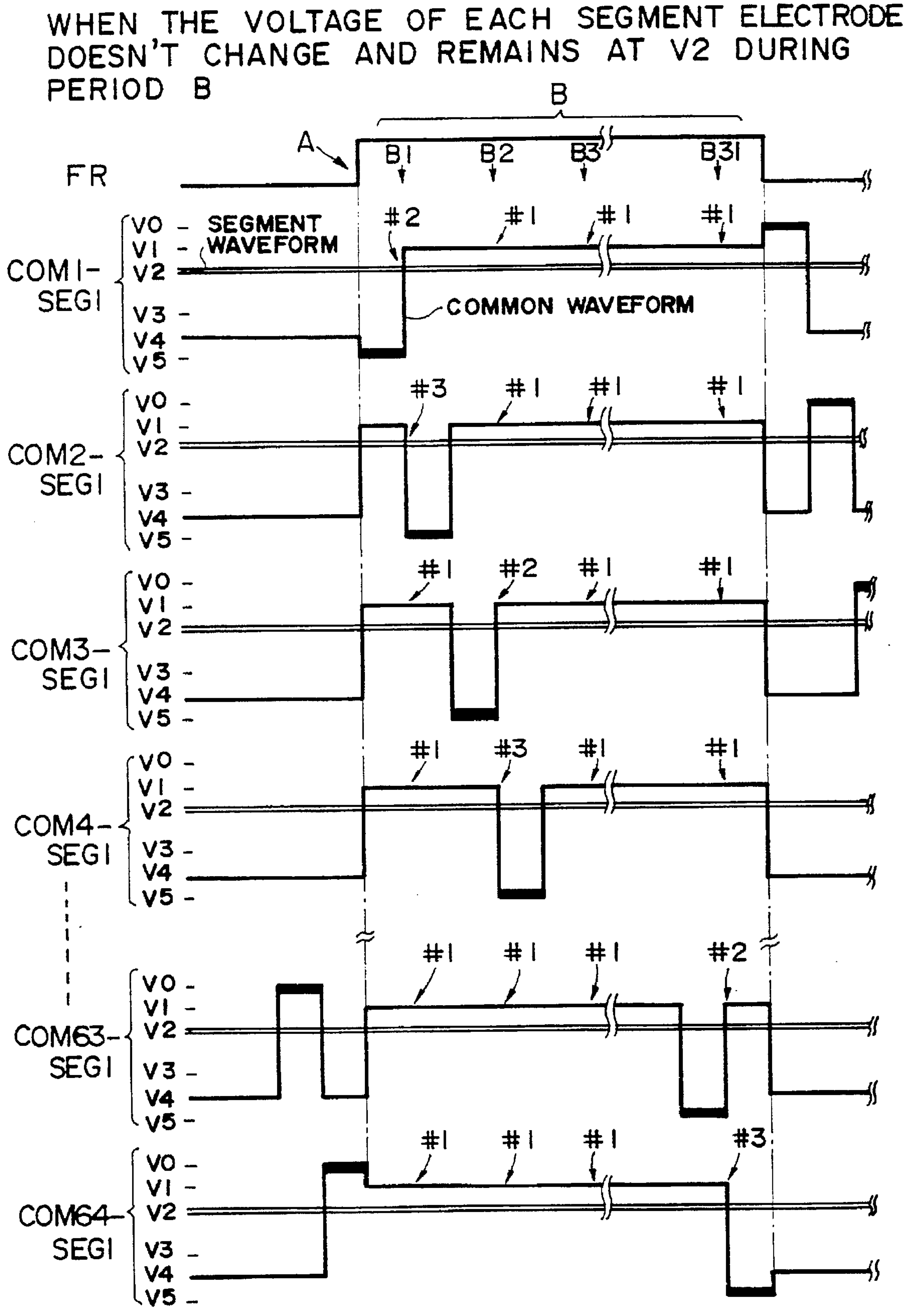
FIG. 20 are diagrams of common and segment waveforms obtained when the voltage of the segment electrode remains unchanged at V2 during the period B.

The common and segment waveforms when the voltage of the segment electrode does not change and stays at V2 during the period B is shown in FIG. 20. In the same manner as described with reference to FIG. 14, the calculations for FIG. 20 are divided into non-selected lines (#1), selection-ended line (#2), and selection-started line (#3). The calculation process and the results obtained in this case are shown in FIG. 21. As shown in FIG. 21, the load applied to V2 is zero in this case.

The load applied to V2 can be calculated for all of the cases, as described above. In other words, depending on the display pattern, a charge of −16 C to +112 C must be drawn into V2 at the FR switchover point A, and a charge of 0 C to +128 C must be dram into V2 during the period B.

The process of calculating the load applied to V1 and the results obtained in this case are shown in each of FIG. 22 to FIG. 25. FIG. 22 shows the case when the voltages of all of the segment electrodes change from V5 to V2 or from V5 to V0 at the FR switchover point A, FIG. 23 shows the case when the voltages of all of the segment electrodes change from V3 to V2 or from V3 to V0 at the FR switchover point A, FIG. 24 shows the case when the voltages of all of the segment electrodes change from V0 to V2 or from V0 to V0 during the period B, and FIG. 25 shows the case when the voltages of all of the segment electrodes change from V2 to V2 or from V2 to V0 during the period B.

The loads on V3 and V4 can be calculated in exactly the same manner. All of the above calculation results are listed together in FIG. 26. As shown in FIG. 26, a load of the same magnitude as that applied to V2 is applied to V3, but in the opposite direction, and a load of the same magnitude as that applied to V1 is applied to V4, but in the opposite direction.

It is clear from FIG. 26 that the polarity of the maximum load (the polarity of the charge that must be moved to the op-amp side during the drive period in total) on V2 is positive and the polarity of the maximum load on V3 is negative. In contrast, since both the positive and negative loads on V1 and V4 have roughly the same magnitude, the polarity of the maximum load could be either positive or negative and cannot be determined from FIG. 26 alone. However, the FR signal is generally much slower than DCK; in this embodiment, a signal of the order of 70 Hz is used. In contrast, loads are applied during the period B at a timing that in synchronized with DCK, so that in this embodiment the timing is of the order of 4 kHz. Therefore, the number of times loads are applied during the period B is far more than that at the FR switchover point A. The number of times loads are applied in FIG. 18, for example, is once only at the FR switchover point A but 31 times during the period B, at the points B1 to B31. Further, since capacitors called smoothing capacitors (not shown in the figures) are connected between VDD (0 V) and V1 to V4, the voltages at V1 to V4 are smoothed over time. In other words, if these voltages are smoothed over time, the magnitudes of the loads applied to V1 to V4 during the drive period can be more-or-less determined by the magnitudes of the loads applied during the period B.

Therefore, since the negative-direction load applied to V1 during the period B is the larger, the polarity of the maximum load becomes negative. Similarly, since the positive-direction load applied to V4 during the period B is the larger, the polarity of the maximum load becomes positive.

Thus, as described above, the polarity of the maximum load at V1 and V3 turns out to be negative. That is the reason why it is appropriate to use p-type OP-amps for V1 and V3. Conversely, the polarity of the maximum load at V2 and V4 turns out to be positive. That is the reason why it is appropriate to use n-type OP-amps for V2 and V4. These connections ensure that the demand current of the entire multi-value voltage generation portion is 63 μA, which can achieve the technical concern of improving display quality while designing for a lower power consumption.

Figure 34:
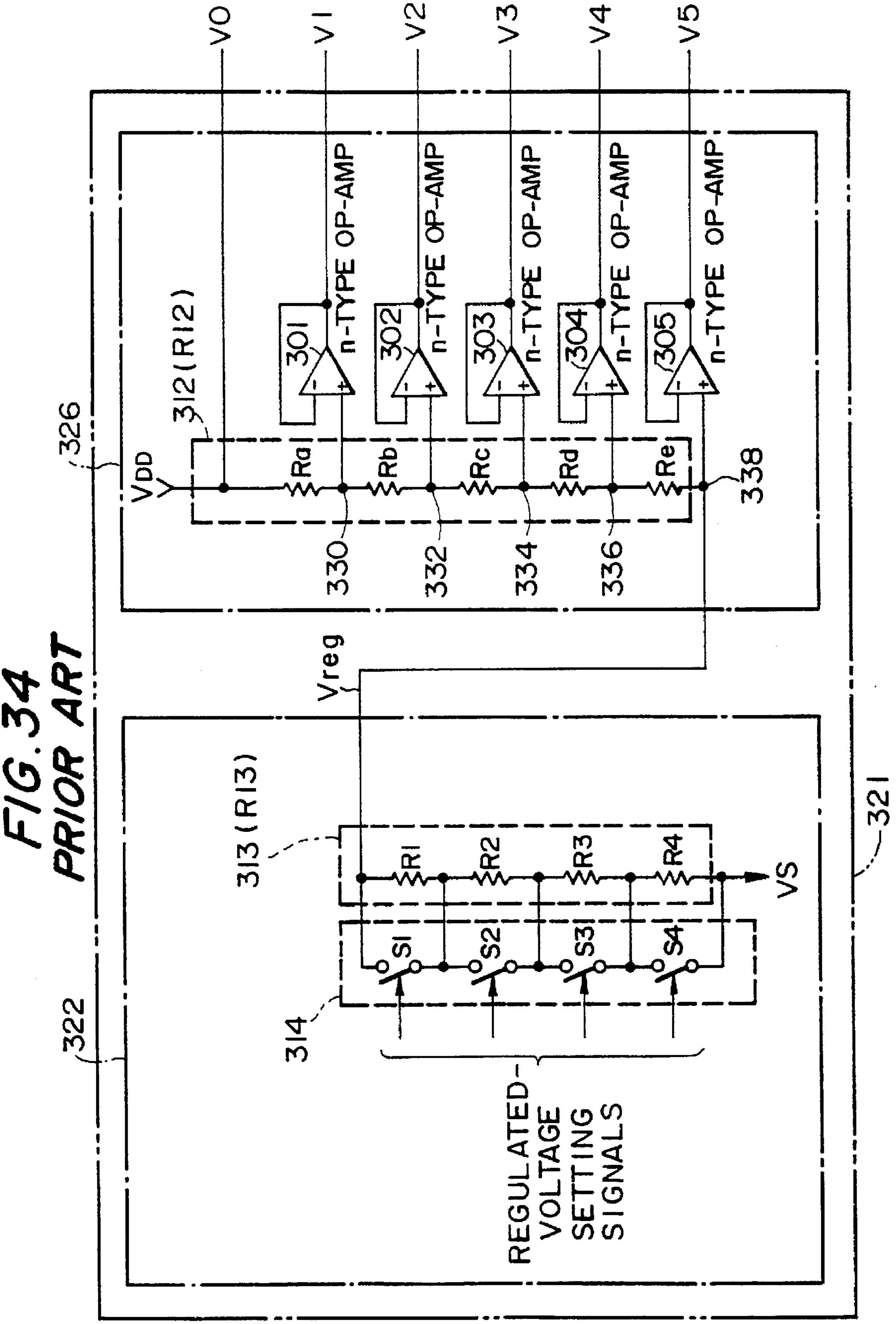
FIG. 34 PRIOR ART
FIG. 34 shows another example of a prior art power supply device used in a device such as a liquid crystal display device.
Figure 35A:
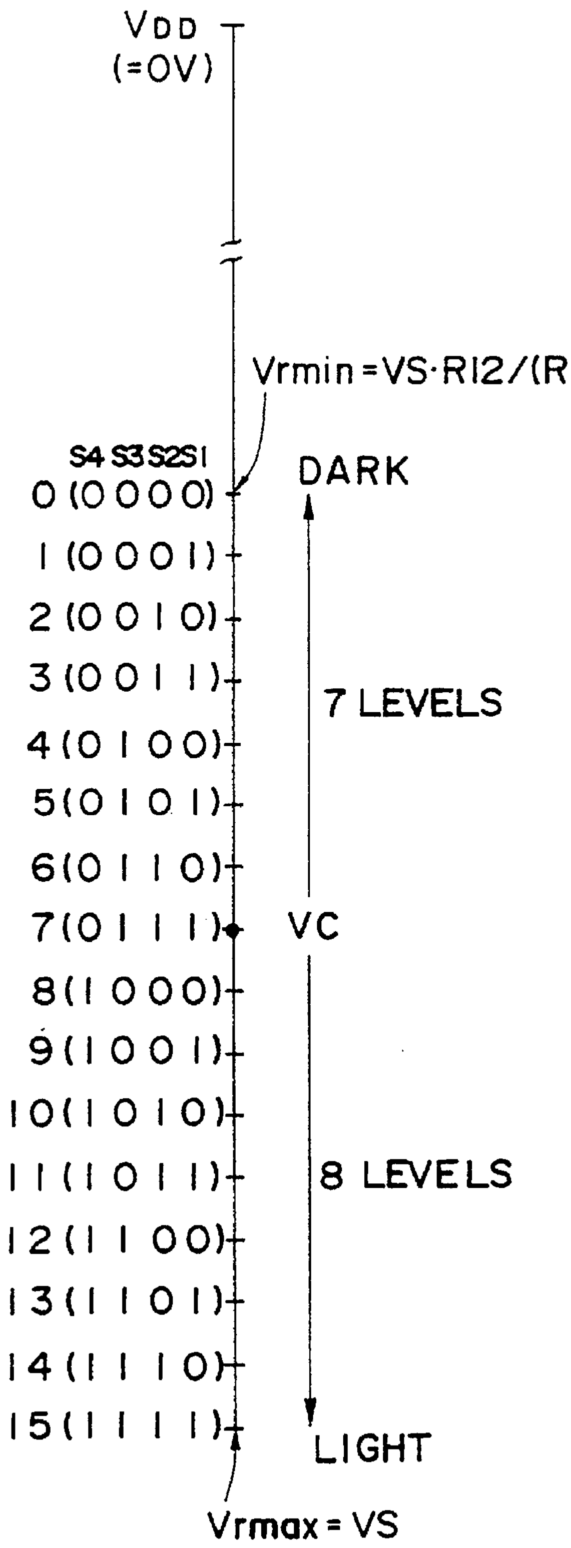
FIG. 35A PRIOR ART
FIG. 35A and FIG. 35B are diagrams illustrating the voltage regulation method of the prior art examples of FIG. 33 and FIG. 34.
Figure 35B:
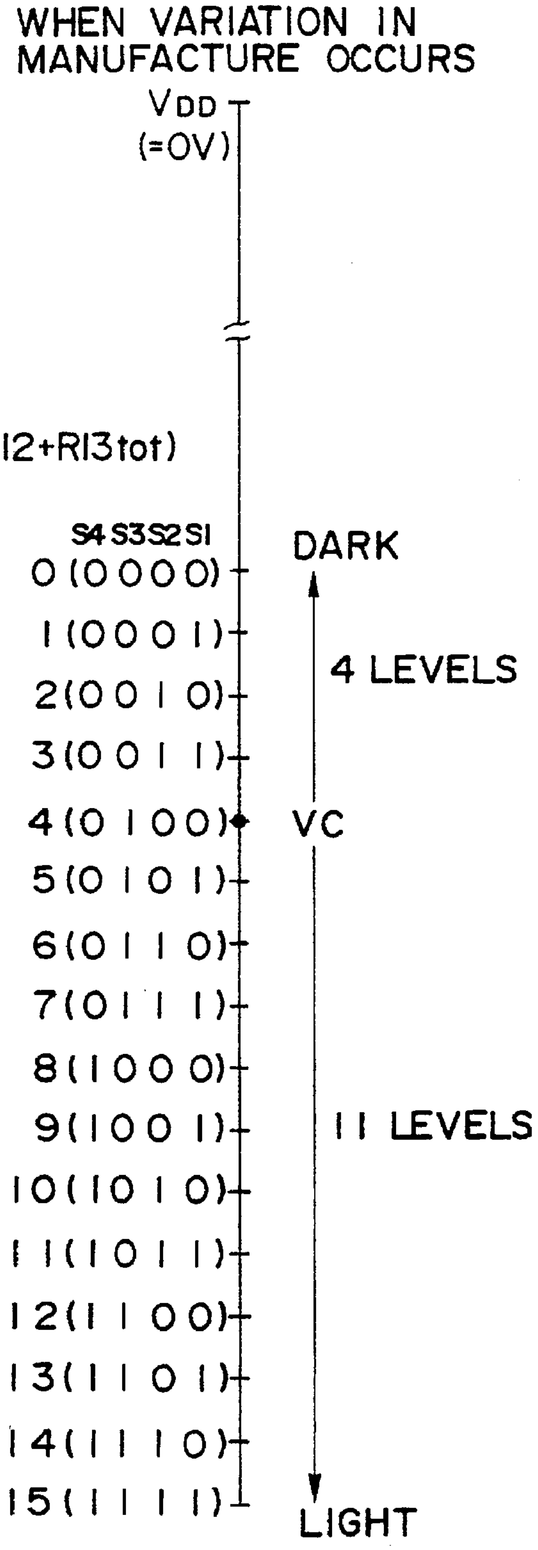
FIG. 35B PRIOR ART

In contrast, the impedance conversion for V1 to V4 in the prior art example shown in FIG. 34 is performed by n-type OP-amps alone. However, with such a configuration, the current supply capability of the p-channel load transistor 213 (see FIG. 10) in each of the n-type OP-amps that perform the impedance conversion for V1 and V3 must be made fairly high. This is because, as described above, a large negative charge must be drawn through V1 and V3 during the drive period, otherwise, if this charge is not dram through, the averaging (equalization) state used in the method of voltage averaging cannot be maintained, and thus phenomena such as shadows and cross-talk will occur. Conversely, if the current supply capability of the p-channel load transistor 213 in this prior art example were to be increased, in an attempt to prevent these phenomena occurring, the demand current would become something like at least 350 μA, which would make it impossible to solve the problem of lower power consumption.

Fourth Embodiment

In a fourth embodiment of the present invention, a current control function is provided for the OP-amps that implement impedance conversion, to reduce power consumptions even further.

Figure 27:
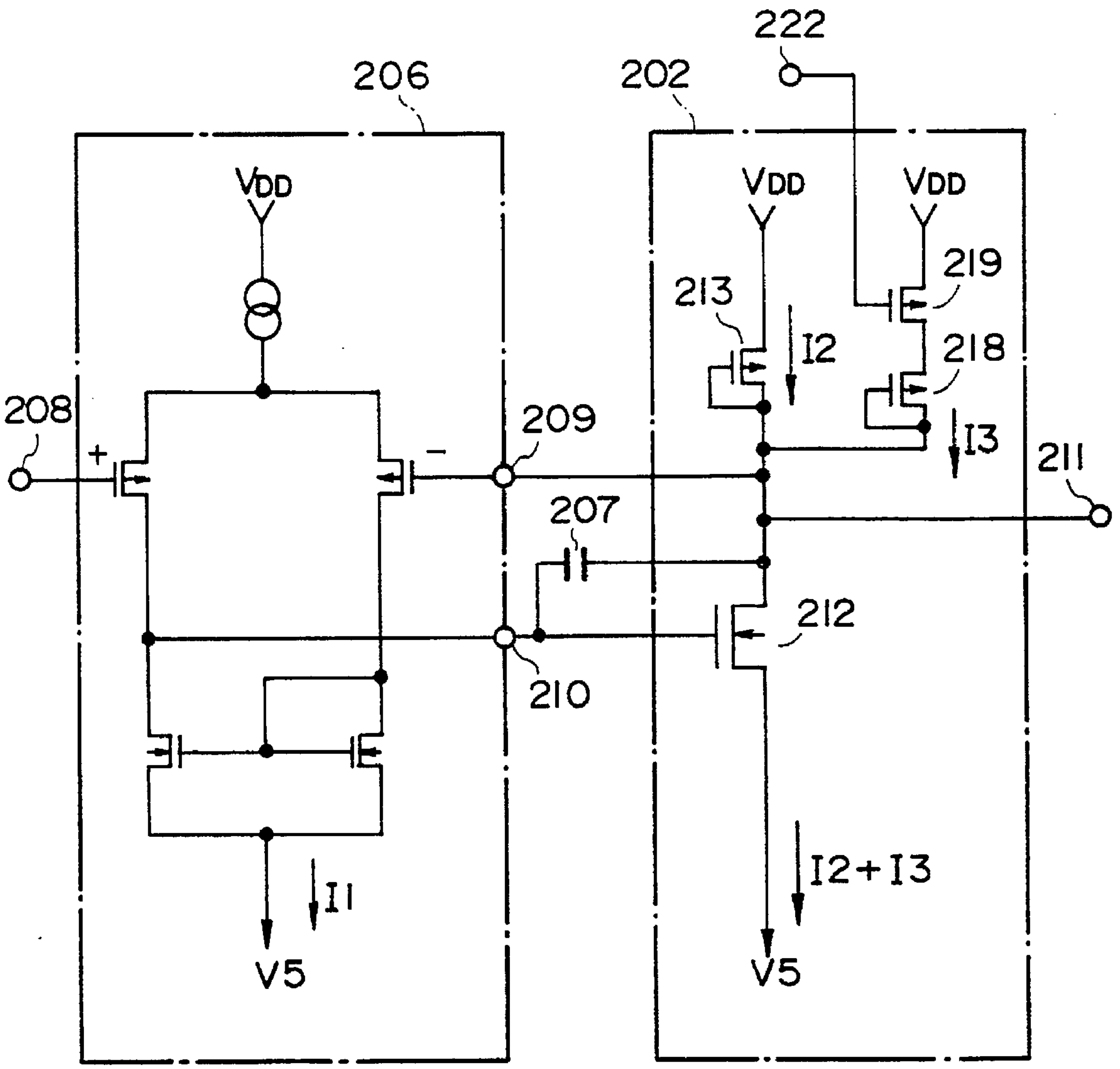
FIG. 27 is a circuit diagram of an n-type OP-amp that possess a current control function.

An example of an n-type OP-amp possessing this current control function is shown in FIG. 27. The OP-amp of FIG. 27 differs from the n-type OP-amp of FIG. 10 in the configuration of the drive portion 202. In other words, in addition to the n-channel drive transistor 212 and p-channel load transistor 213, the drive portion 202 also comprises a second p-channel load transistor 218 and a current-controlling p-channel transistor 219. The drain region and gate electrode of the second p-channel load transistor 218 are short-circuited, and the drain region is also connected to the output terminal 211 of the OP-amp. The current-controlling p-channel transistor 219 is connected in series to the second p-channel load transistor 218, with its gate electrode connected to a control terminal 222.

The drive signals that drive the LCD panel are generated using DCK as a reference clock. Since an LCD element can be considered to be electrically equivalent to a capacitor, the loads applied to the driving supply voltages while the LCD is being driven are generated only at the switchover of drive signals, that is, at the DCK switchover point. In other words, in a system that operates at the falling edge of DCK, load is generated only at the fall of DCK; in a system that operates at the rising edge of DCK, load is generated only at the rise of DCK. That is because, since the LCD element can be considered to be equivalent to a capacitor, once that capacitor has been charged at a certain voltage, there is no other path along which other currents can flow, and thus that voltage can be considered to be held. Note that the description below refers to a system which operates at the rising edge of DCK.

As previously described with reference to FIG. 26, the load applied to each of the driving supply voltages is not necessarily either positive or negative. For example, a positive load could be applied to the p-type OP-amp connected to either V1 or V3, and in such a case a positive charge must be drawn in by the n-channel load transistor 205 in the p-type OP-amp. Similarly, a negative load could be applied to the n-type OP-amp connected to either V2 or V4, and in such a case a negative charge must be drawn in by the p-channel load transistor 213 in the n-type OP-amp. This means that the n-channel load transistor 205 of the p-type OP-amp and the p-channel load transistor 213 of the n-type OP-amp must have a certain degree of current supply capability.

However, as described above, loads are applied to V1 to V4 only when DCK switches over. Therefore, the load transistors 205 and 213 need only allow currents to flow when DCK switches over and for a fixed period thereafter; in other periods it is sufficient to allow just enough current to maintain the voltage.

Figure 28:
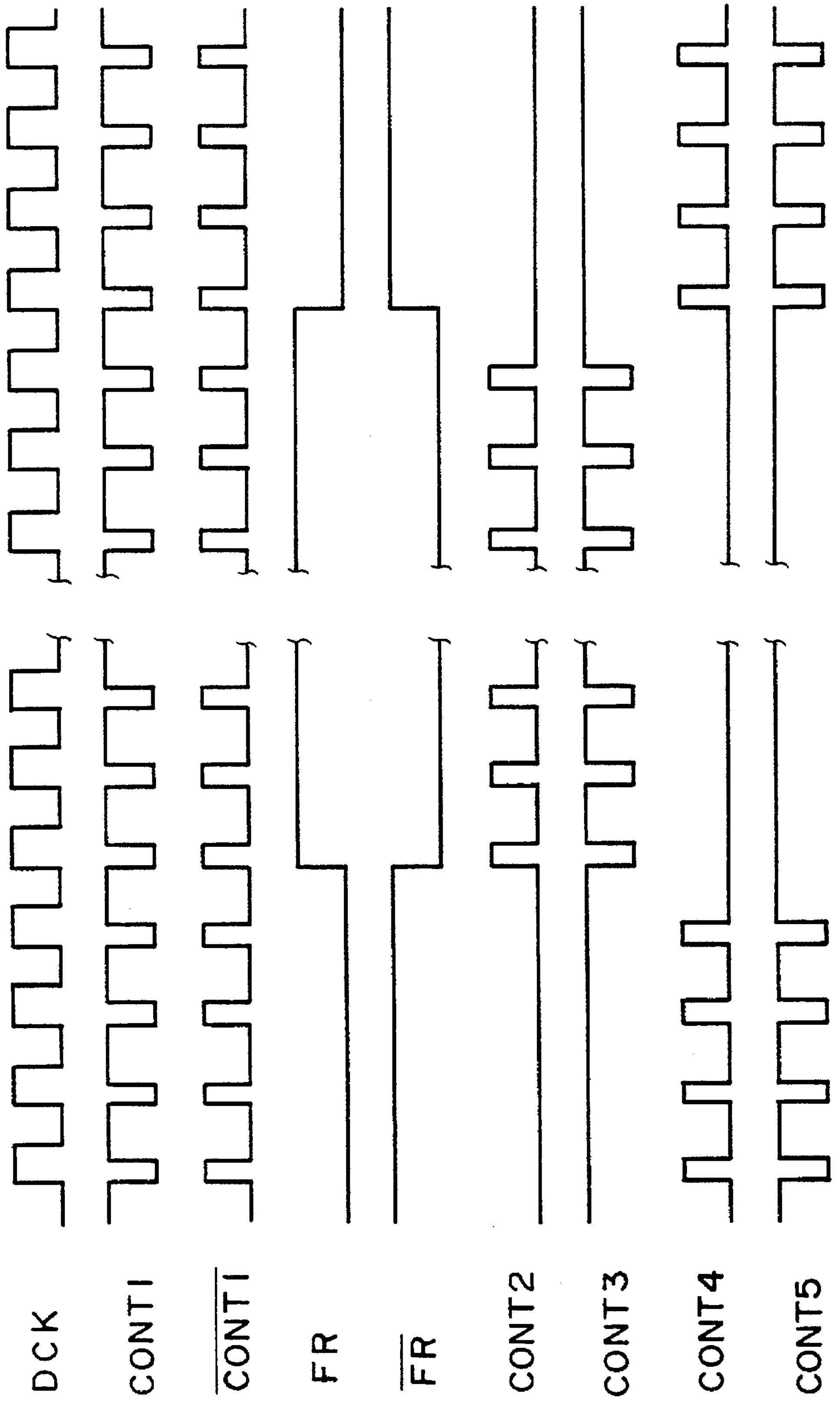
FIG. 28 is a timing chart of DCK, control signals, and the FR signal.

In this fourth embodiment, as shown in FIG. 27, the configuration is such that a second p-channel load transistor 218 is provided parallel to the p-channel load transistor 213, and a current-controlling p-channel transistor 219 is connected in series therewith. A control signal that induces a low level is input to the control terminal 222 at the rise of DCK and for a fixed period thereafter. This turns the second p-channel load transistor 218 on only at the rise of DCK and for a fixed period thereafter, to allow a current I3 to flow. During all other periods, a small current I2 that is just enough to maintain the voltage flows from the p-channel load transistor 213. A timing chart of DCK, the control signal, and the FR signal is shown in FIG. 28. The current-controlling p-channel transistor 219 is turned on only at the rise of DCK and for a fixed period thereafter, and a CONT1 signal is used as the control sisal for allowing the current IS to flow. This CONT1 sisal is input to the gate electrode of the current-controlling p-channel transistor 219, through the control terminal 222.

In this embodiment, the current I2 is restrained to 0.1 μA and the control current I3 is 30 μA. Since the control current I3 is arranged to flow only during a period that is ¼ of DCK, the average current I3 is 7.5 μA. Therefore, the current consumed by the drive portion 202 is given by: I2+I3=7.6 μA. Since the current I1 consumed by the differential amplification portion 206 is 0.7 μA, the demand current of the entire OP-amp is 8.3 μA. This enables a reduction in OP-amp demand current to approximately 1/1.9 of the demand current (15.7 μA) of the n-type OP-amp of FIG. 10, which has no current control function.

The move description referred to an n-type OP-amp. However, a p-type OP-amp can also be provided with a second n-channel load transistor parallel to the n-channel load transistor 205, and a current-controlling n-channel transistor connected in series therewith, to provide the same sort of current control function. In such a case, a control signal that is the inverse of CONT 1 in FIG. 28 is used.

To try to reduce the power consumption even further, the control signals described below could be input to the control terminal 222.

As shown in FIG. 11A, the voltage of each of the common and segment signals goes to one of V0, V3, V4, and V5 in the period during which the FR signal is low. Similarly, this voltage goes to one of V0, V1, V2, and V5 in the period during which the FR sisal is high. Therefore, there is no load on V1 and V2 in the period during which the FR signal is low, nor on V3 and V4 in the period during which the FR signal is high. This means that a further reduction in power consumption can be achieved by turning off the second load transistor of each OP-amp connected to V1 and V2 in the period during which the FR signal is low, and turning off the second load transistor of each OP-amp connected to V3 and V4 in the period during which the FR signal is high.

If impedance conversion is provided for V4, for example, by connecting an OP-amp with a current control function thereto, as shown in FIG. 27, a control signal obtained by ORing the CONT1 signal and FR signal of FIG. 28 is input to the control terminal 222. Since this turns off the second p-channel load transistor 218 in the period during which the FR signal is high, so that the current I3 does not flow, it enables an even lower power consumption. The above described current control of this embodiment enables the average current I3 to be restrained to 3.75 μA, and thus the demand current can be restrained to: I1+I2+I3=4.55 μA. This enables a reduction in demand current to approximately 1/3.5 of the demand current (15.7 μA) of the n-type OP-amp with no current control function. Note that if the OP-amps provided with this current control function that are connected to V1, V2, and V3 are also controlled, and the CONT2, CONT3, and CONT4 signals shown in FIG. 28 are input to the control terminal 222, the power consumption can be further reduced as described above.

Fifth Embodiment

The configuration in the above third and fourth embodiments is such that V1 and V3 are connected to p-type OP-amps 1 and 3, and V2 and V4 are connected to n-type OP-amps 2 and 4, which reduces the currents flowing through the drive portions of the OP-amps and thus facilitates designs with lower power consumptions. However, it has been determined that a configuration of this type raises the problem described below when power to the device is turned on.

Figure 29A:
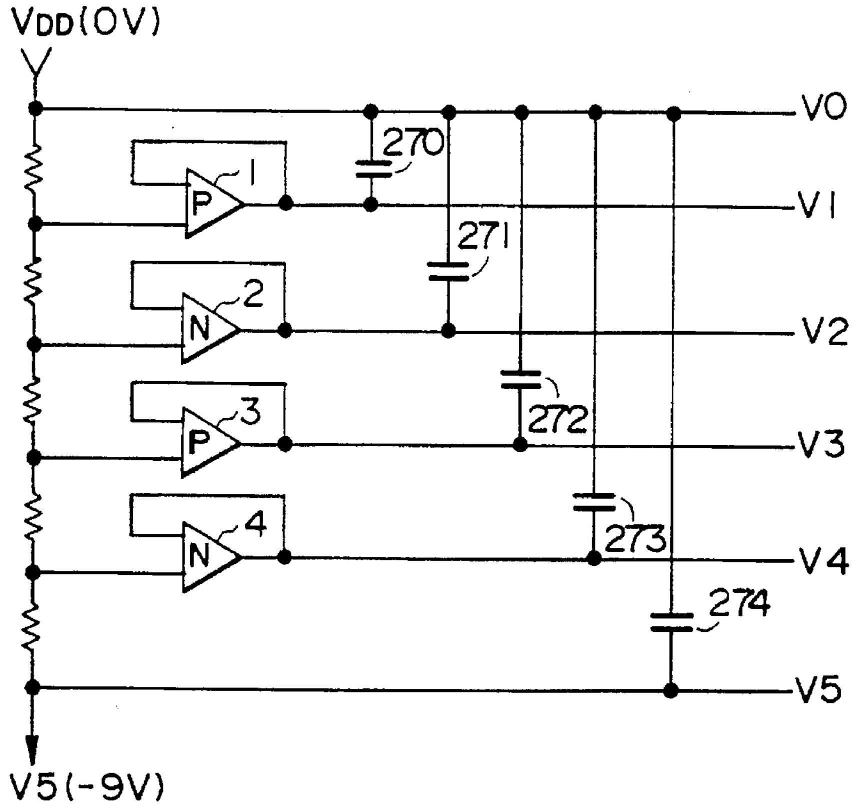
FIG. 29A shows the configuration of a multi-value voltage generation portion when the power source on the high-potential side is a fixed power source.
Figure 30A:
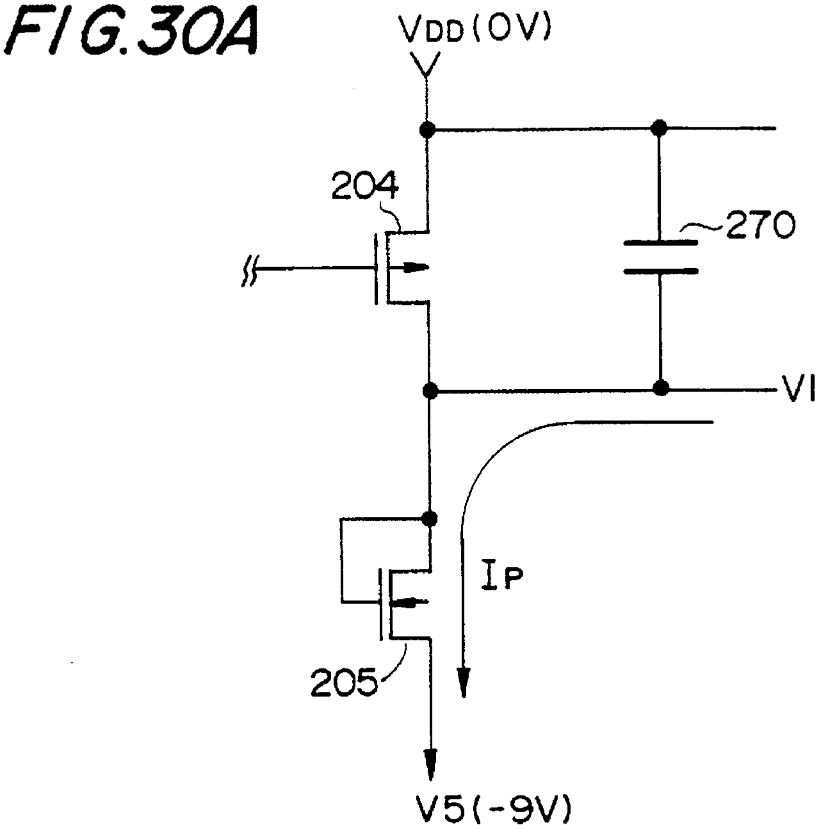
FIG. 30A and FIG. 30B illustrate the voltage changes at V1 and V4 when the power is turned on, respectively.
Figure 31:
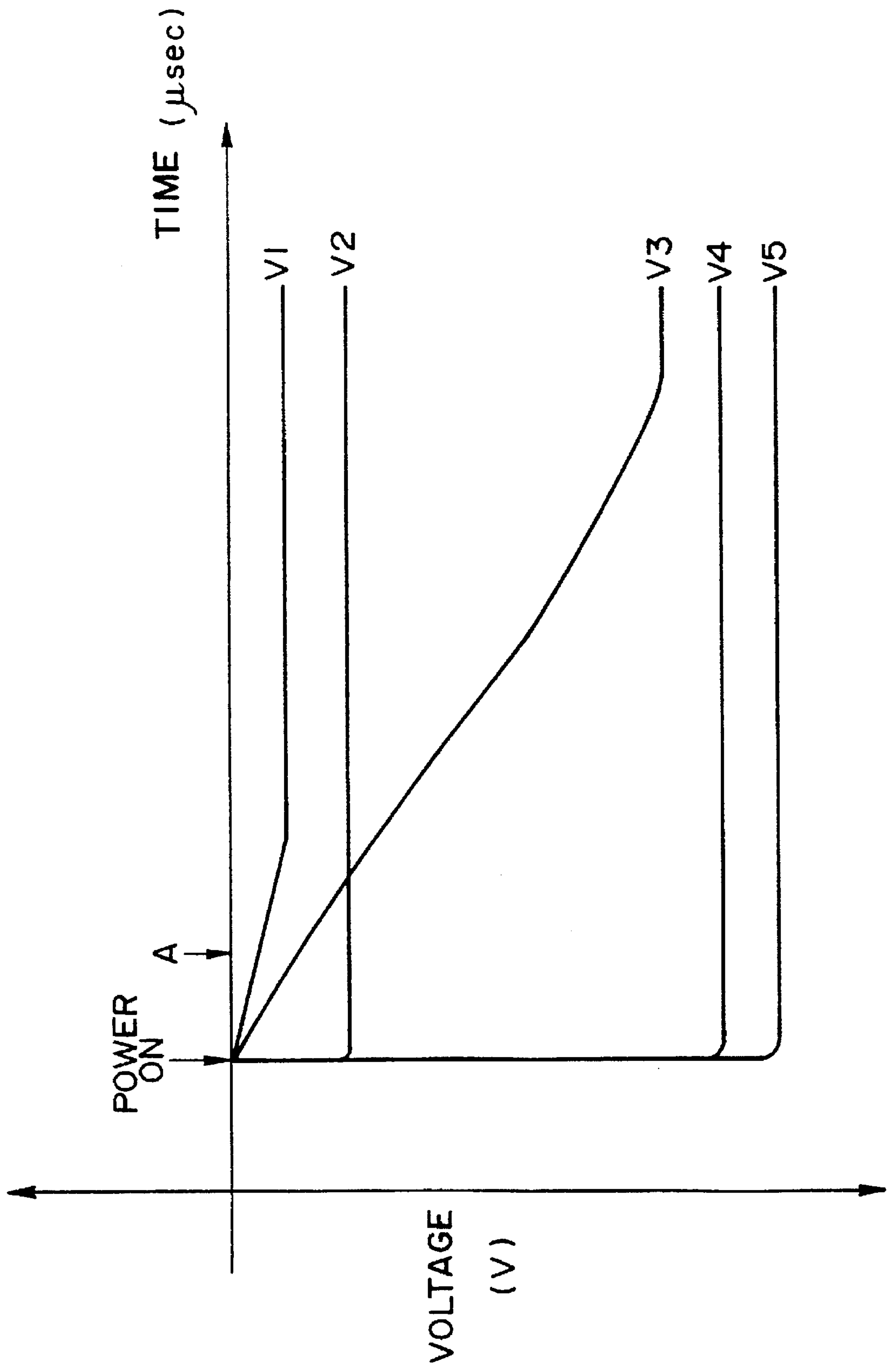

For example, as shown in FIG. 29A, when the configuration is such that V0, which is the power source on the high-potential side, is VDD (0 V) and is handled as a fixed power source (when there is an n-type substrate), the problem occurs that it takes an extremely long time for V1 and V3 to reach their predetermined voltages (see FIG. 31). This is because the current supply capability of the n-channel load transistor 205 that forms the drive portion of each of the p-type OP-amps 1 and 3 connected to V1 and V3 is made extremely small, in order to reduce the power consumption. As shown in FIG. 30A, if VDD is handled as a fixed-potential power source and the power to V5 is turned on, the voltage of V5 drops gradually, and this makes the voltage of V1 also drop gradually. This drop in the voltage of V1 is made by flowing a current Ip through the n-channel load transistor 205 and by drawing charge out of a voltage-smoothing capacitor 270 (or the LCD panel) as shown in FIG. 30A. However, since the current supply capability of the n-channel load transistor 205 is small and thus Ip is also small, it takes an extremely long time for the voltage of V1 to reach its predetermined value, as shown in FIG. 31. This phenomenon affects V3 in the same manner, but in this case V3 takes even longer to reach its predetermined value, as shown in FIG. 31.

Figure 29B:
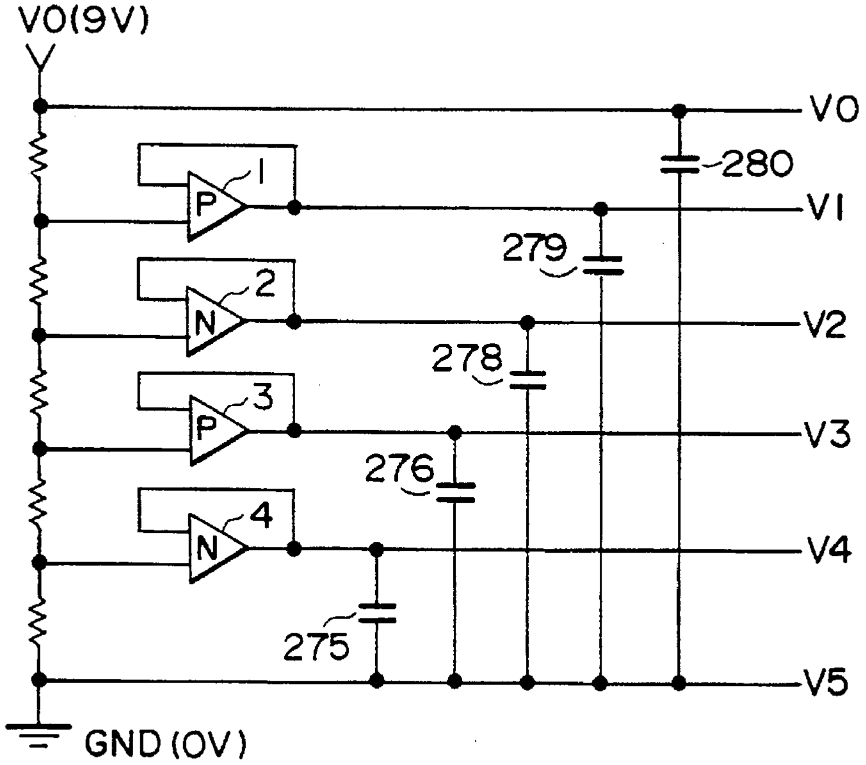
FIG. 29B shows the configuration of a multi-value voltage generation portion when the power source on the low-potential side is a fixed power source.
Figure 30B:
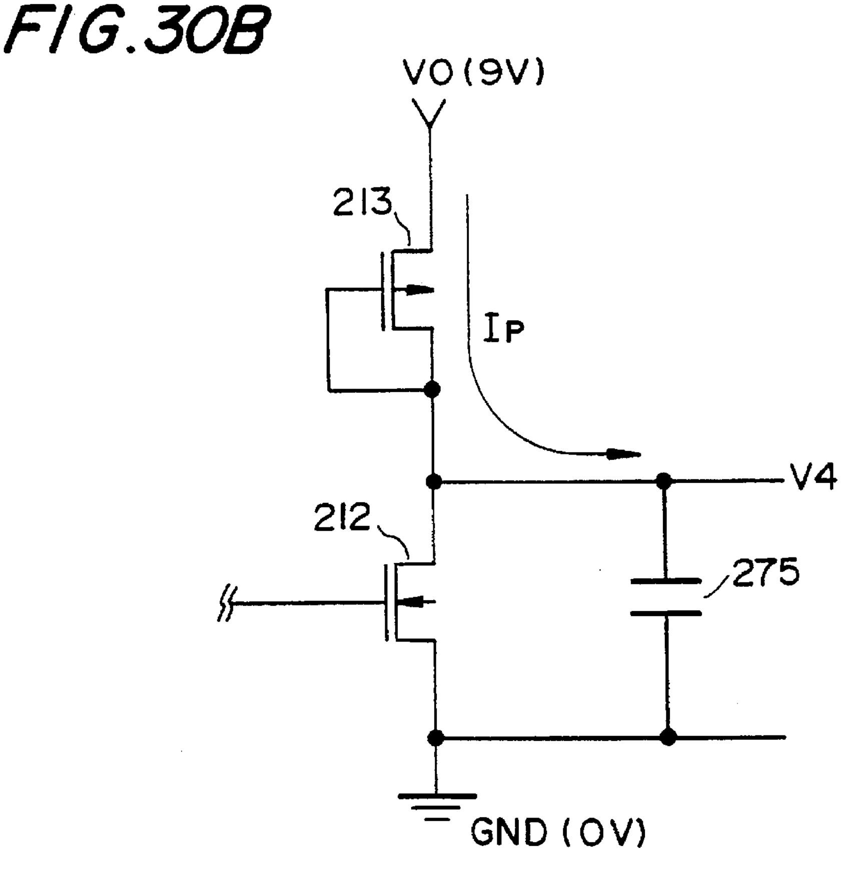

When the configuration is such that V5, which is the power source on the low-potential side, is GND (0 V) and is handled as a fixed power source (when there is a p-type substrate), as shown in FIG. 29B, it is V2 and V4 that take a long time to reach their predetermined voltages. This is because the current supply capability of the p-channel load transistor 204 that forms the drive portion of each of the n-type OP-amps 2 and 4 connected to V2 and V4 is made extremely small. In other words, as shown in FIG. 30B, when the power is turned on, a current Ip flowing from V0 has been made to be small, so that the rise in the voltage of V4 is extremely slow. This phenomenon affects V2 in the same manner.

When the above described phenomenon occurs, the liquid crystal display quality drops dramatically. If, for example, it takes a long time for V1 and V3 to reach their correct values, as shown in FIG. 31, a situation occurs in which the averaging (equalization) state of the method of voltage averaging (amplitude selective addressing scheme) cannot be maintained during this time. Further, the relationship V1<V2<V3 that must be maintained becomes V1<V3<V2 at a point A in FIG. 31, and this results in the liquid crystal display exhibiting a completely black display.

In order to prevent the above situation, the current supply capability of the drive portion of each OP-amp could be increased during a predetermined period immediately after the power is applied. This increase in the current supply capability can be implemented by the configuration shown in FIG. 29A, as will be described below. In other words, in this configuration, the p-type OP-amps 1 and 3 are each an OP-amp with a current control function of the configuration shown in FIG. 27 (the OP-amp of FIG. 27 is an n-channel OP-amp that has the current control function). In other words, the configuration is such that a second n-channel load transistor is connected parallel to the n-channel load transistor 205, and a current-controlling n-channel transistor is connected in series therewith. During a predetermined period immediately after the power is applied, a control signal that turns current-controlling n-channel transistor on is input to the control terminal 222 connected to the gate electrode of the current-controlling n-channel transistor. This increases the current supply capability of the drive portion during the predetermined period immediately after the power is applied, which can speed up the fall time of V1 and V3. This prevents the above situation. The same control can be provided with the configuration shown in FIG. 29B, by providing the n-type OP-amps 2 and 4 with a current control function.

Note that the method used to ensure that V1 and V3 (or V2 and V4) reach their predetermined levels within the predetermined period immediately after the power is turned on is not limited to the above method; various other methods can be used, such as making the transistors of V1 and V2, or of V3 and V4, conductive.

To ensure that the liquid crystal display quality is not deteriorated further, it is preferable to ensure that the above control also makes sure that no transient voltage is applied to the liquid crystal elements during the period until V1 and V3 (or V2 and V4) have reached their predetermined voltages. The configuration is such that the normal driving supply voltages are supplied once V1 and V3 have reached their predetermined voltages. This makes it possible to prevent the situation in which the liquid crystal display is completely black.

Figure 32:
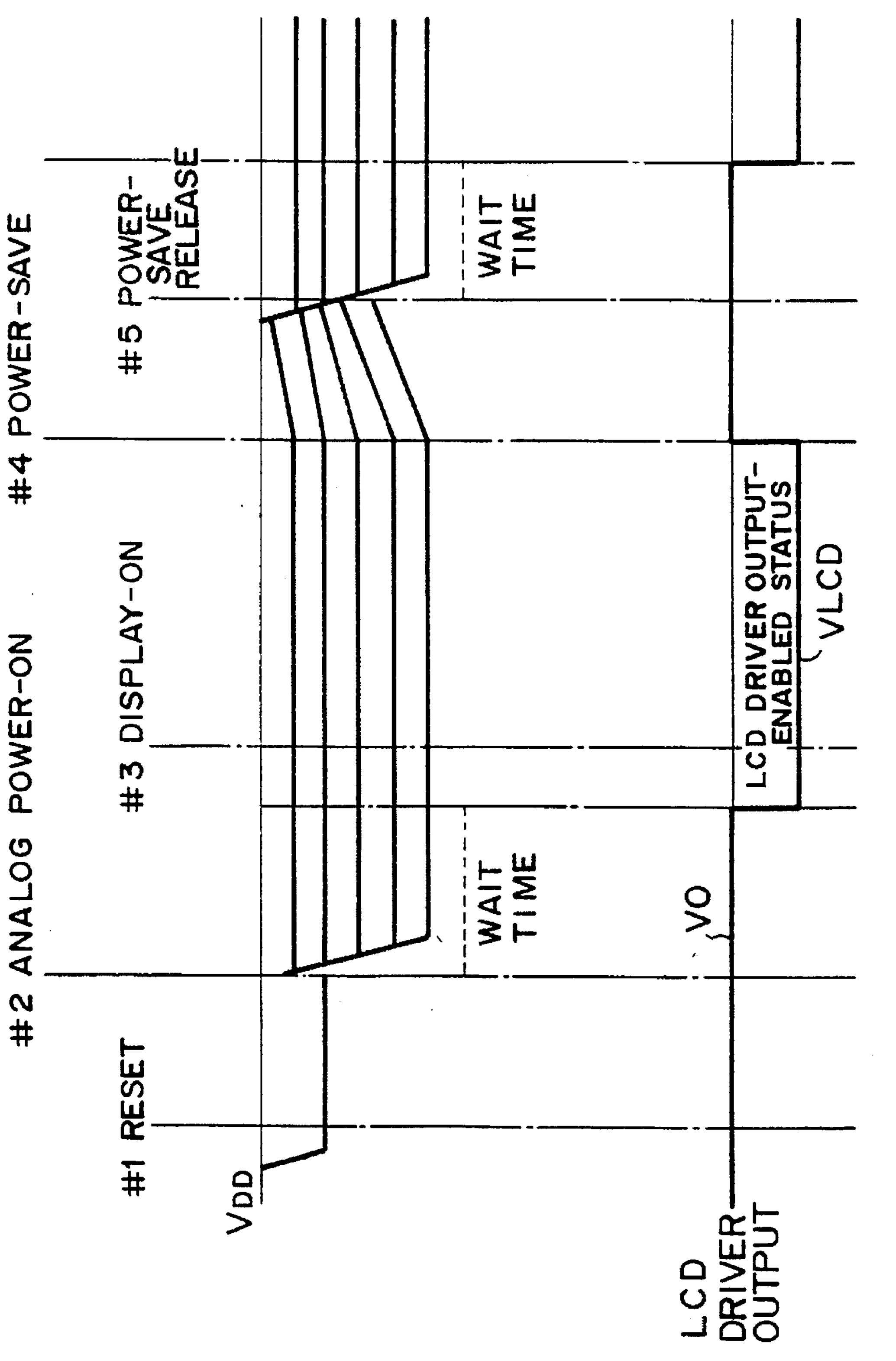
FIG. 32 is a schematic view of the power-on sequence in a fifth embodiment of this invention.

A schematic view of the power-on sequence in this embodiment is shown in FIG. 32. First, a control circuit (logic circuit) within the device is reset by a reset signal (#1). An analog power-on command (#2) is then issued by the control circuit. This starts the operation of the analog circuits within the device, and the multi-value driving supply voltages are generated. In this case, the current supply capability of the OP-amps connected to, for example, V1 and VS is increased, as described above, to provide control such that the driving supply voltages reach predetermined levels during a predetermined period set by a timer. During this predetermined period, all of the LCD driver outputs are fixed to V0, which is a fixed potential. This prevents the application of transient voltages to the liquid crystal elements. After the predetermined time has elapsed, the connection between the power supply device and the LCD driver is enabled, and the LCD driver is set to an output enabled status. A display-on command (#3) is then output by the control circuit, image information stored in RAM is input to the LCD driver, and thus the liquid crystal display is enabled. Note that, in this case, the display-on command is ignored if it is output during the wait time.

Subsequently, if, for example, a power-save command (#4) is output by the control circuit, the device goes into power-save mode. If a power-save release command (#5) is then output, control is again applied to ensure that the driving supply voltages reach their predetermined levels during the predetermined period set by a timer.

With the power-on sequence performed as described above, the situation in which the liquid crystal display is completely black is prevented.

Note that this invention is not limited to the embodiments described herein; it can be varied in many ways within the range specified by the claims thereof.

For example, the descriptions of the above embodiments have referred to V0 as 0 V, which is a fixed potential, but this invention can equally well be applied to a case in which V5 is at the fixed potential of 0 V.

Further, the reference voltage source and constant-current source used in the voltage regulation portion are not limited to those shown in FIG. 4; sources of other configurations can also be used. Similarly, the configuration of the control portion is not limited to that shown in FIG. 3, FIG. 4, and FIG. 5.

The configurations of the p-type OP-amp and n-type OP-amp shown in FIG. 7 is not limited to those shown in FIG. 8 and FIG. 10; for example, OP-amps with different circuit configurations for the differential portion and drive portion could be used.

Further, the liquid crystal drive method to which this invention is applied is not limited to the drive method discussed in the above embodiments.

Similarly, this invention is not limited to a display device driven in a line-by-line scanning, time-division (multiplexed) manner; it can also be applied to a display device driven in a time-division (multiplexed) manner such that a plurality of lines are simultaneously selected. Further, the display device to which this invention is applied is not limited to a liquid crystal display device.

What is claimed is:

1. A power supply device comprising a voltage regulation means and configured to supply a supply voltage that has been regulated by said voltage regulation means to an object to be driven, wherein:

said voltage regulation means comprises an operational amplifier which has first and second input terminals and an output terminal for outputting an output voltage based on voltages input to said first and second input terminals; a reference voltage source electrically connected to said first input terminal; a first resistor electrically connected at one end to said second input terminal of said operational amplifier and at the other end to a fixed potential; a second resistor electrically connected at one end to said second input terminal of said operational amplifier and at the other end to said output terminal of said operational amplifier; variably controlling means for variably controlling a current which flows through said second resistor.

2. A power supply device according to claim 1, wherein:

a reference voltage output from said reference voltage source and said current controlled by said variably controlling means have a temperature characteristic which compensates for a temperature characteristic of said object to be driven.

3. A power supply device according to claim 1, wherein:

said current controlled by said variably controlling means is fixed at a predetermined value during the initial operation of the device.

4. A power supply device according to claim 1, wherein:

said variably controlling means comprises a constant-current source and means for variably controlling a current output from said constant-current source.

5. A power supply device according to claim 4, wherein:

a reference voltage output from said reference voltage source and said current controlled by said variably controlling means have a temperature characteristic which compensates for a temperature characteristic of said object to be driven.

6. A power supply device according to claim 4, wherein:

said current controlled by said variably controlling means is fixed at a predetermined value during the initial operation of the device.

7. A power supply device according to claim 4, wherein:

said reference voltage source and said constant-current source comprise MOS transistors, and a reference voltage from said reference voltage source and a constant current from said constant-current source are generated by using the threshold voltages of said MOS transistors.

8. A power supply device comprising a multi-value voltage generation means for supplying multi-value driving supply voltages, wherein:

said multi-value voltage generation means comprises a voltage divider means for generating divided voltages at divider terminals thereof, and at least three impedance conversion means connected between said divider terminals and capacitive objects to be driven for converting the impedances of said divided voltages generated at said divider terminals;

said impedance conversion means includes at least one first impedance conversion means having a drive portion that is capable of drawing in a greater amount of positive charge than a negative charge and at least one second impedance conversion means having a drive portion that is capable of drawing in a greater amount of negative charge than a positive charge, said first impedance conversion means being connected to a first type object to be driven, the polarity of the charge that should be transferred from said first type object to be driven to said first impedance conversion means during the drive period being positive in total, and said second impedance conversion means being connected to a second type object to be driven, the polarity of the charge that should be transferred from said second type object to be driven to said second impedance conversion means during the drive period being negative in total.

9. A power supply device according to claim 8, wherein:

each of said first and second impedance conversion means is formed of a voltage-follower connected operational amplifier comprising a differential portion and a drive portion; the drive portion of said first impedance conversion means comprises a constant-current source or resistor connected at one end to a high-potential power-source side and at the other end to an output-terminal side, and an n-channel drive transistor connected at one end to a low-potential power-source side and at the other end to said output-terminal side; and the drive portion of said second impedance conversion means comprises a p-channel drive transistor connected at one end to said high-potential power-source side and at the other end to said output-terminal side, and a constant-current source or resistor connected at one end to said low-potential power-source side and at the other end to said output-terminal side.

10. A power supply device according to claim 9, further comprising:

a control means for controlling one or a plurality of multi-value driving supply voltages generated by said multi-value voltage generation means, in such a manner that said voltage or voltages reach predetermined levels within a predetermined period immediately after the power is turned on.

11. A power supply device according to claim 10, wherein:

a voltage in a transient state from said multi-value driving power source is controlled such that it is not applied to said object to be driven during said predetermined period.

12. A power supply device according to claim 9, further comprising:

a control means for controlling said one or a plurality of multi-value driving supply voltages generated by said multi-value voltage generation means, in such a manner that said voltage or voltages reach predetermined levels within a predetermined period immediately after the power is turned on; wherein said control means comprises means for increasing the current flowing into said low-potential power-source side of the drive portion of said second impedance conversion means during said predetermined period, when said high-potential power source acts as a fixed-potential power source and said low-potential power source is turned on.

13. A power supply device according to claim 12, wherein:

a voltage in a transient state from said multi-value driving power source is controlled such that it is not applied to said object to be driven during said predetermined period.

14. A power supply device according to claim 9, further comprising:

a control means for controlling one or a plurality of multi-value driving supply voltages generated by said multi-value voltage generation means, in such a manner that said voltage or voltages reach predetermined levels within a predetermined period immediately after the power is turned on; wherein said control means comprises means for increasing the current flowing from said high-potential power-source side of the drive portion of said first impedance conversion means during said predetermined period, when said low-potential power source acts as a fixed-potential power source and said high-potential power source is turned on.

15. A power supply device according to claim 14, wherein:

a voltage in a transient state from said multi-value driving power source is controlled such that it is not applied to said object to be driven during said predetermined period.

16. A power supply device according to claim 8, further comprising:

a control means for controlling one or a plurality of multi-value driving supply voltages generated by said multi-value voltage generation means, in such a manner that said voltage or voltages reach predetermined levels within a predetermined period immediately after the power is turned on.

17. A power supply device according to claim 16, wherein:

a voltage in a transient state from said multi-value driving power source is controlled such that it is not applied to said object to be driven during said predetermined period.

18. A power supply device comprising a multi-value voltage generation means and configured to supply multi-value driving supply voltages from said multi-value voltage generation means, wherein:

said multi-value voltage generation means comprises a voltage divider means for generating divided voltages at divider terminals thereof; a plurality of impedance conversion means connected between said divider terminals and said objects to be driven for converting the impedances of said divided voltages generated at said divider terminals, thus generating multi-value driving supply voltages intended for capacitive objects to be driven; and means for controlling said impedance conversion means;

said impedance conversion means is formed of a voltage-follower connected operational amplifier comprising a differential portion and a drive portion; and said drive portion comprises a constant-current source or resistor connected at one end to a first power-source side and at the other end to an output-terminal side, and a drive transistor connected at one end to a second power-source side and at the other end to an output-terminal side; and said means for controlling said impedance conversion means controls a current to flow through said constant-current source or said resistor of said impedance conversion means only during a fixed period immediately after the rise or fall of the reference clock that is used in driving said object to be driven.

19. A power supply device according to claim 18, wherein:

said drive portion comprises a constant-current source or resistor that is controlled by said means for controlling said impedance conversion means, and another constant-current source or resistor that is not controlled by said control means.

20. A power supply device comprising a multi-value voltage generation means and configured to supply multi-value driving supply voltages from said multi-value voltage generation means, wherein:

said multi-value voltage generation means comprises a voltage divider means for generating divided voltages at divider terminals thereof; a plurality of impedance conversion means connected between said divider terminals and said objects to be driven for converting the impedances of said divided voltages generated at said divider terminals, thus generating multi-value driving supply voltages intended for capacitive objects to be driven; and means for controlling said impedance conversion means;

said impedance conversion means is formed of a voltage-follower connected operational amplifier comprising a differential portion and a drive portion; and said drive portion comprises a constant-current source or resistor connected at one end to a first power-source side and at the other end to an output-terminal side, and a drive transistor connected at one end to a second power-source side and at the other end to an output-terminal side; and when a frame signal for driving an object to be driven is at a predetermined level, said means for controlling said impedance conversion means puts limitations on a current that flows through said constant-current source or said resistor of said impedance conversion means.

21. A power supply device according to claim 20, wherein:

said drive portion comprises a constant-current source or resistor that is controlled by said means for controlling said impedance conversion means, and another constant-current source or resistor that is not controlled by said control means.

22. A power supply device comprising a voltage regulation means and a multi-value voltage generation means, and configured to supply multi-value driving supply voltages generated by said multi-value voltage generation means from a regulated voltage generated by said voltage regulation means, wherein:

said voltage regulation means comprises an operational amplifier which has first and second input terminals and an output terminal for outputting an output voltage based on voltages input to said first and second input terminals; a reference voltage source electrically connected to said first input terminal; a first resistor electrically connected at one end to said second input terminal of said operational amplifier and at the other end to a fixed potential; a second resistor electrically connected at one end to said second input terminal of said operational amplifier and at the other end to said output terminal of said operational amplifier; variably controlling means for variably controlling a current which flows through said second resistor;

said multi-value voltage generation means comprises a voltage divider means for generating divided voltages at divider terminals thereof, and at least three impedance conversion means connected between said divider terminals and capacitive objects to be driven for converting the impedances of said divided voltages generated at said divider terminals;

said impedance conversion means includes at least one first impedance conversion means having a driven portion that is capable of drawing in a greater amount of positive charge than a negative charge and at least one second impedance conversion means having a drive portion that is capable of drawing in a greater amount of negative charge than a positive charge, said first impedance conversion means being connected to a first type object to be driven, the polarity of the charge that should be transferred from said first type object to be driven to said first impedance conversion means during the drive period being positive in total, and said second impedance conversion means being connected to a second type object to be driven, the polarity of the charge that should be transferred from said second type object to be driven to said second impedance conversion means during the drive period being negative in total.

23. A power supply device according to claim 22, wherein:

each of said first and second impedance conversion means is formed of a voltage-follower connected operational amplifier comprising a differential portion and a drive portion; the drive portion of said first impedance conversion means comprises a constant-current source or resistor connected at one end to a high-potential power-source side and at the other end to an output-terminal side, and an n-channel drive transistor connected at one end to a low-potential power-source side and at the other end to said output-terminal side; and the drive portion of said second impedance conversion means comprises a p-channel drive transistor connected at one end to said high-potential power-source side and at the other end to said output-terminal side, and a constant-current source or resistor connected at one end to said low-potential power-source side and at the other end to said output-terminal side.

24. A liquid crystal display device comprising a voltage regulation means, wherein supply voltages for driving liquid crystal elements are regulated by said voltage regulation means, thus regulating contrast for a liquid crystal display, and wherein:

said voltage regulation means comprises an operational amplifier which has first and second input terminals and an output terminal for outputting an output voltage based on voltages input to said first and second input terminals; a reference voltage source electrically connected to said first input terminal; a first resistor electrically connected at one end to said second input terminal of said operational amplifier and at the other end to a fixed potential; a second resistor electrically connected at one end to said second input terminal of said operational amplifier and at the other end to said output terminal of said operational amplifier; variably controlling means for variably controlling a current which flows through said second resistor.

25. A liquid crystal display device according to claim 24, wherein:

said variably controlling means comprises a constant-current source and means for variably controlling a current output from said constant-current source.

26. A liquid crystal display device characterized in comprising a multi-value voltage generation means configured to use a 6-level drive method to drive a liquid crystal element that is an object to be driven, on the basis of multi-value driving supply voltages generated by said multi-value voltage generation means wherein:

said multi-value voltage generation means comprises a voltage divider means for generating divided voltages at divider terminals thereof;

a plurality of impedance conversion means connected between said divider terminals and said objects to be driven for converting the impedances of said divided voltages generated at said divider terminals, thus generating multi-value driving supply voltages intended for said objects to be driven; and supply voltages for driving liquid crystal elements by using said 6-level drive method, said supply voltages termed driving supply voltages at a zero level, a first level, a second level, a third level, a fourth level, and a fifth level from a high-potential side, each of said second and fourth levels of driving supply voltage is generated by a first impedance conversion means having a drive portion that is capable of drawing in a greater amount of positive charge than a negative charge from said object to be driven to said first impedance conversion means, and each of said first and third levels of driving supply voltage is generated by a second impedance conversion means having a drive portion that is capable of drawing in a greater amount of negative charge than a positive charge from said object to be driven to said second impedance conversion means wherein each of said first and said second impedance conversion means is formed of a voltage follower connected operational amplifier comprising a differential portion and a drive portion.

27. A liquid crystal display device according to claim 26, wherein:

each of said first and second impedance conversion means is formed of a voltage-follwer connected operational amplifier comprising a differential portion and a drive portion; the drive portion of said first impedance conversion means comprises a constant-current source or resistor connected at one end to a high-potential power-source side and at the other end to an output-terminal side, and an n-channel drive transistor connected at one end to a low-potential power-source side and at the other end to said output-terminal side; and the drive portion of said second impedance conversion means comprises a p-channel drive transistor connected at one end to said high-potential power-source side and at the other end to said output-terminal side, and a constant-current source or resistor connected at one end to said low-potential power-source side and at the other end to said output-terminal side.

28. A power supply method for supplying electrical power with respect to an object to be driven such that voltage division is performed and the resultant divided voltages are subjected to impedance conversion and are supplied as multi-value (at least five values) driving supply voltages, wherein:

performing impedance conversion in such a manner that a greater amount of positive charge than a negative charge is drawn in from said object to be driven when the polarity of the charge that must be transferred from said object to be driven during the drive period is positive in total, and performing impedance conversion in such a manner that a greater amount of negative charge than a positive charge is drawn in from said object to be driven when the polarity of the charge that must be transferred from said object to be driven during the drive period is negative in total.

29. A power supply device comprising a multi-value voltage generation means for supplying multi-value driving supply voltages wherein:

said multi-value voltage generation means comprises a voltage divider means for generating divided voltages at divider terminals thereof, a plurality of impedance conversion means connected between said divider terminals and capacitive objects to be driven for converting the impedances of said divided voltages generated at said divider terminals;

wherein a current-supply capability of a drive portion of at least one of said impedance conversion means is increased based on a control signal.

30. A power supply device according to claim 29, wherein:

at least one of said impedance conversion means is controlled by said control signal in such a manner that at least one of said multi-value driving supply voltage reaches predetermined level within a predetermined period immediately after the power is turned on.

31. A power supply device according to claim 30, wherein:

said impedance conversion means includes at least one first impedance conversion means having a drive portion that is capable of drawing in a greater amount of positive charge than a negative charge and at least one second impedance conversion means having a drive portion that is capable of drawing in a greater amount of negative charge than a positive charge, said first impedance conversion means being connected to a first type object to be driven, the polarity of the charge that should be transferred from said first type object to be driven to said first impedance conversion means during the drive period being positive in total, and said second impedance conversion means being connected to a second type object to be driven, the polarity of the charge that should be transferred from said second type object to be driven to said second impedance conversion means during the drive period being negative in total.

32. A power supply device according to claim 30, wherein:

a voltage in a transient state from said multi-value driving power source is controlled such that it is not applied to the object to be driven during said predetermined period.

33. A power supply device according to claim 29, wherein:

at least one of said impedance conversion means is controlled by said control signal in such a manner that at least one of said multi-value driving supply voltage reaches predetermined level within a predetermined period immediately after the power is turned on, a current flowing into a low-potential power-source side of the drive portion of said at least one impedance conversion means is increased during said predetermined period, when a high-potential power-source acts as a fixed-potential power source and a low potential power source is turned on.

34. A power supply device according to claim 29, wherein:

at least one of said impedance conversion means is controlled by said control signal so that at least one of said multi-value driving supply voltage reaches predetermined level within a predetermined period immediately after the power is turned on;

a current flowing from a high-potential power-source side of the drive portion of said at least one impedance conversion means is increased during said predetermined period, when a low-potential power-source acts as a fixed-potential power source and a high potential power source is turned on.

35. A power supply according to claim 29, wherein:

said control signal is supplied based on reference clock for driving the object to be driven.

36. A power supply device according to claim 35, wherein:

a current-supply capability of the drive portion of at least one of said impedance conversion means is increased during a period immediately after at least one of a rising edge and a falling edge of said reference clock.

37. A power supply device according to claim 29, wherein:

each of said impedance conversion means is formed of a voltage-follower connected operational amplifier comprising a differential portion and said drive portion; the drive portion comprises a first constant-current source or first resistor and a drive transistor controlled by output of said differential portion and an output terminal; said first constant-current source or first resistor and said drive transistor are connected in serial between a high-potential power-source and a low-potential power-source; said output terminal is connected to a connection point between said first constant-current source or first resistor and said drive transistor.

38. A power supply device according to claim 37, wherein:

said drive portion comprises a second constant-current source or second resistor which is connected in parallel with said first constant-current source or first resistor; a current supplied by said second constant-current source or second resistor into said output-terminal is controlled by said control signal.

39. A power supply device according to claim 38, wherein:

at least one of said impedance conversion means is controlled by said control signal so that at least one of said multi-value driving supply voltage reaches predetermined level within a predetermined period immediately after the power is turned on.

40. A power supply device according to claim 38, wherein:

a current-supply capability of the drive portion is increased during a period immediately after at least one of a rising edge and a falling edge of a reference clock for driving the object to be driven.

41. A power supply device according to claim 29, wherein:

a current flowing through a constant-current source of the drive portion of at least one of said impedance conversion means is put on limitation, when a frame signal for driving the object to be driven is at a predetermined level.

* * * * *